US010410279B2

(12) United States Patent
Hart

(10) Patent No.: US 10,410,279 B2
(45) Date of Patent: Sep. 10, 2019

(54) METHOD AND SYSTEM FOR CREATING AND MANAGING A COMMUNITY OF INTELLECTUAL PROPERTY LICENSEES TO DEVELOP AND COMMERCIALIZE A NEW TECHNOLOGY

(71) Applicant: Mike Hart, Davis, CA (US)

(72) Inventor: Mike Hart, Davis, CA (US)

(73) Assignee: Sierra Industrial Group, LLC, Davis, CA (US)

( * ) Notice: Subject to any disclaimer, the term of this patent is extended or adjusted under 35 U.S.C. 154(b) by 267 days.

(21) Appl. No.: 15/121,219

(22) PCT Filed: Apr. 24, 2015

(86) PCT No.: PCT/US2015/027514
§ 371 (c)(1),
(2) Date: Aug. 24, 2016

(87) PCT Pub. No.: WO2015/164742
PCT Pub. Date: Oct. 29, 2015

(65) Prior Publication Data
US 2017/0032455 A1    Feb. 2, 2017

Related U.S. Application Data

(60) Provisional application No. 61/984,171, filed on Apr. 25, 2014.

(51) Int. Cl.
*G06Q 30/00*        (2012.01)
*G06Q 30/08*        (2012.01)
(Continued)

(52) U.S. Cl.
CPC .......... *G06Q 30/08* (2013.01); *G06Q 10/063* (2013.01); *G06Q 30/0641* (2013.01); *G06Q 50/184* (2013.01)

(58) Field of Classification Search
CPC .. G06Q 30/08; G06Q 30/0641; G06Q 10/063; G06Q 50/184
See application file for complete search history.

(56) References Cited

U.S. PATENT DOCUMENTS 8,150,757 B1 *   4/2012   Sieffert ................. G06Q 30/06
                                                    705/26.1
2001/0049707 A1 * 12/2001  Tran ....................... G06Q 10/10
                                                    715/256
(Continued)

FOREIGN PATENT DOCUMENTS

WO    WO-2006080618 A1 *  8/2006 ............. G06Q 30/08

OTHER PUBLICATIONS

Gerald L. Lohse et al. "Electronic Shopping", Communications of the ACM, Jul. 1998 / vol. 41, No. 7, pp. 81-88. (Year: 1998).*
(Continued)

*Primary Examiner* — Naeem U Haq
(74) *Attorney, Agent, or Firm* — J. Steven Svoboda

(57) ABSTRACT

An electronic commerce (e-commerce) system is provided wherein: an intellectual property (IP) holder holding IP rights: authorizes one or more users to participate in an online process for distributing specified IP rights; conducts the online process; gives, upon termination of the online process, to a winning user a right to license the specified IP rights upon payment of a fee to the IP holder; provides the license to the specified IP rights to the winning user; organizes a selected community of licensees of the IP holder's IP rights; and invites the winning user to join the selected community of licensees of the IP holder's IP rights.

35 Claims, 66 Drawing Sheets

(51) Int. Cl.
  *G06Q 10/06* (2012.01)
  *G06Q 50/18* (2012.01)
  *G06Q 30/06* (2012.01)

(56) References Cited

U.S. PATENT DOCUMENTS

| | | | | |
|---|---|---|---|---|
| 2002/0082973 | A1* | 6/2002 | Marbach | G06Q 30/08 |
| | | | | 705/37 |
| 2006/0059413 | A1* | 3/2006 | Tran | G06F 17/27 |
| | | | | 715/256 |
| 2006/0155572 | A1* | 7/2006 | Postrel | G06Q 30/00 |
| | | | | 705/1.1 |
| 2007/0061249 | A1* | 3/2007 | Newman | G06Q 30/08 |
| | | | | 705/37 |
| 2008/0201187 | A1* | 8/2008 | Ng | G06Q 10/06375 |
| | | | | 705/7.29 |
| 2008/0243642 | A1* | 10/2008 | Ramer | G06Q 30/08 |
| | | | | 705/310 |
| 2008/0249785 | A1* | 10/2008 | Kinjou | G06Q 10/10 |
| | | | | 705/1.1 |
| 2009/0024486 | A1* | 1/2009 | Sevrain | G06Q 10/10 |
| | | | | 705/26.1 |
| 2009/0024534 | A1* | 1/2009 | Sevrain | G06Q 30/0224 |
| | | | | 705/80 |
| 2009/0228387 | A1* | 9/2009 | Johnson | G06Q 10/10 |
| | | | | 705/37 |
| 2012/0173312 | A1* | 7/2012 | Kern | G06O 30/0207 |
| | | | | 705/14.1 |
| 2014/0058885 | A1* | 2/2014 | Matthew | G06Q 30/06 |
| | | | | 705/26.8 |
| 2014/0176557 | A1* | 6/2014 | Haines | G06Q 30/0205 |
| | | | | 345/440 |
| 2015/0363899 | A1* | 12/2015 | Krause | G06Q 50/184 |
| | | | | 705/26.3 |

OTHER PUBLICATIONS

Adam Andrezjewski, "Patent Auctions: The New Intellectual-Property Marketplace" 48 U. Louisville L. Rev. 831 (2010) (Year: 2010).*

No Author "Intellectual Property Rights & Patent Auctions in Bryan, OH | Wilson Auction & Realty Co." Retrieved from https://www.wilsonauctionltd.com/intellectual-property/ (Year: 2019).*

No Author "Intellectual Property Auctions | Ocean Tomo" Retrieved from https://www.oceantomo.com/auctions/ (Year: 2019).*

* cited by examiner

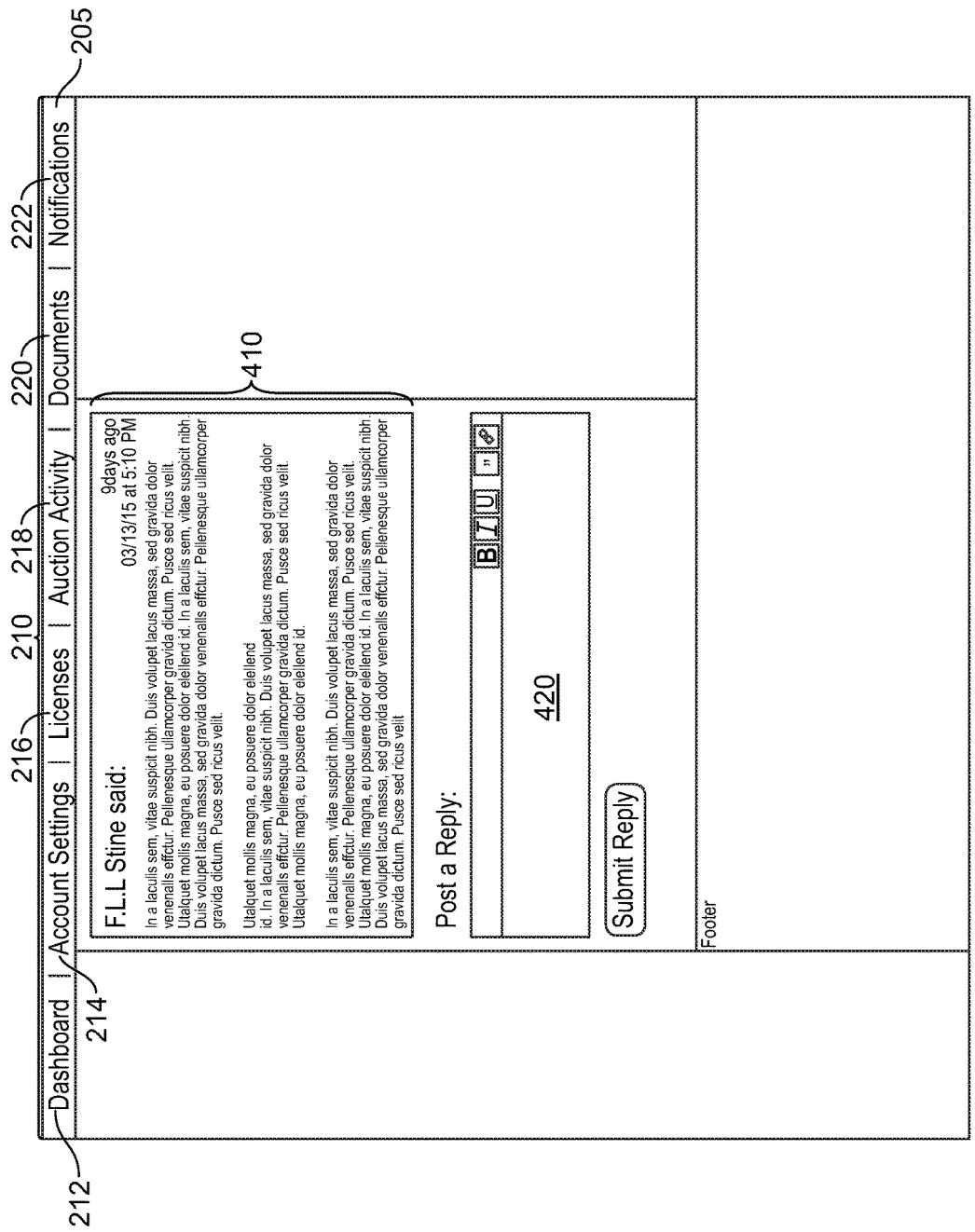

FIG. 8

Wiki Content Taxonomy

1310 {
1. Sierra Energy / Corporate Overview
   a. Who we are
   b. Why we are here / history
   c. Mission Statement
   d. What is the product?
      What is the solution?
}

2. Technology Overview
   a. What is it and how it does it work?
   b. Advantages
   c. How we Compare / Competition(?)

3. FastOx Gasifier
   a. Technical development Background
      i. Test unit
   b. Overview 4. FastOx System
   a. Overview
   b. Components (?)
   c. Technical development Background
   d. Retrofits(?)

5. Feedstock
   a. MSW
   b. Biomass
   c. Medical
   d. Hazardous
   e. Everything Else
   f. Moisture 6. Syngas
   a. Composition
   b. Uses
   c. Cleaning 7. Byproducts
   a. Slag
   b. Other Disposables 8. End Products
   a. Hydrogen
   b. Electricity
   c. Diesel (& other FT Liquids)
   d. CNG
   e. Ethanol
   f. Ammonia
   g. Methane
   h. CHP 9. Economics
   a. CapEx/OpEx
   b. FastOx economics
   c. Calculator 10. Environmental Impact
   a. Emissions
      i. $CO_2$
      ii. Offset of Methane
      iii. Other Pollutants
   b. Community Impact 11. How to access a FastOx Gasification System
   a. Purchasing/obtaining access to gasifier
   b. Licensing
   c. Technical Reports
   d. Other Engineering Services 12. Business opportunities
   a. partnering
   b. sales rep
   c. Vendors
   d. Other/Misc 13. Other
   a. ChemCAD Model (maybe too proprietary)
   b. Component(?)

| Dashboard | Account Settings | Licenses | Auction Activity | Documents | Notifications |

Previous Bid Activity 2110 (4 Bids)

YOLO_15337 $.15
YOLO_17324 $.11
YOLO_12777 $.1025
YOLO_00285 $.10

Auction Activity 1710 [Hide bidding history]

In a laculis sem, vitae suspicit nibh. Duis volupet lacus massa, sed gravida dolor venenalis effctur. Pellenesque ullamcorper gravida dictum. Pusce sed ricus velit. Utalquet mollis magna, eu posuere dolor elelend id.

Time Remaining 5d 7h (Sun 6AM)
Current Bid Price $.15 ⊙
Population Multiplier x 300,000 ⊙
Current Bid Value $45,000 ⊙
[See 4 Previous Bids]

Place a New Bid 1715 $ 0.1525 ⊙ — 1750
 Increments of $0.0025 USD ⊙
Multiplied by a population of x 300,000 ⊙
New Bid Value $45,750 ⊙

[Submit New Bid]

Need more data?
In a laculis sem, vitae suspicit nibh. Duis volupet lacus massa, sed gravida dolor venenalis effctur. Pellenesque ullamcorper gravida dictum. Pusce sed ricus velit. Utalquet mollis magna, eu posuere dolor elelend id. Sed a nisi porta bibendum eu id velit.

FastOx™ Gasification- License Value Forcast
2100   FIG. 21 (cont.)

| Show: 10 ▽ entries | | Search: | |
|---|---|---|---|
| State ⇔ | | Status ⇔ | |
| Minnesota | | available | |
| Washington | | hold | |
| Montana | | hold | |
| Idaho | | hold | |
| North Dakota | | available | |
| Michigan | | hold | |
| Maine | | hold | |
| Wisconsin | | hold | |
| Oregon | | hold | |
| South Dakota | | available | |
| Nevada | | available | |

METHOD AND SYSTEM FOR CREATING AND MANAGING A COMMUNITY OF INTELLECTUAL PROPERTY LICENSEES TO DEVELOP AND COMMERCIALIZE A NEW TECHNOLOGY

PRIORITY CLAIM

The present application claims the priority benefit of U.S. provisional patent application No. 61/984,171 filed Apr. 25, 2014 and entitled "Method and System for Creating and Managing a Community of Intellectual Property Licensees to Develop and Commercialize a New Technology" the disclosure of which is incorporated herein by reference.

SUMMARY

An electronic commerce (e-commerce) system is provided wherein an intellectual property (IP) holder holding IP rights: authorizes one or more users to participate in an online process for distributing specified IP rights; conducts the online process; gives, upon termination of the online process, to a winning user a right to license the specified IP rights upon payment of a fee to the IP holder; provides the license to the specified IP rights to the winning user; organizes a selected community of licensees of the IP holder's IP rights; and invites the winning user to join the selected community of licensees of the IP holder's IP rights.

A method for operating an e-commerce system by an IP holder holding IP rights wherein the IP holder: organizes a selected community of licensees of the IP holder's IP rights; authorizes one or more users to participate in an online process for distributing specified IP rights; conducts the online process; gives, upon termination of the online process to a winning user a right, upon payment of a fee, to license the specified IP rights; receives from the winning user payment of the fee; provides the license to the specified IP rights to the winning user; and invites the winning user to join the selected community of licensees of the IP holder's IP rights.

A method for a user of an e-commerce system to participate in the e-commerce system in which the user: obtains from an IP holder authorization to participate in an online process for winning a right to license specified IP rights held by the IP holder; participates in the online process; wins, upon termination of the online process, a right to license the specified IP rights as a winning user; pays, as the winning user, a fee to the IP holder; receives the license to the specified IP rights from the IP holder, thereby becoming a licensee; and accepts an invitation from the IP holder to join a selected community of licensees of the IP holder's IP rights.

DESCRIPTION OF THE DRAWINGS

FIG. 8 is a wireframe on a community website of a text-based Wiki post page UI for the e-commerce system.

FIG. 13 is a Wiki content taxonomy for the e-commerce system.

DETAILED DESCRIPTION

Figure 1:
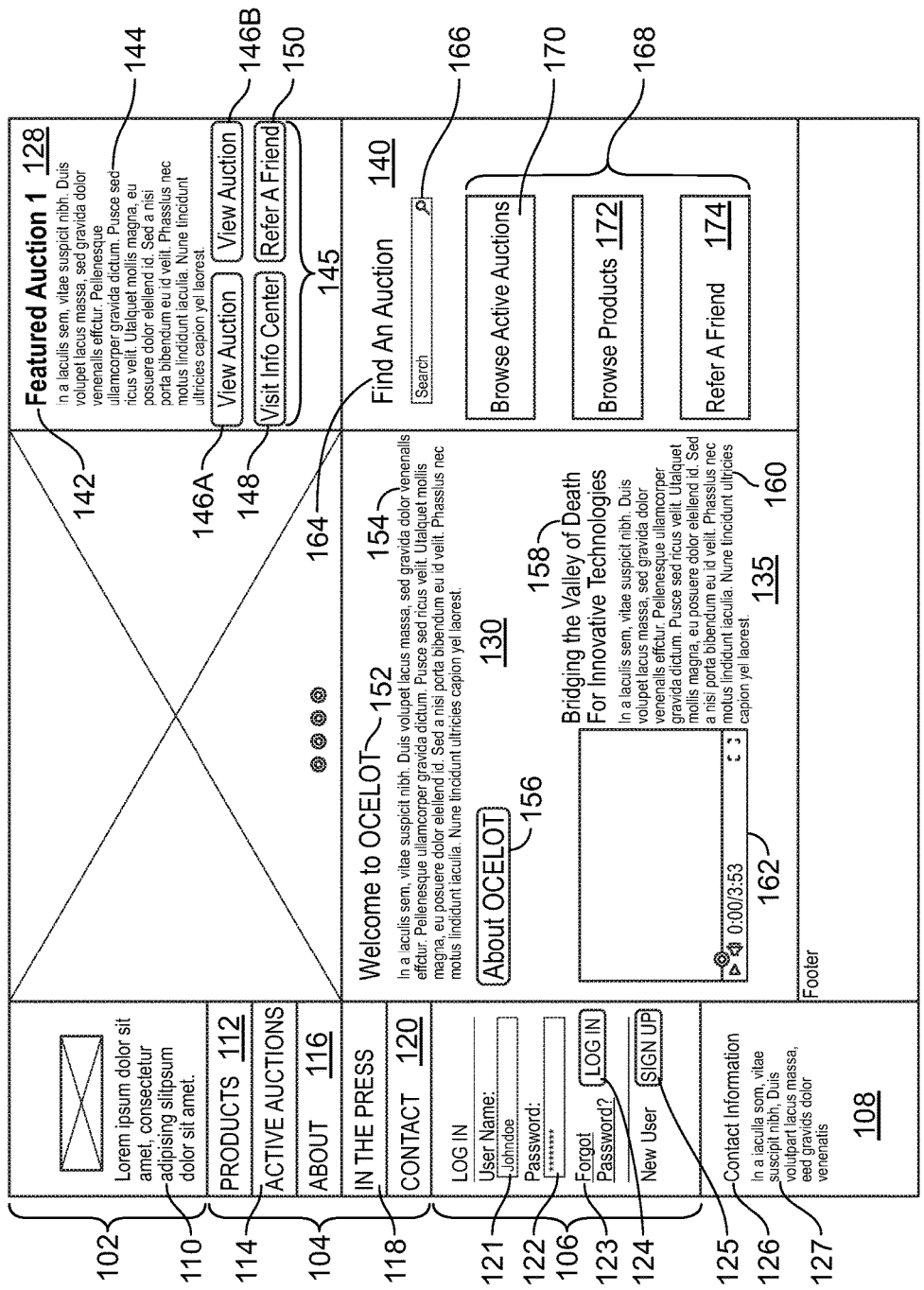
FIG. 1 is a wireframe on a community website of a text-based home page user interface (UI) for an electronic commerce (e-commerce) system.

Entrepreneurs and developers of new technologies are in need of new methods for developing their new products, developing markets, building relationships with financial supporters, finding licensees for their new technologies and introducing their new technologies into the marketplace.

Embodiments of the invention provide a mechanism for a community of licensees of an IP holder's IP rights to build and participate in a network of licensees to develop a technology and also to participate in a still larger community provided through an on-line system which may include entities other than licensees that desire to support the development and marketing of the technology.

Embodiments of the invention provide a novel method and system for creating and managing a community working to develop and commercialize a new technology. A novel method and system is provided for a process of distribution of IP licenses to IP held by an IP holder. A novel method and system is provided for a process of distribution of geographically limited IP licenses to IP held by an IP holder. A novel method and system is provided for an online process of distribution of IP licenses that are geographically limited to a geopolitical territory. The process for distribution of geographically limited IP licenses may be an online process. The process for distribution of geographically limited IP licenses may be a process that is not conducted online. For example, the IP may pertain to one or more products. For example, the IP may pertain to one or more methods. For example, the IP may pertain to green technology. For example, the IP may relate to technology particularly suited to addressing and ameliorating or solving one or more environmental issues.

Creating optimum methods for processing the various types of waste produced in the twenty-first century has become a pressing environmental issue. Startup costs can be substantial. Certain technologies might benefit the environment but be rendered impractical due to prohibitive costs. Moreover, all too often the various responsible governmental authorities can be operating at economic cross-purposes with each other and with the one or more private entities that may be involved in waste processing in a given geographic region.

For purposes of this application, the term geopolitical territory encompasses any sub-division of a country that may be an appropriate region for a geographically limited IP license. The region is preferably one for which the resident population is known with reasonable accuracy. Commonly, although not necessarily, such regions will coincide with counties and their geopolitical equivalents including boroughs and parishes, both in the United States and in other countries. Other sub-divisions of a country that may be suitable for a geographically limited license, to be included under the rubric of geopolitical entities for purposes of this application, comprise one or more municipalities, sub-divisions of municipalities (for example, the five boroughs of New York City), unincorporated areas (for example, Brentwood in the Los Angeles area), waste management districts, political sub-divisions with responsibility for managing solid waste, sub-divisions of counties, defined populations, and other defined geographic regions whose population is measurable by third parties.

The geopolitical territory should be defined so that its population is known with reasonable accuracy, preferably determined through an audit performed by a disinterested third party such as a government census. The size of the relevant population should be known with sufficient accuracy to enable negotiation of a geographically limited IP license that is based on the size of that population. A reasonably accurate population count, preferably established by a population audit, lends needed certainty to the value of the license when calculated on a per capita basis. For example, a license may be calculated as a product of a pre-determined multiplicative factor and the population of the licensed region. For example, a license may increase annually according to a predetermined percentage. This certainty as to the value of the license eliminates a need for audits prior to payment of fees, as the fees may be based on the population, which is subject to determination by the disinterested third party.

The United States comprises 3,140 counties, including geopolitical equivalents of counties, which in Alaska are called "boroughs" and which in Louisiana are called "parishes." In the United States, counties range in population from Los Angeles, Calif., which has approximately 9.8 million residents to Loving, Texas, which has approximately 67 residents. According to the National Association of Counties (NACO), the average number of residents in a county is approximately 100,000.

As long as the population of the geopolitical territory can be determined reasonably accurately, preferably through a third party audit, even non-geographically contiguous areas may be licensed. For example, a geopolitical territory whose IP rights are offered for license may comprise two small towns in different states using the same waste processing technology. For example, a geopolitical territory whose IP rights are offered for license may comprise two non-contiguous regions growing the same crops. For example, a geopolitical territory whose IP rights are offered for license may comprise two non-contiguous regions operated by the same political entity.

For example, a license could be granted for one or more discrete institutional entities or for portions of the one or more discrete institutional entities such as one or more designated portions of federal lands, one or more military bases, one or more universities, one or more hospitals, one or more territories of one or more Native American tribes, one or more portions of two or more non-contiguous territories with certain commonalties, and the like.

Other embodiments of the invention provide a novel method and system for creating a selected community comprising intellectual property licensees that may work together and cooperate through the system to develop, promote and market the technology relating to the licensed IP. For example, the community of licensees may comprise members having a common interest in a particular green technology that can solve a major environmental problem if sufficiently widely marketed and used regionally or throughout a nation or the world. The e-commerce system of the invention provides a mechanism for the community of licensees to build and participate in a network of licensees to develop the technology. They may also participate in a still larger community that may include other entities including non-licensees that desire to support the development and marketing of the technology. Non-licensees provided through the community may include one or more of: suppliers and vendors of equipment and materials relevant to the technology; providers of services relevant to the technology; financial entities; developers; potential developers; governmental authorities; consumers; policy advocates; lobbyists; and potential consumers. For example, one or more of suppliers, vendors, and providers of services may be allowed to advertise on the community website. For example, financial entities may comprise one or more of banks, financiers, venture capitalists, private investors, public investors, donors of capital, and lenders. For example, community members may join together to advocate adoption of their technology such as, for example, through a trade group or through hiring a lobbyist to pass needed legislation or defeat adverse legislation at one or more of a local, county, state, and federal level in order to promote the technology.

The IP holder may create and share license management tools with community members to assist in creation and operation of a community of licensees who may cooperate with each other and potentially with non-licensees to develop and bring the licensed technology to market. The community members may possess member-controlled IP, which refers to IP that the member owns or controls and has the power to contribute to the community. Such license management tools may include one or more of a split or combine tool, a sub-licensing tool, a tool for funding a project, a marketing tool, a design systems tool, a process design package (PDP) tool, a user forums tool, a loan tool, a grant tool, a vendor tool, a system purchase tool, a partnership tool, a resale tool, a price change forecast, an NDA generation tool, a business plan building tool, a financial modeling tool, and another license management tool. The NDA generation tool may, for example, comprise technology developed by DocuSign, Inc. of Seattle, Wash. and San Francisco, Calif. (www.docusign.net). The business plan building tool may, for example, be an automatic business plan building tool.

The tool for funding a project may comprise one or more of the business plan builder, a financial modeling interface, project planning software, and marketing resources. For example, the marketing resources may comprise email marketing resources. The split or combine tool may comprise one or more of a tool to divide one license into several sub-licenses, a tool to combine several sub-licenses into one integrated joint license, drawing tools integrated with a map, and one or more of sub-license and joint license agreements.

The user forums tool may be used by a user wishing to find the best forum for that user to contact regarding a particular issue. The user forums tool may comprise one or more of an online billboard, an electronic mail (email) list, an online chat room, and other means for community member communications. The partnership tool may be used by a user wishing to find a partner in the community for one or more shared projects. The financial modeling tool may comprise a financial modeling graphic interface. Optionally, the IP holder may share one or more license management tools with one or more non-licensee members of the community. For example, optionally, the IP holder may share one or more license management tools with one or more vendors.

According to further embodiments of the invention, community members may share with each other one or more of project information, best practice information, and member-controlled IP. Commonly, though not necessarily, the member-controlled IP is created by the member. A royalty may be paid to a community member sharing member-controlled IP. A commission may be paid to the IP holder when a community member shares member-controlled IP. Typically, though not necessarily, the commission will be a small percentage of the value of the member-controlled IP that is paid to that member. The commission can vary depending on one or more of the value of shared information and the value of the work completed. For example, the commission may be 2% of the value paid to the member for the member-controlled IP. For example, the commission may be 5% of the value paid to the member for the member-controlled IP. For example, the commission may be 10% of the value paid to the member for the member-controlled IP. Optionally, one or more community members may be contractually obligated, such as when they join the community of licensees, to share the member's own member-controlled IP with other members of the community of licensees. The value of the member-controlled IP and fees owed to that member by the other members of the community, if any, can be determined by any of a variety of mechanisms, including by the member owning the IP, by the community of licensees or by the IP holder. Preferably the applicable mechanism for determining such compensation will be specified in the agreements signed by the member when that member joins the community of licensees.

According to other embodiments of the invention, community members may participate in shared community resources including one or more of purchasing opportunities, membership in one or more purchasing cooperatives, and an innovation center. The innovation center may comprise one or more of an online idea wall, a statement of one or more of terms and conditions for licensing IP, a mechanism for submitting a proposed innovation for use or licensing through the community, information on one or more of royalties and other incentives that may be payable in exchange for donation of member-generated IP, and one or more of a wall of fame and a rating system by which a member may receive a rating reflecting that member's contribution to the community. The mechanism for submitting a proposed innovation for use or licensing through the community may, for example, comprise a user board allowing licensees to vote on proposed innovations. For example, royalties paid to community members for innovations may be based on the results of the vote by the licensees.

For example, a purchasing cooperative comprising licensees, at least two of which are interested in purchasing one or more generators, could negotiate a discounted price for a purchase of generators that would then be distributed at a discount to the interested licensees. For example, the purchasing cooperative could negotiate a discounted price for a purchase of at least 50 generators. For example, the purchasing cooperative could negotiate a discounted price for a purchase of up to 200 generators.

Alternatively, or additionally, the IP holder may negotiate with one or more vendors willing to arrange for a discounted price on one or more of a product for sale and a service for sale. The IP holder may allow the vendor to use the community website to advertise one or more of its products for sale and its services for sale.

For example, further site-specific and needs-specific engineering will often be required when siting a particular technology in a particular location. Community members may collaborate through the innovation center in problem solving, performing engineering, and other forms of collaboration. For example, a community member that performs engineering and develops an engineering package in order to develop a first system of its kind may be eligible to share in revenue from selling the engineering package to other community members. Community members may share opportunities to purchase one or more of goods and services through the selected community. For example, a purchasing opportunity may comprise an opportunity to purchase one or more of an interconnection, energy, a nozzle, oxygen, waste hauling, and a generator.

For example, community members may participate in a university regarding one or more of the relevant technology, system, its planning, and its operation. The university may, for example, be taught by a team of one or more instructors in a central location. The university may, as another example, be taught by video by a team of one or more instructors in different locations around the world. Such a university would offer connections between community members that could prove very valuable. Community members may also form a trade organization to promote the common interests of the community members. Members may further participate in the community through one or more of a computer, an application ("app") on a mobile device, a touchscreen facility, through a mobile device without using an application, or through another method for participating in the community.

According to embodiments of the invention, membership in the selected community may accrue considerable value given the numerous benefits provided.

Typically, although not necessarily, enforcement of licensees will be primarily carried out by entities with a strong interest in enforcing the license, for example, the licensees. For example, if a non-licensee diverts waste from the geopolitical territory in which a licensee possesses its license, that licensee may enforce its license. As another example, if non-licensee violates a licensee's license by using licensed technology in the licensee's geopolitical territory, the licensee may enforce its license. Assistance in license enforcement may be provided by the IP holder. Similar principles apply to sub-licensees, who will enforce their sub-licenses. Alternatively, in a particular case, the IP holder may enforce one or more of the license and the IP holder's IP.

An economically effective way to exploit technology is provided so that the wisdom and learning of the selected community can be shared in a way calculated to do one or more of developing, promoting, and commercializing the relevant technology. Particularly in the case of an environmentally beneficial technology, it may thereby be possible to promote both economic good and environmental good.

According to further embodiments of the invention, the IP holder may own the IP rights, may serve as an authorized agent for an owner of the IP rights, or may possess an exclusive license to the IP rights. The IP rights may comprise one or more of patent rights, trademark rights, copyright rights, trade secrets, and technical know-how. For example, the IP rights may comprise one or more of patent rights, trademark rights, copyright rights, trade secrets, and technical know-how relating to one or more of gasifiers, improved waste gasifiers, methods of waste gasification, preparation and use of waste feedstock for gasifiers and use of gasifiers and gasifier output to produce one or more of goods and services.

According to other embodiments of the invention, the online process for distributing the IP rights comprises a sale for a fixed price, commonly known as a "buy it now" button. Commonly, though not necessarily, the fixed price will be higher in order to provide additional income to the IP holder in exchange for a guaranteed purchase by the user. According to still other embodiments, a user can bid on more than one geopolitical territory for a combined price. According to these embodiments, a successful user will receive the counties offered for the combined price under an "all or nothing" system, and otherwise will receive none of the counties.

Alternatively, or additionally, the online process for distributing the IP rights comprises an online auction, and the winning user is a winning bidder in the online auction. The auction can comprise one or more of an English auction, a fixed sale price auction, a reserve price auction, a proxy English auction, a sealed bid auction, a sealed first price auction, a Dutch auction, a Japanese auction, and another type of auction. For example, the Dutch auction can comprise an automated Dutch auction. For example, the Dutch auction can comprise a non-automated Dutch auction. For example, the sealed first price auction may comprise a "buy it now" option.

For example, the auction comprises a sealed first price auction. For example, the sealed first price auction comprises a fixed sale price option, commonly known as a "buy it now" option. For example, the fixed sale price option may be selected using a fixed sale price button or a "buy it now" button by which a user agrees to pay a fixed sale price. For example, the fixed sale price button is a static page that accepts bids but on which otherwise nothing changes except a timer counting down to the end of the auction. The static page does not reveal the bids to anyone apart from the IP holder. If a user exercises the fixed sale price option by agreeing to pay the fixed sale price, the auction comes to an immediate end. If no one exercises the fixed sale price option, the winner is the placer of the highest bid upon expiration of the allotted time.

For example, the auction comprises the automated Dutch auction. For example, the automated Dutch auction comprises a variable fixed sale price that continually decreases until it reaches a level of a highest bid that has been placed. For example, the bidder of the highest bid then wins the auction at that price.

For example, the IP holder accepts one or more of online user registration and online bidding. As another example, the IP holder offers to users features comprising one or more of anonymous bidding, bidding a flat price, and proxy bidding.

Licensing may comprise use of technology developed by DocuSign, Inc. of Seattle, Wash. and San Francisco, Calif. (www.docusign.net). Licensing may further comprise a periodic renewal process. For example, licensing may further comprise an annual renewal process.

According to embodiments of the invention, to promote ease of licensing, the licenses may be granted for one or more specified uses of the IP rights for processing one or more modes of feedstock within the given geographic limitation. For example, possible modes of feedstock comprise one or more of municipal solid waste (MSW); biomass or green waste (BIO); industrial, medical, and construction or demolition waste (IND); and fossil fuels (FOS). As another example, IND might be separated into industrial waste, medical waste, and construction or demolition waste. Other categories of waste that may be included comprise electronic waste and hazardous waste. Electronic waste can comprise, for example, one or more of computer waste, cellular telephone waste, and other electronic waste. Hazardous waste can comprise, for example, one or more of superfund waste, oil mats, batteries, light bulbs, and other hazardous waste. According to other embodiments of the invention, licenses are granted for IP rights to process all available modes of feedstock within the given geographic limitation, without any division into different feedstock modes.

The principal alternatives to gasifying MSW are landfills and incineration, approaches that are environmentally untenable. BIO constitutes a substantially larger volume of material than MSW but lacks the established collection methodologies and payment strategies that exist with MSW. Switch grass, rice straw, corn cellulose, and woody waste are examples of biomass that are available for conversion.

IND includes narrow categories such as auto shredding residue (ASR), batteries, medical waste, construction and demolition site debris (CSD) and other forms of industrial waste. This waste category involves smaller volumes its disposal frequently entails payment of substantial tip fees. FOS includes coal, lignin, oil shale, tar sands, petroleum coke, and other carbonaceous materials, which are presently being converted to energy in enormously polluting ways.

Counties have the potential for gasification of one or more of MSW, BIO, IND, and FOS. To dispose of one or more of MSW and IND, a geopolitical territory in which it may be difficult to place a converter can potentially team with a second neighboring geopolitical territory by acquiring rights to the second geopolitical territory or by reaching an agreement with the licensee in the second geopolitical territory.

According to embodiments of the invention, an IP holder provides a community website. For example, the community website may be configured to auction intellectual property licenses. The community website may be configured to auction geographically limited intellectual property licenses. The community website is configured to conduct an online auction of a license for waste processing in a geopolitical territory.

According to embodiments of the invention, a geographically limited license provides the licensee holding rights in a geopolitical territory with a remedy against other users of the licensed technology who are one or more of located in the geopolitical territory and are processing material generated in the geopolitical territory.

According to other embodiments of the invention, an IP holder provides a community website configured to auction one or more geographically limited intellectual property licenses. For example, the community website may auction one or more intellectual property licenses authorizing a licensee to use any technology for which a geographically limited license would be relevant. For example, the community website may auction a patented waste processing technology in a geopolitical territory of interest for a preset period of time. The community website may auction one or more intellectual property licenses authorizing the licensee to use the licensed waste processing technology in a geopolitical territory of interest for one year or some other period of time. The waste processing technology may comprise gasifier technology.

According to other embodiments of the invention, the IP holder provides a community website that allows for registration by users. The community website can feature an easy to use registration process, during which the IP holder requests information needed from a user wishing to register. The IP holder may require a registering user to accept one or more of community website terms of use. Alternatively, or additionally, the IP holder may require a registering user to complete one or more legal agreements related to participating in an auction. Through the user account page, the IP holder makes available to the user one or more of the terms of use and the legal agreements as needed by the user for later review.

For example, a user is required to sign a buyer's agreement that contains one or more of the product's licensing terms and the rules of the auction. Once the user has signed the buyer's agreement and has provided any other required qualifying documents, the user then is able to participate in the auction bidding. Upon becoming the highest bidder, the user will then make their payment. After receipt of payment, a license certificate will be issued. After completing applicable requirements regarding one or more of terms of use and legal agreements, registering users are prompted by the IP holder to create a username and secure password, then are required to activate their account by clicking a link in an email message sent to the email address the user specified during the registration process. A user that forgets the password can use a secure password recovery feature provided by the IP holder to regain access to the user's account without the need to contact support.

After successful user registration, administrative functions are created in compliance with the IP holder's preferred method of handling new registrants. For example, new registrants can gain access to registration-only areas of the community website such as due diligence information, while not being authorized to bid until the user account has been approved by the IP holder. Also, the IP holder may optionally initiate confirmation that a new registrant has the financial resources necessary to pay the fee if they are successful in an auction.

According to still additional embodiments of the invention, after the registration is completed, the registered user is allowed to access a user account page comprising relevant information regarding the user's account. The user account page can allow the user to set or change one or more of the user's account password, the user's contact information, the user's personal information, and the user's notification preference. The user's personal information includes preferences on what user information is displayed to other users. The user account page can allow the user to set or change one or more of the user's account password, the user's contact information, and the user's notification preferences. Contact information comprises one or more of a name, a street address, a home telephone number, a cellular telephone number, a Skype identifier, an email address, a facsimile (fax) number, and other contact information.

According to further embodiments of the invention, the user account page is configured to offer the user one or more of a list of counties in which the user has placed a bid, a map of counties in which the user has placed a bid, and information regarding the counties in which the user has placed a bid. The user account page may be configured to offer the user one or more of a list of counties in which the user has won an auction and a map of counties in which the user has won an auction.

According to further embodiments of the invention, the user account page provides the user with access to one or more of technical reports, terms of use for the community website, license agreements completed by the user, and other legal agreements completed by the user. For example, as a condition of bidding, the IP holder requires users to complete a license agreement applicable if that user wins the auction. For example, documents are available to the user from the user account page in Portable Document Format (PDF) format.

Payment processing may comprise one or more of credit card verification, and charging a deposit to an auction winner. For example, an auction winner may be charged a deposit equal to a percentage of the sales price. For example, an auction winner may be charged a deposit equal to twenty percent (20%) of the sales price. Payment processing may employ one or more of a wire transfer and a credit card payment that is integrated with the community website. The IP holder may provide support for one or more of mobile browsers and printers. The IP holder may provide accounting support by providing exportable reports to the user.

A useful aspect of the community website is presentation of the counties available for licensing. According to embodiments of the invention, the community website is intuitive and simple for a user to navigate, requiring little user input.

According to further embodiments of the invention, auction information is accessible through a map-based user interface (UI). The map-based UI may act as a primary navigation tool and source of information for the user. Optionally, the IP holder may provide additional functionality to enable a user to search for a geopolitical territory of interest. For example, the IP holder may provide a first drop-down menu that allows the user to select a state. For example, the IP holder may provide a second drop-down menu that allows the user to select a geopolitical territory within the state. Alternatively, or additionally, a "smart" text box may allow a user to specify one or more counties of interest by entering one or more of a state name, a geopolitical territory name, and a zip code. Alternatively, or additionally, the user may select one or more counties from a list that is compiled and displayed as the user is entering information.

According to further embodiments of the invention, a user who performs one or more of clicking on an individual geopolitical territory on the map and selecting a geopolitical territory from the auction listing page is directed to a geopolitical territory information page. For example, the geopolitical territory information page comprises one or more of a geopolitical territory population, due diligence information about the geopolitical territory, information on geopolitical territory license status, applicable terms and restrictions, a statement regarding license availability, a minimum bid, a current bid, an estimated size of a waste converter for geopolitical territory, an auction start date, an auction start time, an auction end date, an auction end time, and other geopolitical territory information. This page is the gateway to the geopolitical territory's bid page if the auction for the geopolitical territory's license is open for bidding. Geopolitical territory information pages present geopolitical territory due diligence information in a standardized, uniform format. Geopolitical territory due diligence information may comprise one or more of applicable intellectual property, contracts, financial data, and other due diligence information.

According to embodiments of the invention, a user can bookmark for future consideration a geopolitical territory to which the user has navigated. For example, the user can bookmark the geopolitical territory using a virtual push pin. The user's bookmarks may appear on the map presented to the user by the UI. The UI may present to the user a text box comprising a list of bookmarked counties. For example, the UI may present the text box comprising the list of bookmarked counties to the user on the user's account page. When creating a bookmark, a user may be invited to request one or more user-requested notification options.

According to other embodiments of the invention, user-requested notification options comprise one or more of notification of an upcoming auction of a license for the bookmarked geopolitical territory, notification that the auction of the license for the bookmarked geopolitical territory will close soon, notification of the availability for auction of a geopolitical territory matching one or more user criteria, and other user-requested notifications. For example, user criteria may comprise one or more of a specific geopolitical territory, a specific state, a specific mode, a minimum bid, an auction start date, an auction start time, an auction end date, and auction end time, and the like. The user-requested notifications may comprise one or more of an on-site notification, an email message transmitted to the email address on file for the user, and a text message to the cellular phone number on file for the user. The text message may be a Short Message Service (SMS) text message. The text message may be another type of text message.

According to other embodiments of the invention, the IP holder may transmit to a user provider-generated notifications comprising one or more of notification of needed action on a requested user registration, notification of a needed signature on a legal agreement, notification of an impending expiration of a legal agreement, a billing notice, a payment confirmation, and other notifications. The provider-generated notifications may comprise one or more of an on-site notification, an email message transmitted to the email address on file for the user, and a text message to the cellular phone number on file for the user.

According to further embodiments of the invention, the IP holder provides an auction listing page that displays an auction list comprising one or more of current auctions, scheduled future auctions, and completed auctions. The auction list can be sorted by one or more of a geopolitical territory population, minimum bid, current bid, estimated size of a waste converter for a geopolitical territory, auction start date, auction start time, auction end date, an auction end time, and other auction information. A minimum bid can be calculated using a per capita formula. For example, the minimum bid can be the product of ten cents and the geopolitical territory's population. As another example, a minimum bid for a geopolitical territory can be set at $2,500 regardless of geopolitical territory population. As a further example, an upper ceiling can set on a minimum bid in a geopolitical territory such as Los Angeles County, which has over nine million residents.

According to still further embodiments of the invention, the IP holder provides a document creation system that minimizes the need for additional user input.

According to still further embodiments of the invention, the community website is configured to provide open access to a Graphic Information System (GIS) enabled website that shows the county map of the targeted state. GIS layers comprise one or more of MSW volumes, landfill locations and ownership, railroad lines, population centers, industrial gas facilities and ownership, known sources of BIO and FOS, registered IND sources, and other relevant information. The GIS layers comprises information provided on a geopolitical territory-specific basis.

According to embodiments of the invention, available auction information comprises one or more of a geopolitical territory population, due diligence information about the geopolitical territory, information on the geopolitical territory's license status, applicable terms and restrictions, a statement regarding license availability, a minimum bid, a current bid, an estimated size of a waste converter for the geopolitical territory, an auction start date, an auction start time, an auction end date, an auction end time, a reserve price, a due diligence period, other due diligence information, one or more of special terms and restrictions, and other auction information. The due diligence information may be presented in a uniform format for one or more counties. Geopolitical territory due diligence information may comprise one or more of applicable intellectual property, contracts, financial data, and other due diligence information.

According to embodiments of the invention, the mapping technology comprises three principal elements: a database, a data-interchange format service, and a web application. Databases are available containing over one million vertices, which form approximately 4,000 polygons, which in turn form the more than 3,200 individual states and counties in the United States. One exemplary database is DataTables, a free plug-in for the jQuery Javascript library. For example, a Microsoft Structured Query Language (SQL) database may be used. For example, the Microsoft SQL database may be used in conjunction with an open source database management system such as My Structured Query Language (MySQL). In particular, MySQL Spatial Extensions can be used to rapidly perform geographic calculations. According to further embodiments of the invention, database calculations can be performed on a server to improve front-end speed, with capabilities to zoom to one or more of a state level and a geopolitical territory level.

For example, the data-interchange format service can be a JavaScript Object Notation (JSON) service used for coordinate acquisition for a mapping service such as, for example, Google Maps. A front-end interface application layer such as, for example, ColdFusion 9 can be used to interface with one or more of the mapping service and the mapping software. For example, the mapping software can comprise Maptitude, sold by Caliper. The data-interchange format service may offer smart out-of-viewport shape simplification. As discussed below in more detail, a web application will be available and may comprise one or more tiered access levels.

Acquisition of data may be performed, for example, via real-time database calls from the web application layer to the Microsoft SQL database and to the online version of the Maptitude software. Additionally, calls may be made to Google Maps to obtain additional location data. The data-interchange format service may offer sub-pixel distance calculations for shape simplification based on the user's zoom-level. The data-interchange format service may provide one or more of state-level data and geopolitical territory-level data based on the user's zoom-level. The data-interchange format service may provide one or more of arbitrary per-geopolitical territory attribute tracking and passing and arbitrary per-state attribute tracking and passing.

According to still further embodiments of the invention, the web application uses an orderable, searchable, paginated and color-coded listing of states and counties. Integration of the mapping service and the database can enhance performance. Asynchronous acquisition of one or more of mapping data and database data can be performed through the JSON Service.

According to further embodiments of the invention, the community website comprises a bidding interface that allows a registered user to complete bidding prerequisites. For example, bidding prerequisites may comprise one or more of signing a license agreement applicable if the user wins the auction, signing another legal agreement, agreeing to terms of sale, agreeing to any special geopolitical territory-specific agreements, agreeing to any special geopolitical territory-specific restrictions, and re-entering the user's account credentials. After the bidding prerequisites are completed, the user is allowed to place a bid through the bidding interface.

According to other embodiments of the invention, a license being auctioned may be broken down to use of the licensed technology in a particular geopolitical territory and using one or more specific feedstock modes. For example, the IP holder displays a bid button to users bidding on a given mode in a given geopolitical territory. The IP holder also displays one or more of a minimum bid and a high bid for the given mode in the given geopolitical territory.

Optionally, the IP holder may offer the opportunity to bid on available rights for the geopolitical territory. According to further embodiments of the invention, such a bid encompasses one or more modes within the given geopolitical territory. The bid may further encompass other modes of waste processing not presently contemplated for the geopolitical territory.

An initial minimum bid can be computed as an approximate multiple of the geopolitical territory population in the geographic region for which the license is being granted, as determined by an official governmental body. For example, a geopolitical territory with a population of approximately 100,000 may have a minimum bid of $10,000 for a license covering all offered rights in the geopolitical territory. For example, a geopolitical territory with a population of approximately 100,000 may have a minimum bid of $10,000 divided into four feedstock modes:
MSW 50% $5,000.
BIO 20% $2,000.
IND 10% $1,000.
FOS 20% $2,000.

The auction itself is carried out according to well-known methods for conducting an online auction. Optionally, a user's username is displayed in association with one or more of a high bid and a bid history. Alternatively, or additionally, a user is assigned an anonymous bidder number for an auction. In this case, a user who later participates in a second auction receives a second anonymous bidder number for the second auction.

According to embodiments of the invention, during the auction, the IP holder automatically generates a user notification. The provider-generated user notification may comprise one or more of a high bid notice, an outbid notice, an auction winner notification, an auction loser notification, a notice of a user registration that requires administrative action, notification of a needed signature on a legal agreement, notification of an impending expiration of a legal agreement, a billing notice, a payment confirmation, and another notification.

According to still further embodiments of the invention, user notification messages can be sent as one or more of an on-site notification, an email message transmitted to the email address on file for the user, and a text message to the cellular phone number on file for the user.

According to embodiments of the invention, an auction of a license may be postponed or cancelled without affecting other auctions. The IP holder may identify users who express an interest in a license whose auction is postponed or cancelled. The postponement or canceling of an auction triggers the IP holder to create a report comprising contact information for one or more users who indicated interest in the auction. The report may comprise contact information for one or more users who placed a bid in the auction or bookmarked the auctioned geopolitical territory.

According to embodiments of the invention, the auction concludes when the auction period ends, after which the community website automatically performs one or more of the following tasks: the UI changes the appearance of the newly auctioned geopolitical territory to reflect the geopolitical territory's new status, the auctioned rights are removed from availability for future auction, and access to the bid page is deactivated.

According to embodiments of the invention, upon conclusion of the auction, a user who placed the winning bid is sent a winning user notification and users who placed non-winning bids are sent losing user notifications. Winning user notifications and losing user notifications comprise information on the outcome of the auction. The user information centers for the users are changed to reflect the outcome of the auction. The IP holder automatically generates needed forms and transmits the forms to the winning user. The IP holder notifies the winning user and advises the winning user of the need to pay the fee and any applicable auction fees to the IP holder within a period of time. For example, the period of time within which all fees must be paid may be seven days. For example, the period of time within which all fees must be paid may be three days.

Typically, although not necessarily, a winning user will be a user who places a bid that is a highest bid. Typically, although not necessarily, if two or more users place high bids for the same amount, the user that placed the high bid at the earliest point in time is the winning user.

According to still further embodiments of the invention, post-auction user notification messages can be sent as one or more of an on-site notification, an email message transmitted to the email address on file for the user, and a text message to the cellular phone number on file for the user. The IP holder may make available through the community website one or more of invoices, sale forms, accounting reports, license agreements and other forms. Optionally, the community website may automatically generate one or more of the forms. For example, the community website may automatically populate one or more or the forms with one or more of user registration information, transaction information, and other appropriate information.

Upon payment of applicable auction fees and the required fee, the IP holder acknowledges the user's compliance with applicable requirements, and the IP holder provides the license to the winning user, who thereby becomes a licensee.

According to other embodiments of the invention, a non-complying winning user that does not pay the required fee and any applicable auction fees will lose rights to the license. Optionally, the license may then be offered to the user who placed the next highest bid. Alternatively, the license may be re-auctioned.

According to embodiments of the invention, the IP holder invites the licensee to join a selected community of licensees organized by the IP holder.

According to still other embodiments of the invention, the IP holder provides the selected community of licensees with one or more of license management tools, purchasing opportunities, an opportunity to join a purchasing cooperative, an opportunity to share project information with other community members, an opportunity to share best practice information with other community members, an opportunity to purchase one or more of goods and services through the selected community, and an innovation center.

According to embodiments of the invention, in order to keep track of licensees, expiration dates, renewals, pricing increments and potential future sub-licenses, the IP holder provides the licensees with access to a license management system. Pricing may comprise one or more defining an initial price, pricing increments, and setting milestone price increases. The license management system is configured to issue detailed license management reports. The license management system is further configured to perform automatic communications with users. For example, the license management system is configured to automatically communicate with users regarding one or more of a fee that is due, a fee that is overdue, an issue that may arise involving the use of the licensed technology in the licensed geopolitical territory, and a user who has indicated interest in a sub-license.

According to further embodiments of the invention, the license management tools comprise one or more of a tool for performing one or more of splitting and combining, a tool for granting sublicenses to other community members, a tool for funding a project, a marketing tool, a design systems tool, a PDP tool, a use forums tool, a loan tool, a grant tool, a vendor tool, a system purchase tool, a partnership tool, a resale tool, a price change forecast tool, an NDA generation tool, a business plan building tool, a financial modeling tool, and another license management tool.

The license management system is configured to issue detailed license management reports. The license management system is further configured to perform automatic communications with users. For example, the license management system is configured to automatically communicate with users regarding one or more of a fee that is due, a fee that is overdue, an issue that may arise involving the use of the licensed technology in the licensed geopolitical territory, and a user who has indicated interest in a sub-license.

According to further embodiments of the invention, a community member that participates in the innovation center contributes IP to the community specified IP that the community member develops relating to the IP rights, wherein the contributing community member receives fees for the selected community's use of the contributed IP.

According to other embodiments of the invention, the community website comprises a comprehensive help center configured to provide users to learn about one or more of the website and the bidding process. For example, the help center may comprise one or more of user guides, answers to frequently asked questions (FAQ), a quick start guide to overview website functions including registration and bidding, an online form to submit a request for support, an online form to ask a question, information about the purpose of the auction, contact information for accessing the help center, and tutorial videos for common website actions including one or more of user registration, geopolitical territory navigation, and bidding.

User guides may be directed to one or more of user registration, the auction process, browsing for counties, and due diligence information. Geopolitical territory due diligence information may comprise one or more of applicable intellectual property, contracts, financial data, and other due diligence information.

Users requiring further assistance with the website may be directed to submit a support request through a form in the help center, or to call a toll-free number and reach a help desk with a support technician. For example, a phone number for information about one or more of the licensed technology and the licensing process may direct users seeking assistance to one or more of an employee and contractor of the IP holder.

Optionally, the IP holder provides a phone number for non-website-related support, including questions about the licensed technologies and the licensing process. Users may enroll in a training program to learn about the technology being offered for license.

According to additional embodiments of the invention, a license includes a right to extend the license upon the expiration of the original license. The IP holder may offer the licensee the option to extend its license for an additional period of time beginning upon the expiration of the original license. For example, the IP holder may offer the licensee the option to extend its license for one or more of one, two, three, and four additional years beginning upon the expiration of the original license. The right to extend the original license may be priced according to a pricing schedule that increases progressively through one or more of the second, third, fourth, and fifth years.

Alternatively, or additionally, the IP holder may make an offer of an exclusive right to a specific mode in a specific geopolitical territory. For example, the IP holder may offer a strategic partner a five-year license for a lower sum if the payment is made immediately.

According to embodiments of the invention, this offer can be made prior to the beginning of the auction of the specific mode in the specific geopolitical territory. Alternatively, the offer can be made prior to announcement of an auction winner.

An extended license lasting up to five years can allow a company to investigate, develop, finance and build a facility to capitalize on the technology. According to embodiments of the invention, the IP holder agrees to license the technology for at least one mode in at least one geopolitical territory. The strategic partner thereby may purchase a five-year time window during which it can evaluate the technology and market to determine next steps without competitive pressure.

According to other embodiments of the invention, the amount of the winning bid may be used to determine three separate prices for the various modes in the relevant geopolitical territory:

Bid Price. According to embodiments of the invention, the winning bid grants a license providing the licensee with an exclusive right for a period of time to investigate one or more of the technology, the site, and any other issues of interest. For example, the period of time during which the license provides the licensee with the exclusive rights mentioned above is one year. For example, the period of time is three years. For example, the period of time is six months. For example, the period of time is another period of time. The licensee has the right to elect not to pursue the technology.

Hold Price. According to other embodiments of the invention, using a pre-established hold price formula, a hold price is computed as a multiple of the winning bid price. The hold price establishes the cost to the licensee of extending the license into additional years. Presumably, this will most commonly, although not necessarily, be done when the licensee wishes to explore developing the project. A licensee who fails to make an extension payment has the license automatically terminated without penalty. For example, the hold price formula may call for payment in year two of 1.5 times the license, payment in year three of two times the fee, payment in year four of 2.5 times the fee, and payment in year five of three times the fee. Using this example, and assuming an initial winning bid and fee of $5,000, the total cost of a license for the five-year period is $50,000.

Minimum Operating Fee. According to further embodiments of the invention, using a pre-established operating fee formula, a minimum operating fee for an operating waste management system once a facility is built under the license can be computed as a multiple of the winning bid price. A licensee who fails to make an extension payment has the license automatically terminated without penalty. For example, the minimum operating fee formula may call for payment of ten times the fee, which in this example is $50,000.

Optionally, the IP holder can elect to receive either the minimum fee or a fixed rate per ton of annual capacity. For example, the fixed rate might be $2.50 per ton of annual capacity. A 100,000-ton per year system may, for example, have a minimum fee of $250,000 per year, a fee of less than 5% of anticipated net income.

One opportunity for the licensee to recover the investment even before the first system is built may be to issue sub-licenses to operators in other modes acquired, such as medical waste or biomass, or for specific geographic regions within the geopolitical territory, such as a city. Provided the primary licensee makes its fee payments, the IP holder may generate and recognize these sublicenses for a flat fee. If the primary licensee fails to make its payments, the IP holder can offer one or more sub-licensees the option to acquire the superior rights.

According to further embodiments of the invention, the IP holder provides a license management system configured to track issued licenses, including one or more of licensee payment history, license renewal dates and information pertaining to any holders of any sub-licenses.

According to still further embodiments of the invention, the IP holder provides to a community member a community member website. The community member website comprises one or more of information about the specified IP to which the community member has a license, information regarding the geographic location to which the license pertains, and information input by the community member. The community member website may be automatically generated. The community member website may be a subset of the community website.

According to other embodiments of the invention, the IP holder provides users with one of two or more different access levels to system information depending on an authorization level of the user.

For example, the IP holder providers users with one of six different access levels to system information. For example, a zeroth access level provides public information to any user. For example, unregistered users gain access only to high-level corporate marketing content.

For example, a first access level provides a registered user who has created a user name and password but has not filled out all the documentation to qualify as a bidder with a first level of information.

For example, a second access level provides bidder information to registered users who sign an NDA and have completed the steps necessary for eligibility to bid on active auctions. For example, the steps to become an eligible bidder comprises one or more of reading terms and conditions, understanding terms and conditions, agreeing to terms and conditions, indicating financial security, and successfully completing a background check. For example, bidder information comprises one or more of NDA-level files and NDA-level information.

For example, a third access level provides licensee information to licensees that have joined the selected community of licensees. For example, licensee information comprises information for holders of global distribution rights.

For example, a fourth access level provides information to holders of product development packages (PDPs). For example, a PDP is a final design that is ready to be manufactured.

For example, a fifth access level provides investor information to investors. For example, investors comprise entities that have invested financially in the IP holder.

According to still further embodiments of the invention, the IP holder provides users with a calculator for calculating the potential value of the IP rights, wherein: the zeroth access level provides the users with the results of the calculator; the first access level provides the registered users with the results of the calculator and with full capital expenditure information from the calculator; the second access level provides the registered users who sign the non-disclosure agreement with the results of the calculator, with the full capital expenditure information from the calculator, and with underlying methods of the calculator; the third access level provides the licensees with the results of the calculator, with the full capital expenditure information from the calculator, with the underlying methods of the calculator, and with an option to customize the calculator; the fourth access level provides community members with the results of the calculator, with the full capital expenditure information from the calculator, with the underlying methods of the calculator, with the option to customize the calculator, and with an option to modify the calculator to reflect selected community projects; and the fifth access level provides community members with the results of the calculator, with the full capital expenditure information from the calculator, with the underlying methods of the calculator, with the option to customize the calculator, with an option to modify the calculator to reflect selected community projects, and with an option to modify the underlying methods of the calculator.

According to other embodiments of the invention, a first user that refers a second user that subsequently becomes a licensee is eligible to receive a referral fee. The first user may be eligible to have the referral fee donated to a charity selected by the first user. The referral fee may be a percentage of the fee paid by the licensee. For example, the referral fee is 5% of the fee paid by the licensee. For example, aggregation of such charitable contributions may have an impact on one or more of a local, metropolitan, regional, county, state, national, and global level.

According to further embodiments of the invention, should a licensee default on payment of the fees or renewal of the license, the IP rights will be re-auctioned through a process beginning with first notice of website users who were authorized to participate in an earlier auction of the IP rights.

The UI can be one or more of text-based, map-based, and another UI. FIGS. 1-24 depict screenshots of examples using a text-based UI. FIGS. 25-32 depict screenshots of examples using a map-based UI.

FIG. 1 is a wireframe on a community website of a text-based home page UI 100 for the e-commerce system. Depicted are a corner box 102, a lefthand menu 104, a login box 106, and a contact information box 108. The corner box 102 comprises corner box text 110. The lefthand menu 104 comprises a products button 112, an active auctions button 114, an information button 116, a press button 118, and a contact button 120. The login box 106 comprises a user name box 121, a password box 122, a forgotten password link 123, a login box 124, and a signup box 125. The contact information box 108 comprises a contact information title 126 and contact information text 127.

Also depicted are a featured auction box 128, an introduction box 130, a context box 135, and an auction finder box 140. The featured auction box 128 comprises a featured auction title 142, featured auction text 144, and featured auction buttons 145. The featured auction buttons 145 comprise a first view auction button 146A, a second view auction button 146B, a featured auction information button 148, and a featured auction referral button 150.

The introduction box 130 comprises an introduction box title 152, introduction box text 154, and introduction box button 156. The introduction box button 156 comprises an introduction box information button 156. The content box 135 comprises a content box title 158, content box text 160, and content box media 162. The content box media 162 comprises one or more of content box audio 162 and content box video 162. In this example, the content box media 162 comprises content box video 162. The auction finder box 140 comprises an auction finder box title 164, an auction finder search box 166, and auction finder buttons 168. The auction finder buttons 168 comprise an active auction browse button 170, a product browse button 172, and an auction finder referral button 174.

Figure 2:
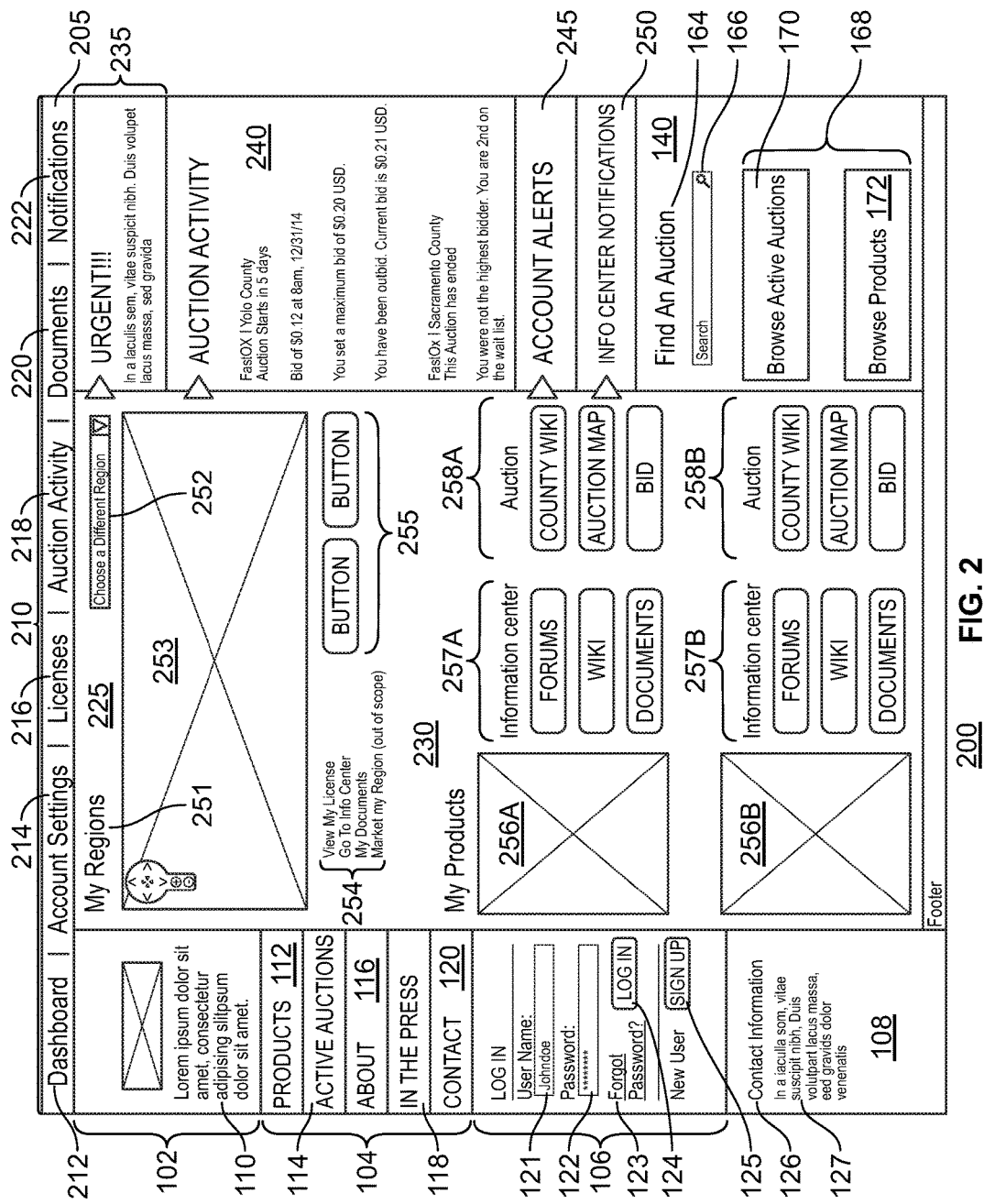
FIG. 2 is a wireframe on a community website of a text-based user dashboard UI for the e-commerce system.

FIG. 2 is a wireframe on a community website of a text-based user dashboard UI 200 for the e-commerce system. Again depicted are the corner box 102, the lefthand menu 104, the login box 106, and the contact information box 108. The corner box 102 again comprises the corner box text 110. The lefthand menu 104 again comprises the products button 112, the active auctions button 114, the information button 116, the press button 118, and the contact button 120. The login box 106 again comprises the user name box 121, the password box 122, the forgotten password link 123, the login box 124, and the signup box 125. The contact information box 108 again comprises the contact information title 126 and the contact information text 127. The auction finder box 140 again comprises the auction finder box title 164 and the auction finder buttons 168. The auction finder buttons 168 again comprise the active auction browse button 170 and the product browse button 172.

The UI 200 further comprises a top menu 205 comprising top menu buttons 210. In this example, the top menu buttons 210 comprise a dashboard button 212, an account setting button 214, a licenses button 216, an auction activity button 218, a documents button 220, and a notifications button 222.

The UI 200 further comprises a my regions box 225, a my products box 230, an urgent notification box 235 comprising one or more urgent notifications to the user, an auction activity box 240, an account alerts box 245 comprising one or more account alerts for the user, and a notifications box 250 comprising one or more notifications for the user. The my regions box 225 comprises a my regions box title 251, a region selection drop-down menu 252, a thumbnail region map 253, my regions box resource links 254, and my regions box buttons 255. The my regions box resource links comprise, for example, a license viewing link, an information center link, a link to the user's documents, and a region marketing link.

The my products box 230 comprises, for example, a first my products image 256A, a second my products image 256B, first my products information center buttons 257A, second my products information center buttons 257B, first my products information center auction buttons 258A, and second my products information center auction buttons 258B. The information center buttons comprise, for example, a forums button, a Wiki button, and a documents button. The auction buttons comprise, for example, a county Wiki button, an auction map button, and a bid button.

The auction activity box 240 comprises one or more auction summaries. In this example, the auction activity box comprises a summary of an auction relating to Yolo County and a summary of an auction relating to Sacramento County.

Figure 3:
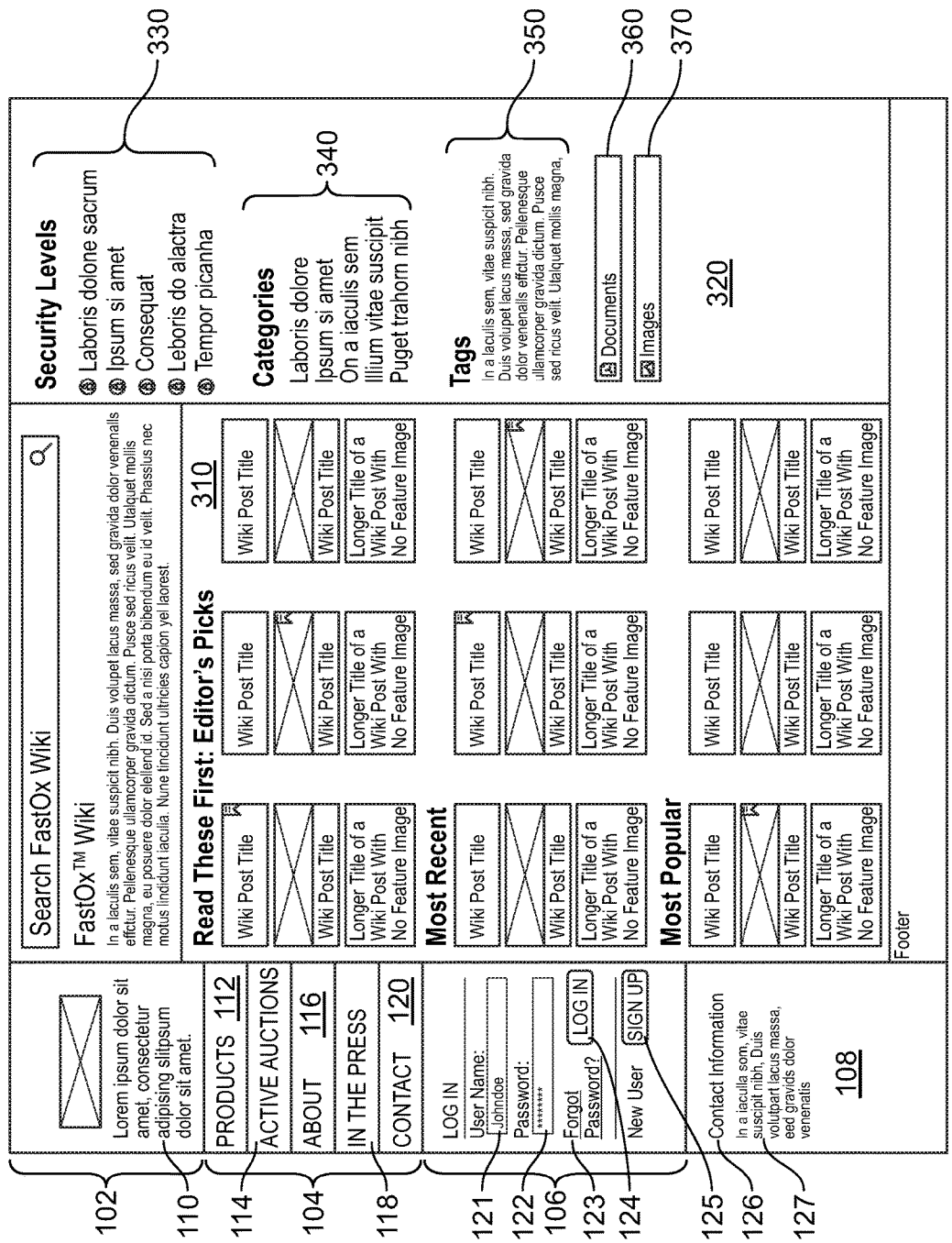
FIG. 3 is a wireframe on a community website of a text-based Forum landing page UI for the e-commerce system.

FIG. 3 is a wireframe on a community website of a text-based Forum landing page UI 300 for the e-commerce system. The UI 300 comprises Forum posts 310 and Forum information 320. The Forum information 320 comprises, for example, security levels 330, categories 340, tags 350, documents 360, and images 370.

Figure 4:
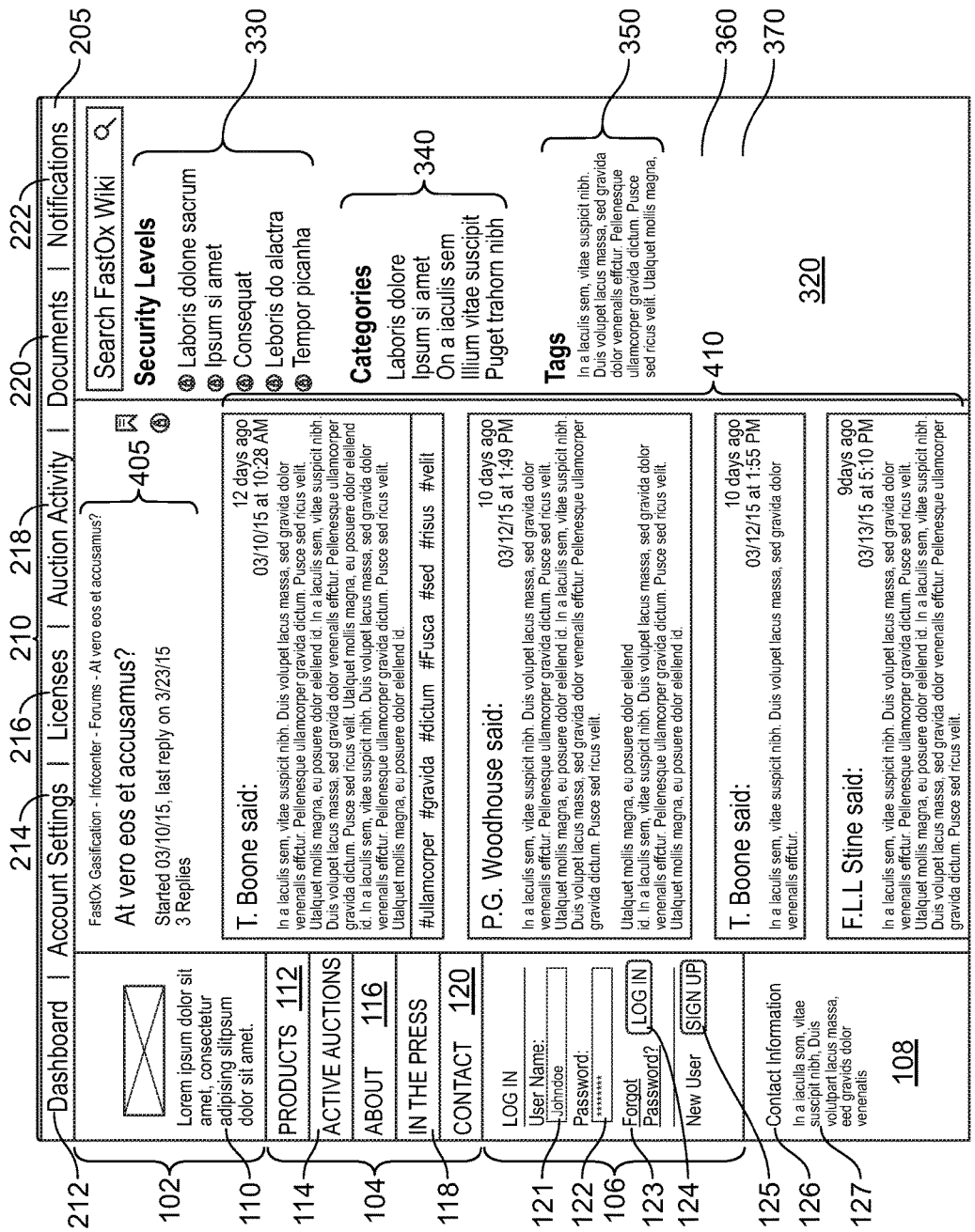
FIG. 4 is a wireframe on a community website of a text-based Forum posts comment thread UI for the e-commerce system.

FIG. 4 is a wireframe on a community website of a text-based Forum post comments thread UI 400 for the e-commerce system. The UI 400 comprises, for example, Forum post summary text 405 and a discussion box 410. The discussion box 410 comprises, for example, comments on an article. The UI 400 further comprises, for example, a comment box 420. The comment box 420 is configured to allow a user to input a comment regarding the discussion box 410. The UI 400 again comprises the Forum information 320. The Forum information 320 again comprises, for example, the security levels 330, the categories 340, the tags 350, the documents 360, and the images 370

Figure 5:
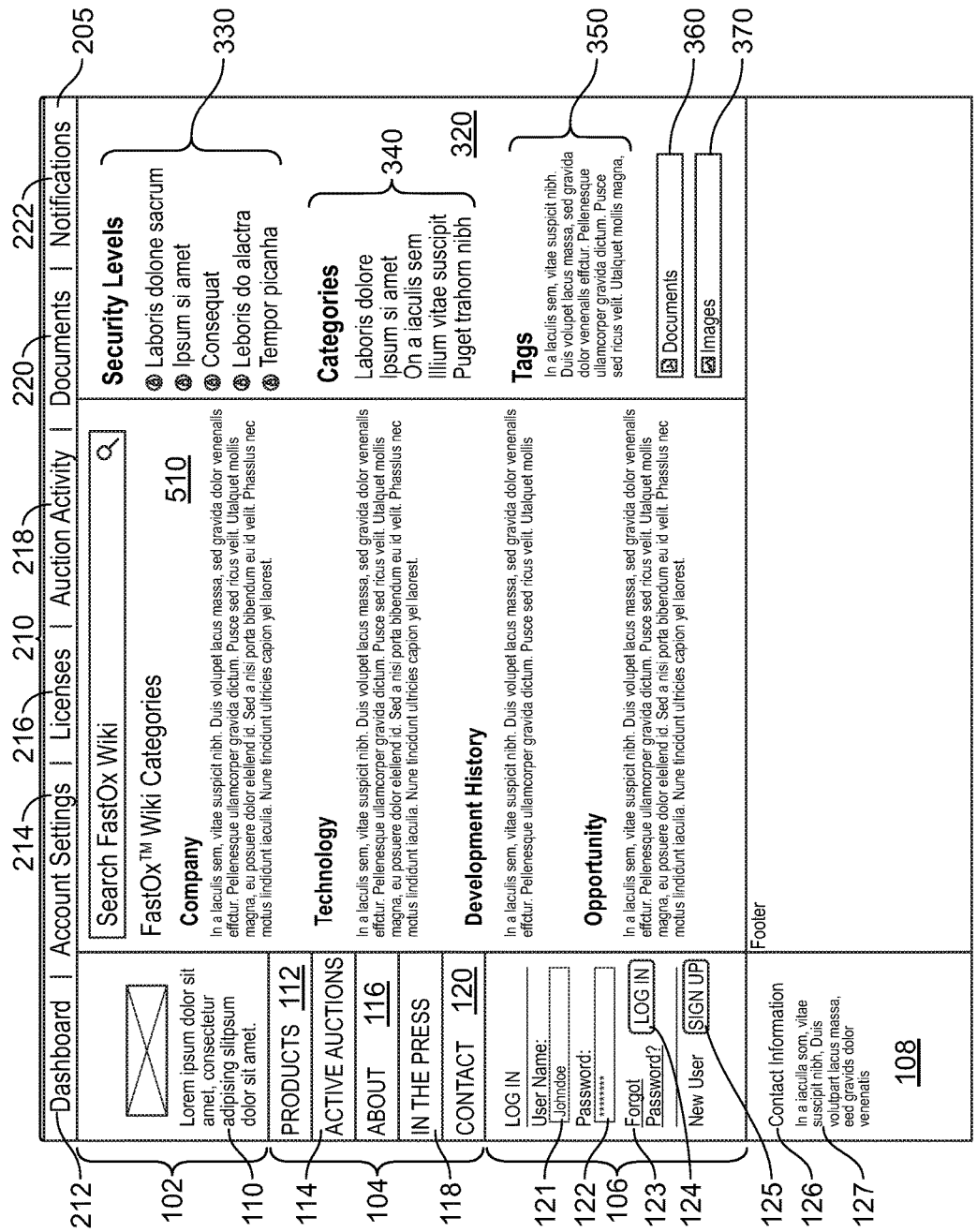
FIG. 5 is a wireframe on a community website of a text-based Wiki landing page UI for the e-commerce system.

FIG. 5 is a wireframe on a community website of a text-based Wiki landing page UI 500 for the e-commerce system. The UI 500 comprises a Wiki list of comma-delimited sub-categories 510. The Wiki comma-delimited sub-categories list 510 comprises, for example, company categories, technology categories, development history categories, and opportunity categories. The UI 500 comprises Wiki posts 510.

Figure 6:
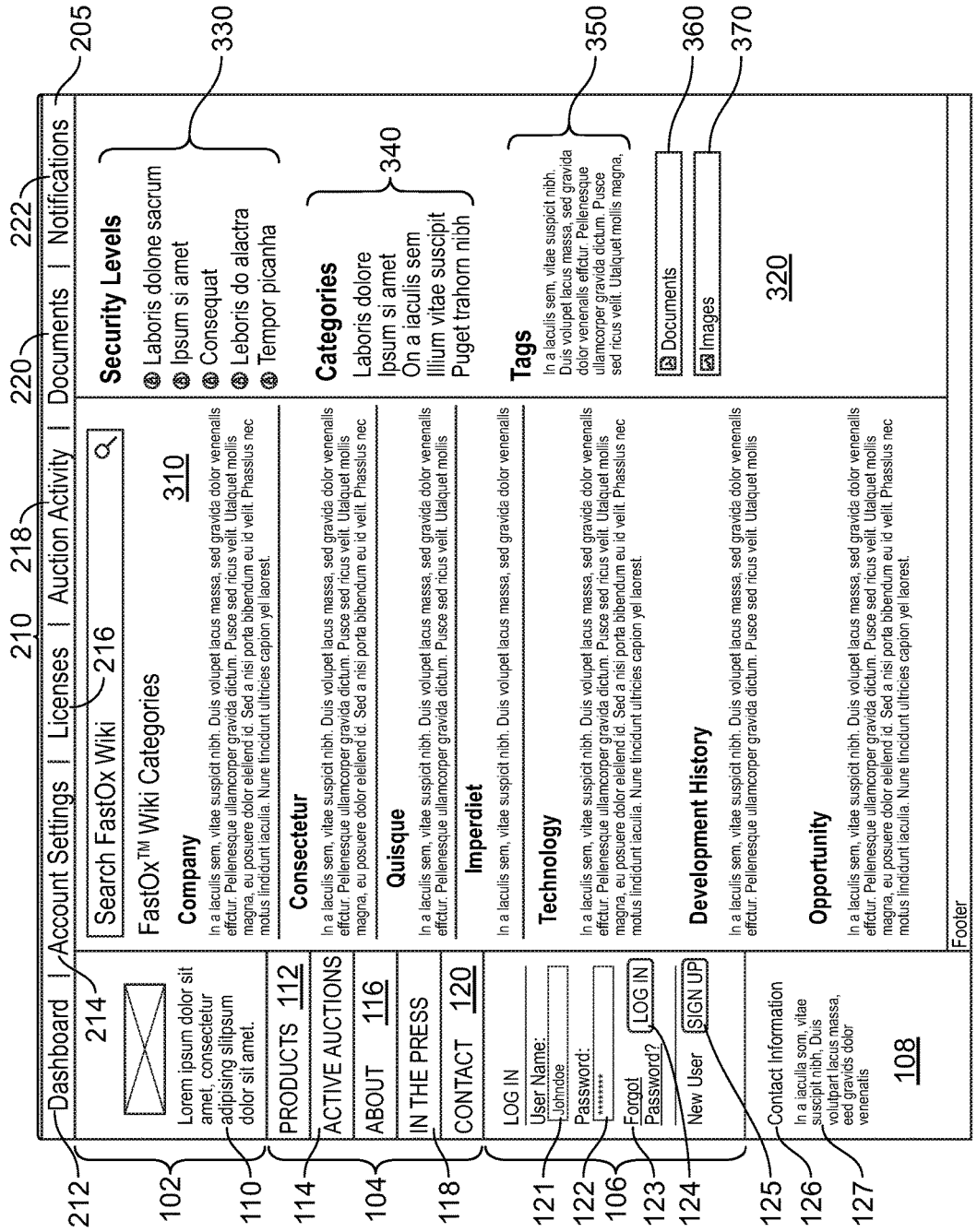
FIG. 6 is a wireframe on a community website of a text-based Wiki category view UI for the e-commerce system.

FIG. 6 is a wireframe on a community website of a text-based Wiki category view UI 600 for the e-commerce system. The UI 600 comprises a Wiki list 610 of comma-delimited sub-categories. The Wiki comma-delimited sub-categories list 610 comprises, for example, company categories, technology categories, development history categories, and opportunity categories. The UI 600 again comprises the Forum information 320. The Wiki information again comprises, for example, the security levels 330, the categories 370, the tags 380, the documents 390, and the images 600.

Figure 7:
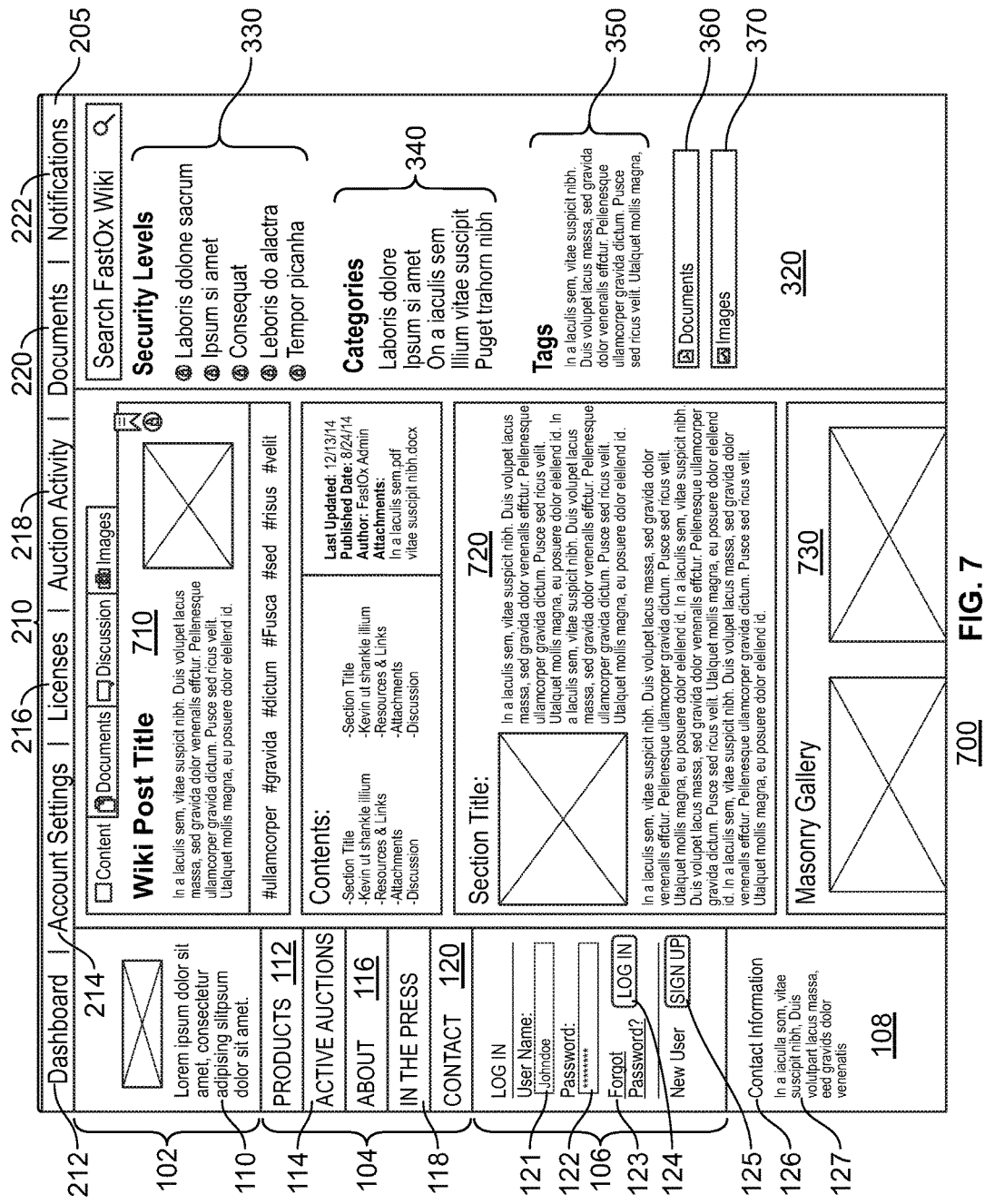
FIG. 7 is a wireframe on a community website of a text-based expanded Wiki category view UI for the e-commerce system.
Figure 7:
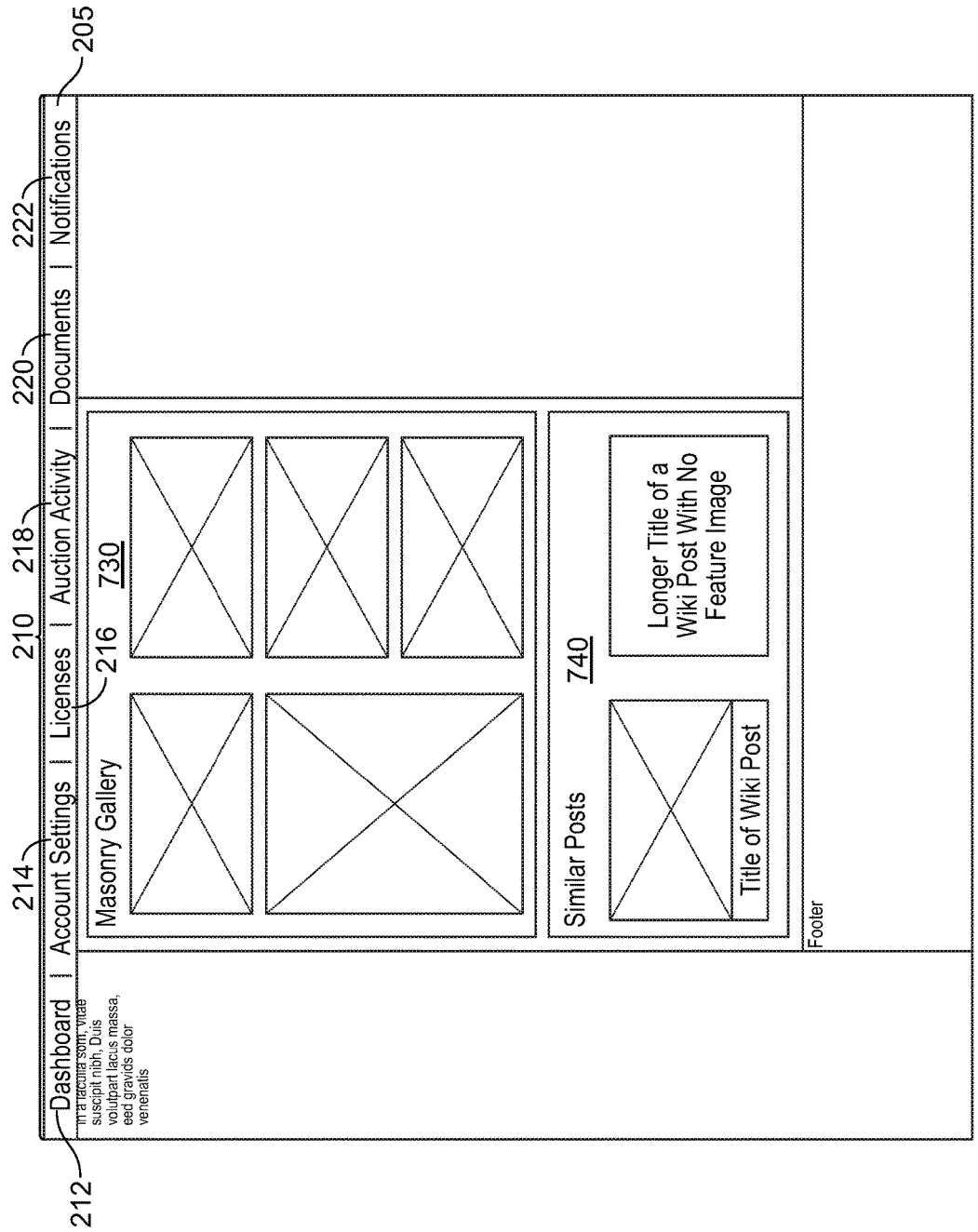

FIG. 7 is a wireframe on a community website of a text-based expanded Wiki category view UI 700 for the e-commerce system. The UI 700 comprises a Wiki post title box 710, a section title box 720, a masonry gallery 730, and a similar posts box 740.

Figure 8:
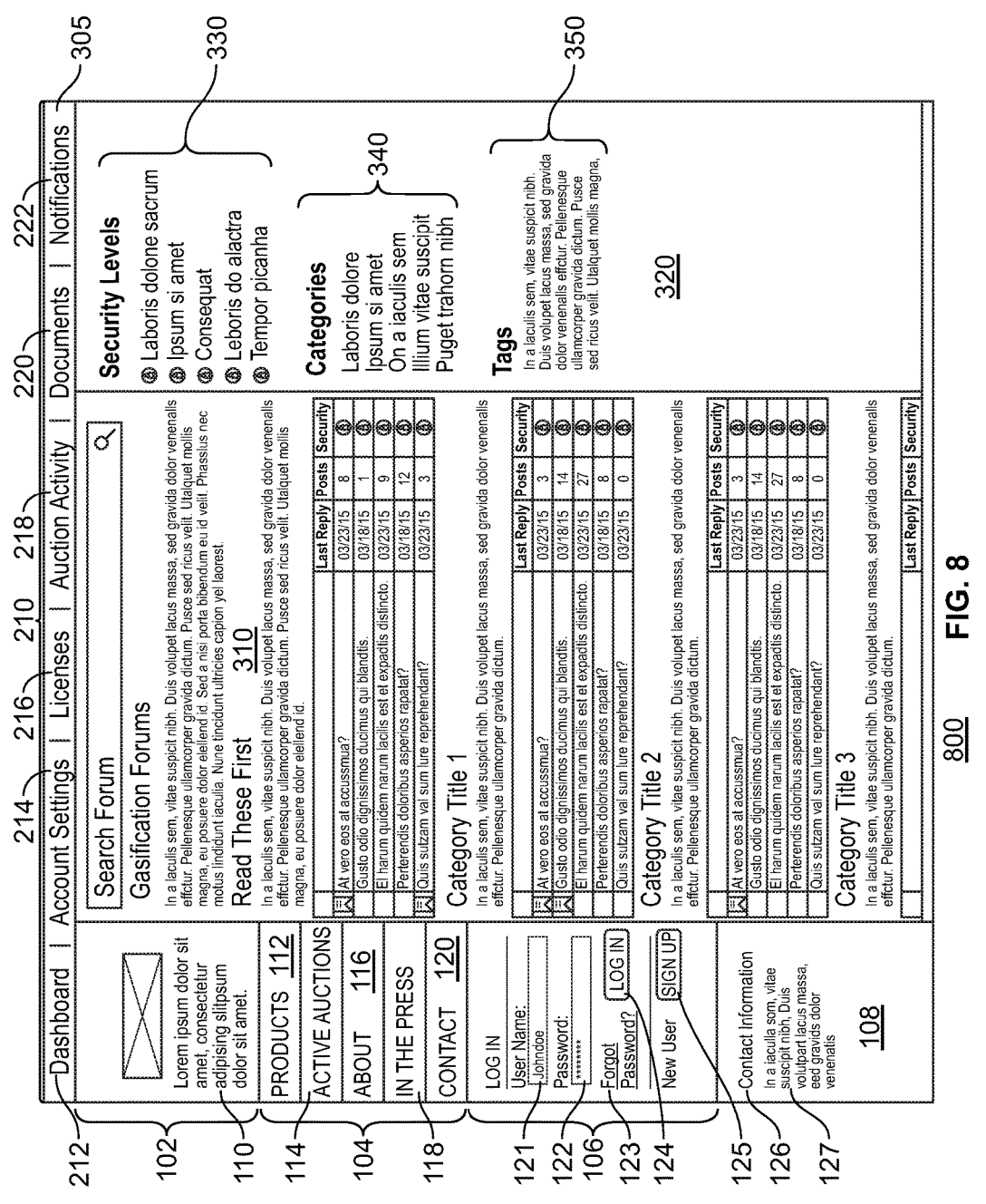

FIG. 8 is a wireframe on a community website of a text-based Wiki post comments page UI 800 for the e-commerce system. The UI 800 comprises, for example, Wiki post summary text 805 and a discussion box 810. The discussion box 810 comprises comments and responses by several individuals. The discussion box 810 further comprises, for example, a comment box 820. The comment box 820 is configured to allow a user to input a comment regarding the discussion box 810.

Figure 9:
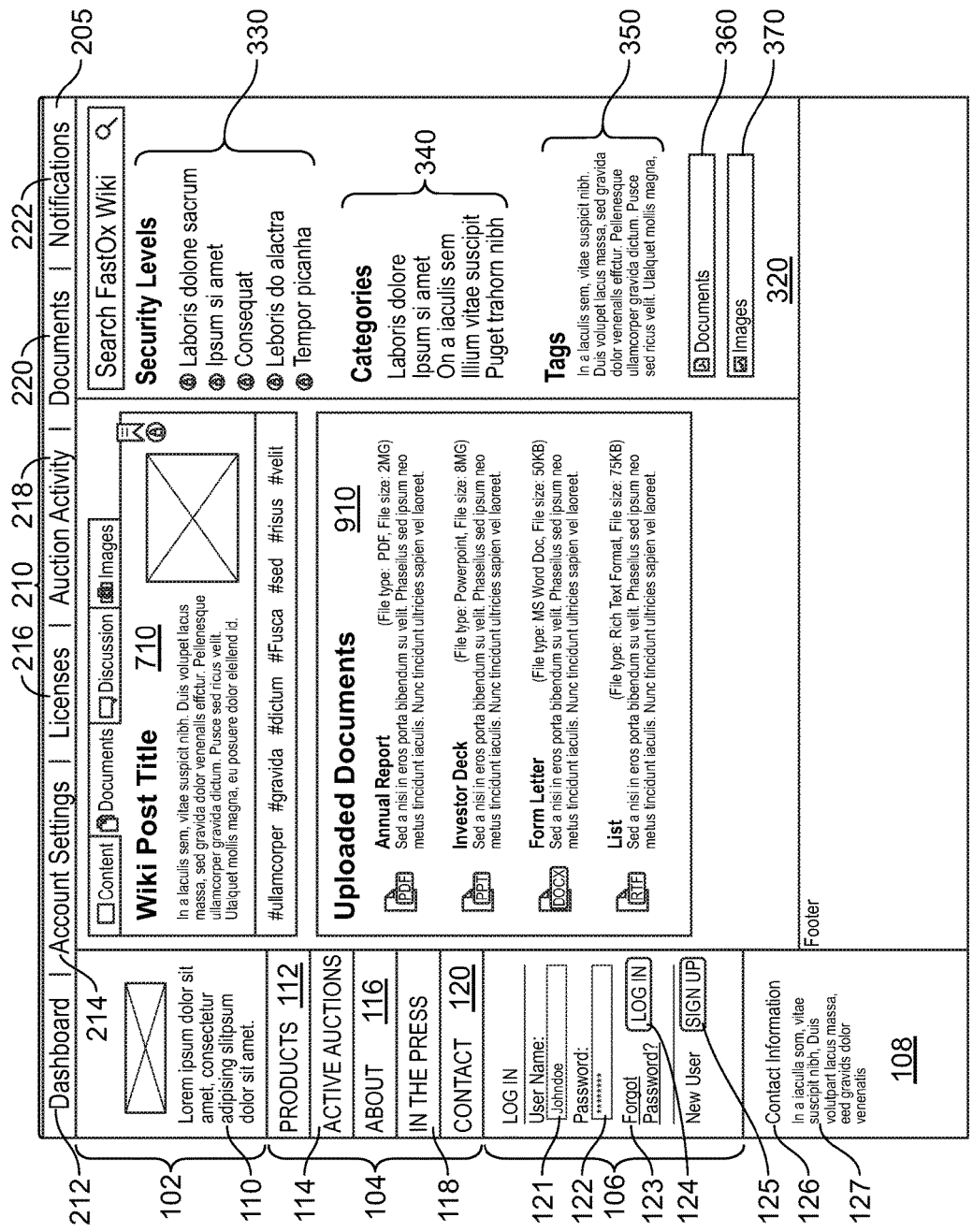
FIG. 9 is a wireframe on a community website of a text-based Wiki post attached documents page UI for the e-commerce system.

FIG. 9 is a wireframe on a community website of a text-based Wiki post attached documents page UI 900 for the e-commerce system. The UI 900 again comprises the Wiki post title box 710. The UI 900 further comprises an uploaded documents box 910. The uploaded documents box comprises, for example, an annual report, an investor deck, a form letter, and a list.

Figure 10:
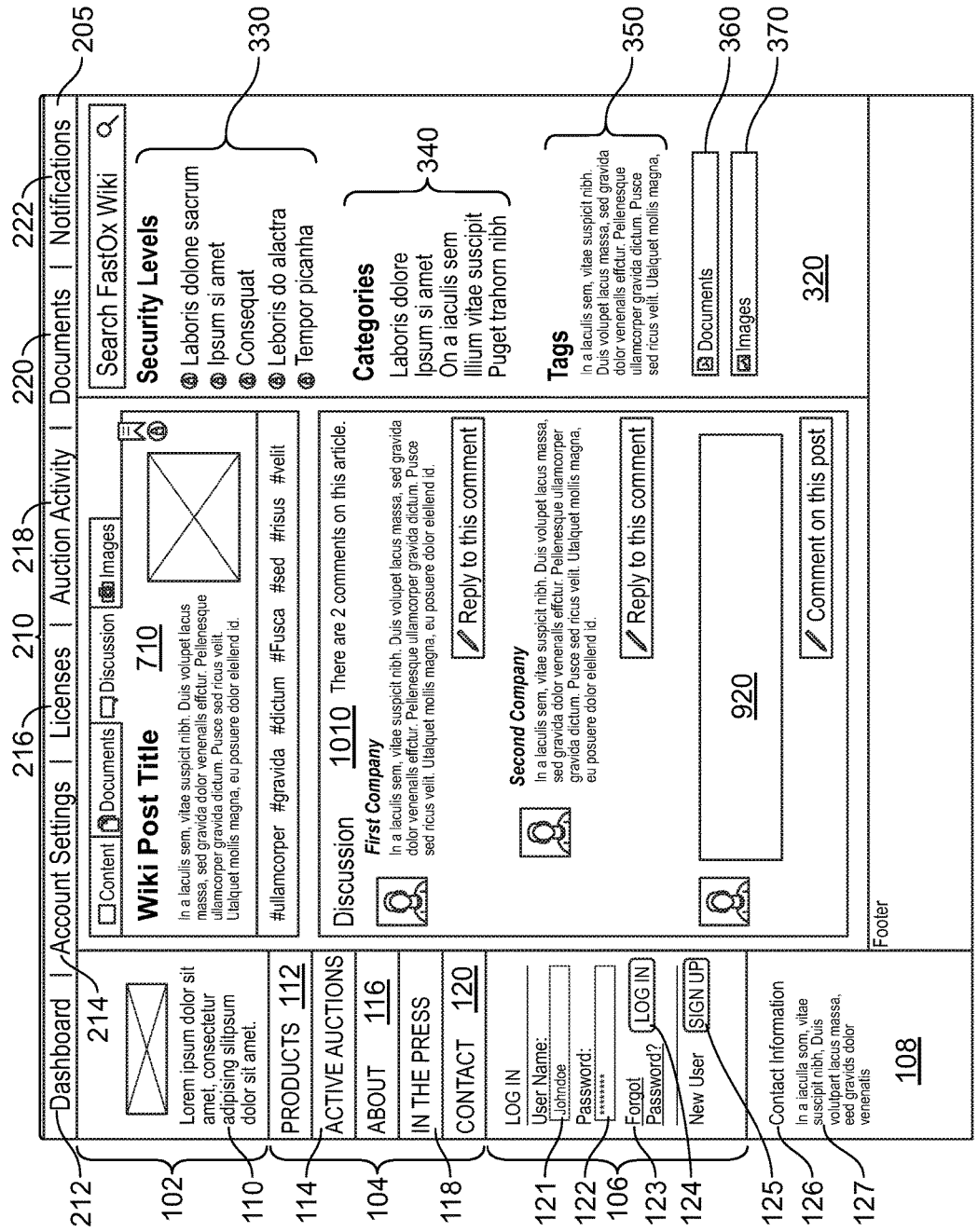
FIG. 10 is a wireframe on a community website of a text-based Wiki post comments page UI for the e-commerce system.

FIG. 10 is a wireframe on a community website of a text-based Wiki post comments page UI 1000 for the e-commerce system. The UI 1000 comprises a discussion box 1010. The discussion box 1010 comprises, for example, comments on an article comprises in the Wiki post title box 810. In this example, an employee of a the first company comments on the Wiki post title box 810 and an employee of the second company responds to this comment. The discussion box 1010 further comprises, for example, a comment box 1020. The comment box 1020 is configured to allow a user to input a comment regarding the discussion box 1010.

Figure 11:
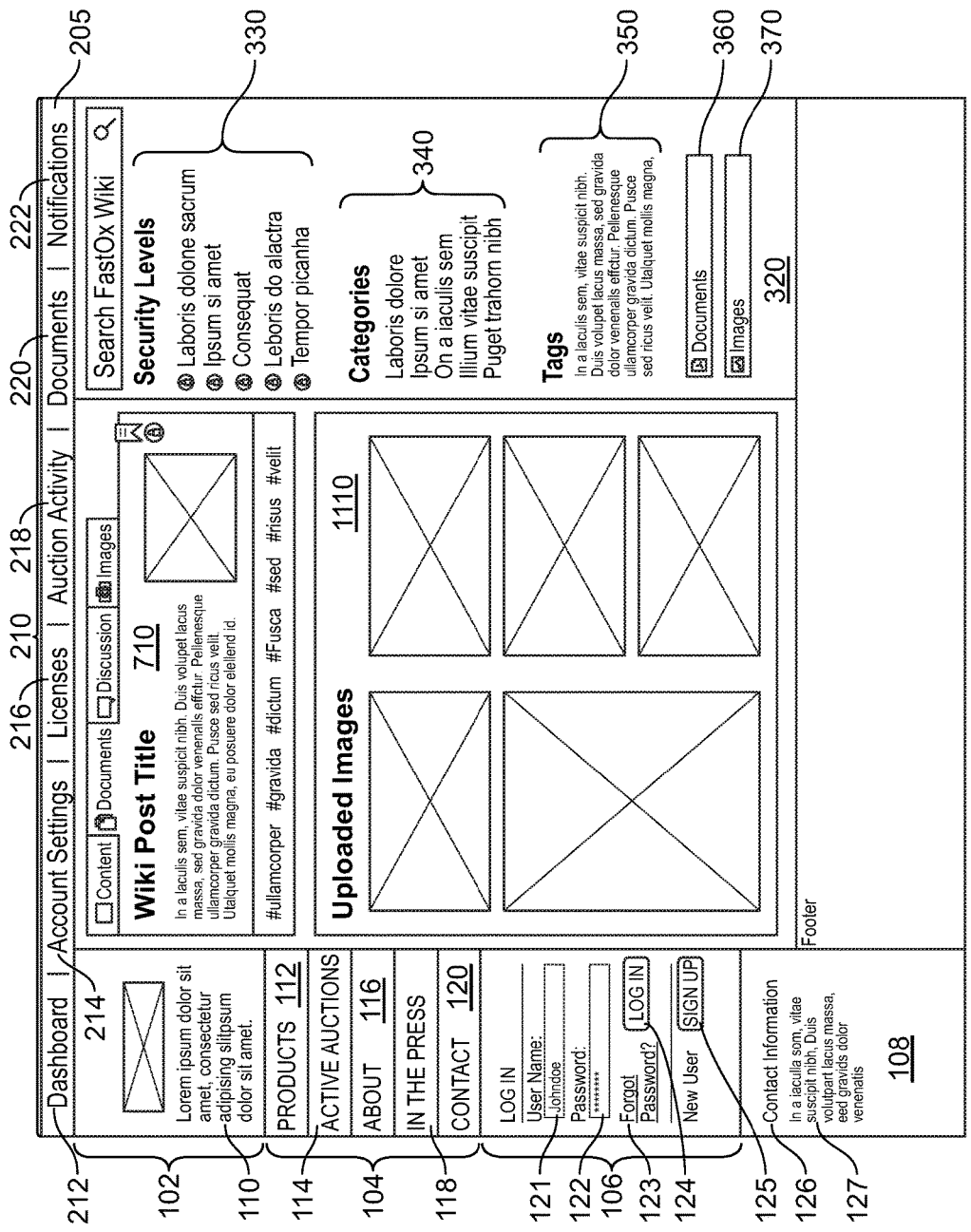
FIG. 11 is a wireframe on a community website of a text-based Wiki post attached images page UI for the e-commerce system.

FIG. 11 is a wireframe on a community website of a text-based Wiki post attached images page UI 1100 for the e-commerce system. The UI 1100 comprises uploaded images 1110.

Figure 12:
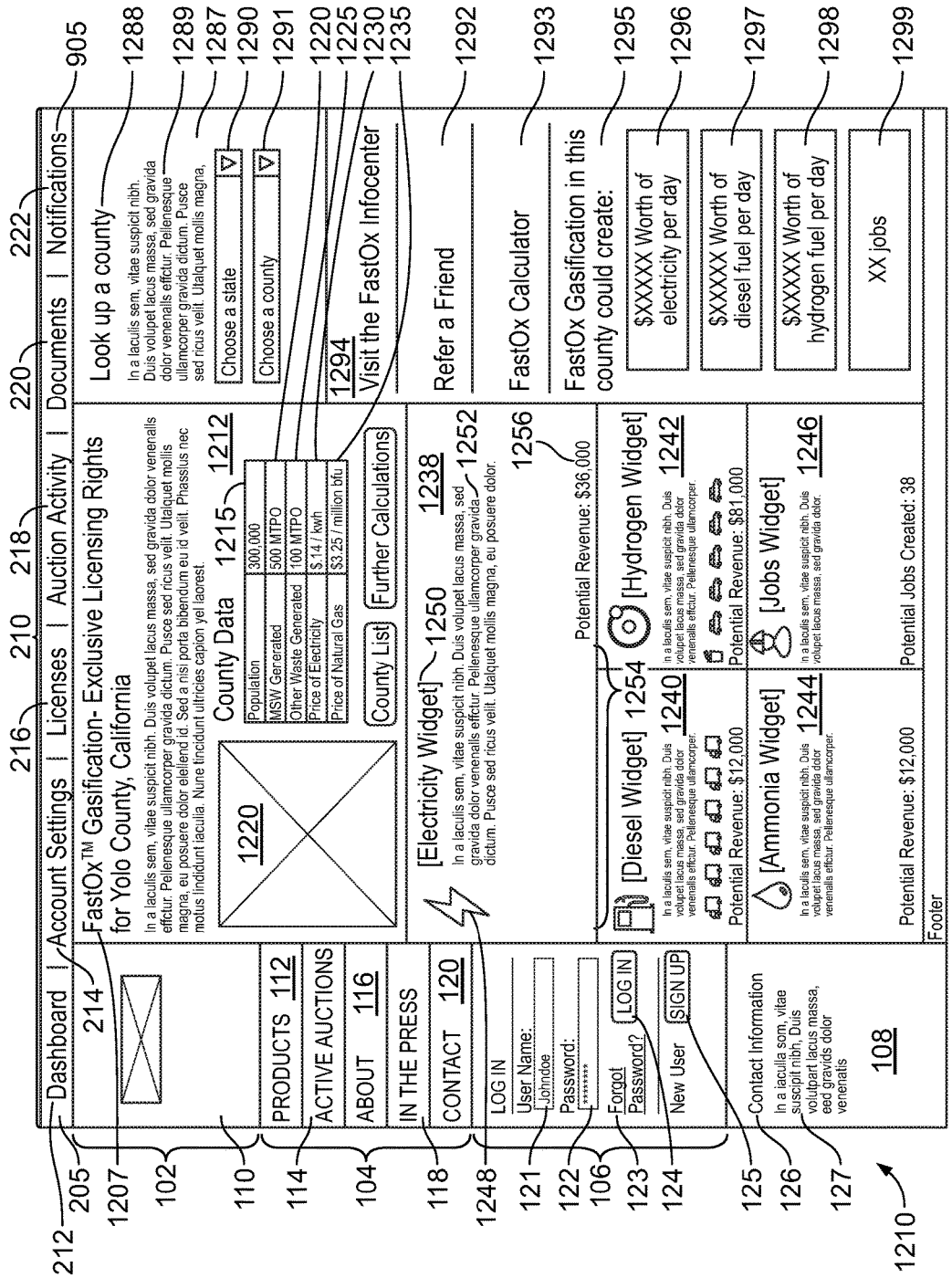
FIG. 12 is a wireframe on a community website of a text-based UI at a county level for the e-commerce system, showing county Wiki information for a county.

FIG. 12 is a wireframe on a community website of a text-based UI 1200 at the county level for the e-commerce system, showing county Wiki information for a county. In this example, the county shown is Yolo County, Calif. Depicted are the top menu 205, the lefthand menu 110, the login box 115, the contact information 120, a county Wiki licensing text 1207, a county map 1210, and a county data text box 1212.

The county map 1220 displays a miniature map of the county. The county data text box 1240 provides information on the county. In this example, the county data text box 1240 comprises information for the county including population box 1215, MSW generated box 1220, other waste generated box 1225, a price box 1230, and a natural gas price box 1235. In this example, the population box 1215 displays a county population of approximately 300,000. In this example, the MSW generated box 1220 displays a county MSW generation of approximately 500 metric tons per day (MTPD). In this example, the other waste generated box 1225 displays a county generation of other waste of approximately 100 MTPD. In this example, the electricity price box 1230 displays a price for electricity in the county of approximately fourteen cents ($0.14) per kilowatt hour (kwh). In this example, the natural gas price box 1235 displays a price for natural gas in the county of approximately $3.25 per million British thermal units (BTU).

The text-based UI 1200 further comprises an electricity widget 1238, a diesel widget 1240, a hydrogen widget 1242, an ammonia widget 1244, and a jobs widget 1246.

The electricity widget 1238 provides county-level details on one or more of electricity generation, value of electricity generated, and other electricity-related information. The electricity widget 1238 comprises electricity widget icon 1248, electricity widget title 1250, electricity widget text box 1252, and electricity widget potential revenue text 1256. Here, the electricity widget potential revenue text 1256 displays, "Potential Revenue: $36,000," referring to the potential annual revenue from electricity in the county.

The diesel widget 1240 provides county-level details on one or more of diesel generation, value of diesel generated, and other diesel-related information. The diesel widget 1240 comprises diesel widget title 1260, diesel widget text box 1262, diesel widget generation icons 1264, and diesel widget potential revenue text 1266. Here, the diesel widget potential revenue text 1266 displays, "Potential Revenue: $12,000," referring to the potential annual revenue from diesel in the county.

The hydrogen widget 1242 provides county-level details on one or more of hydrogen generation, value of hydrogen generated, and other hydrogen-related information. The hydrogen widget 1242 comprises hydrogen widget title 1270, hydrogen widget text box 1272, hydrogen widget generation icons 1274, and hydrogen widget potential revenue text 1276. Here, the hydrogen widget potential revenue text 1276 displays, "Potential Revenue: $81,000," referring to the potential annual revenue from hydrogen in the county.

The ammonia widget 1244 provides county-level details on one or more of ammonia generation, value of ammonia generated, and other ammonia-related information. The ammonia widget 1244 comprises ammonia widget title 1278, ammonia widget text box 1279, ammonia widget generation icons 1280, and ammonia widget potential revenue text 1281. Here, the ammonia widget potential revenue text 1281 displays, "Potential Revenue: $12,000," referring to the potential annual revenue from ammonia in the county.

The jobs widget 1246 provides county-level details on one or more of jobs generated, value of jobs generated, and other jobs-related information. The jobs widget 1246 comprises jobs widget title 1283, jobs widget text box 1284, jobs widget generation icons 1285, and jobs widget text 1286. Here, the jobs widget text 1286 displays, "Potential Jobs Created: 39," referring to the lifetime number of jobs created in the county.

The text-based UI 1200 further comprises county lookup box 1287. County lookup box 1287 is configured to enable a user to look up another county of interest. The county lookup box 1287 comprises county lookup box title 1288, county lookup box text 1289, county lookup box state drop-down menu 1290, and county lookup box county drop-down menu 1291.

The text-based UI 1200 further comprises friend referral button 1292. Friend referral button 1292 enables a user to refer a friend to the e-commerce system. The text-based UI 1200 further comprises calculator button 1293. The calculator button 1293 enables a user to make calculations via the text-based UI 1200. The text-based UI 1200 further comprises information center button 1294. The information center button 1295 enables a user to visit an information center that is part of the community website. For example, the information center button 1295 enables a user to visit an information center website.

The text-based UI 1200 further comprises gasification information text 1295. For example, the gasification information text 1295 may introduce a first gasifier generation banner 1296. For example, the first gasifier generation banner 1296 states the dollar value of electricity generated per day via gasification in the county of interest, in this case, Yolo County, Calif. For example, the gasification information text 1295 may introduce a second gasifier generation banner 1297. For example, the second gasifier generation banner 1297 states the dollar value of diesel fuel generated per day via gasification in the county of interest, in this case, Yolo County, Calif. For example, the gasification information text 1295 may introduce a third gasifier generation banner 1298. For example, the third gasifier generation banner 1298 states the dollar value of hydrogen fuel produced per day via gasification in the county of interest, in this case, Yolo County, Calif. For example, the gasification information text 1298 may introduce a fourth gasifier generation banner 1299. For example, the fourth gasifier generation banner 1299 states the number of jobs produced via gasification in the county of interest, in this case, Yolo County, Calif.

FIG. 13 is a Wiki content taxonomy 1300 for the e-commerce system. In this example, the Wiki content taxonomy 1300 comprises thirteen categories, each of which comprises at least two sub-categories. For example, the first category 1310 comprises a Sierra Energy/Corporate Overview 1310. The Sierra Energy/Corporate Overview 1310 comprises four sub-categories in the Wiki content taxonomy 1300.

Figure 14:
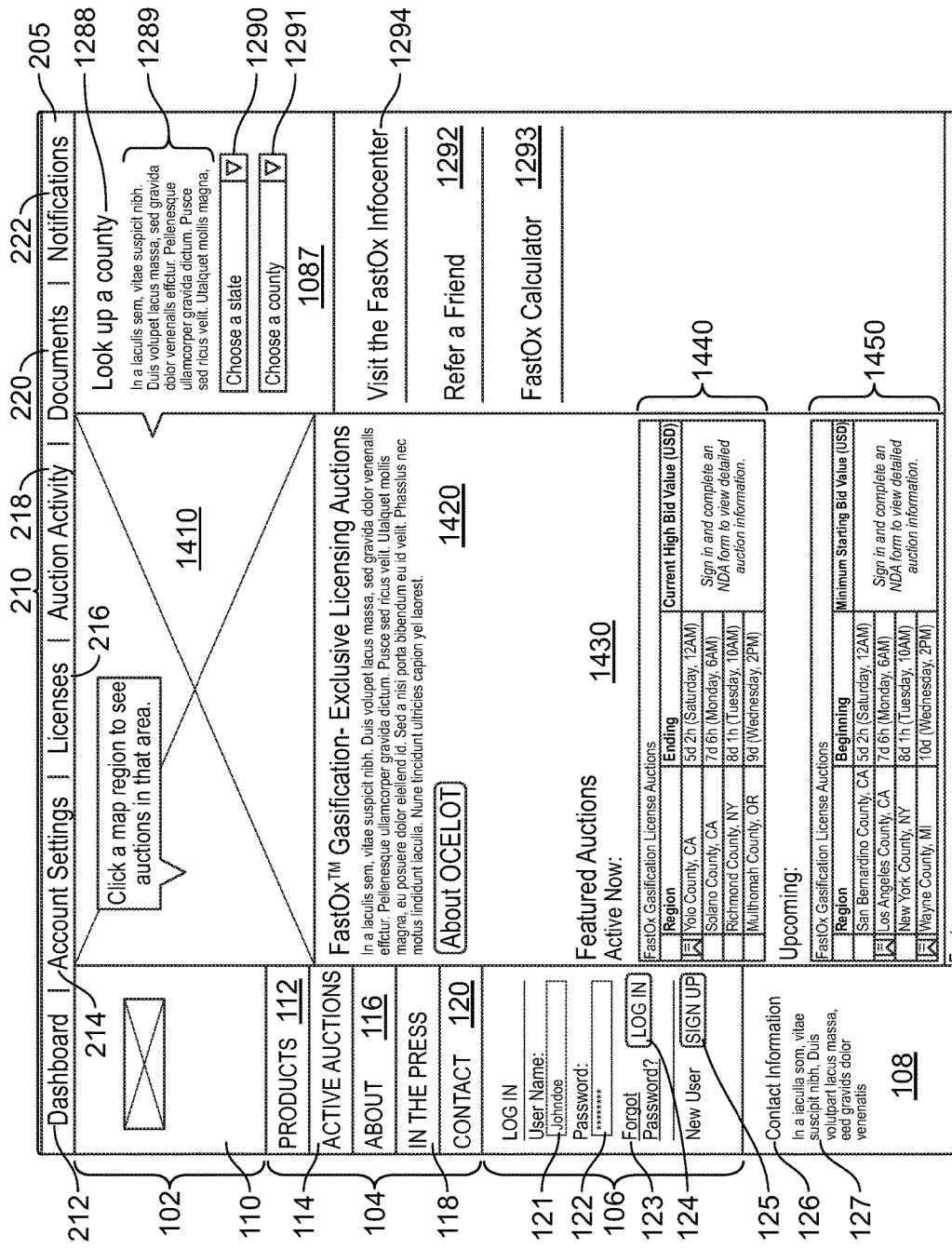
FIG. 14 is a wireframe on a community website of a text-based authenticated auctions landing page UI for the e-commerce system.

FIG. 14 is a wireframe on a community website of a text-based authenticated auctions landing page UI 1400 for the e-commerce system. The county lookup box 1287 again comprises county lookup box title 1288, county lookup box text 1289, county lookup box state drop-down menu 1290, and county lookup box county drop-down menu 1291. The UI 1400 further comprises an auctions landing page map 1410, an auction licensing box 1420, and a featured auctions box 1430. The featured auctions box 1430 comprises, for example, an active auctions box 1440 and an upcoming auctions box 1450. The UI 1400 again comprises the county lookup box 1287.

Figure 15:
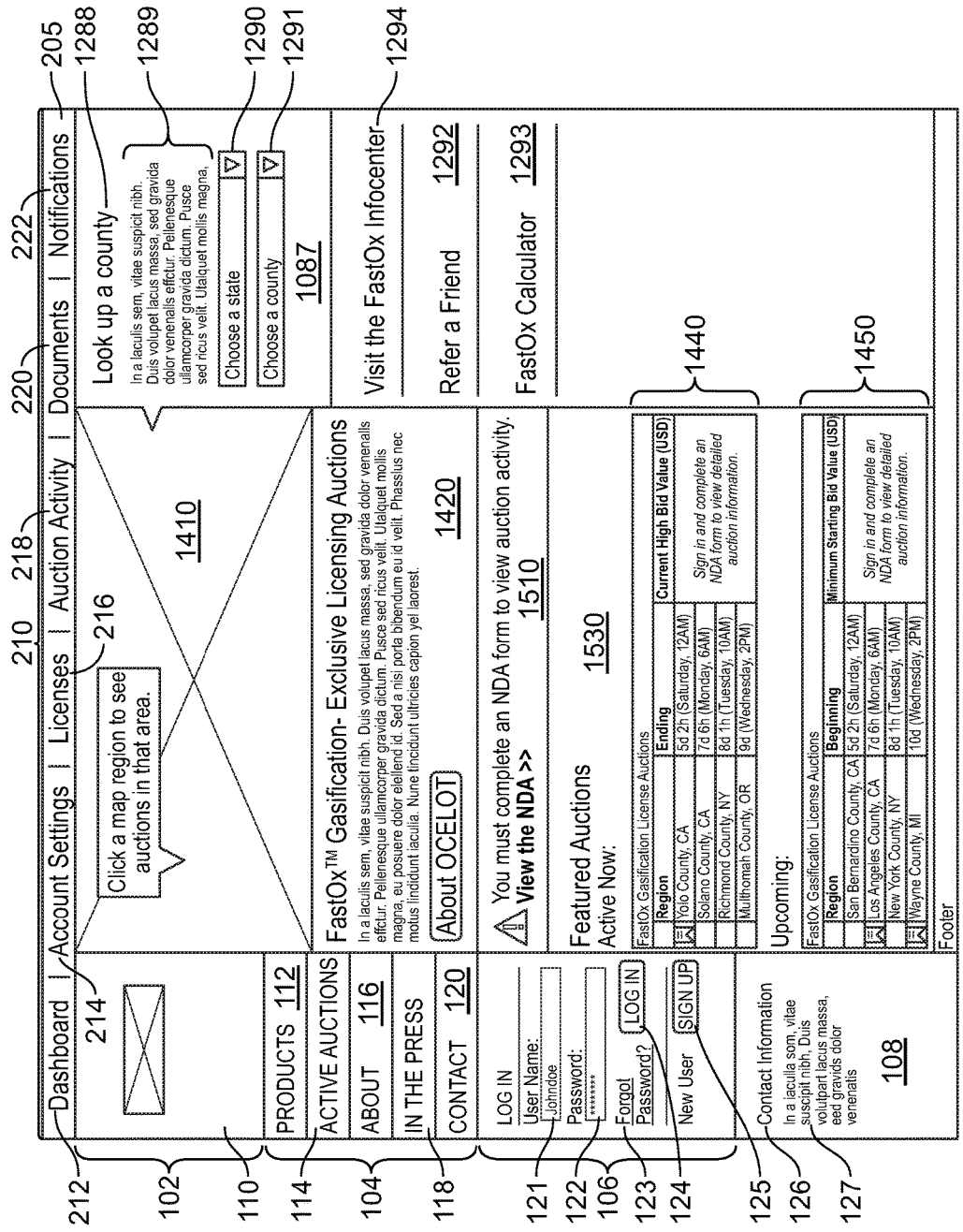
FIG. 15 is a wireframe on a community website of a text-based no-nondisclosure agreement (no-NDA) auctions landing page UI for the e-commerce system.
Figure 16:
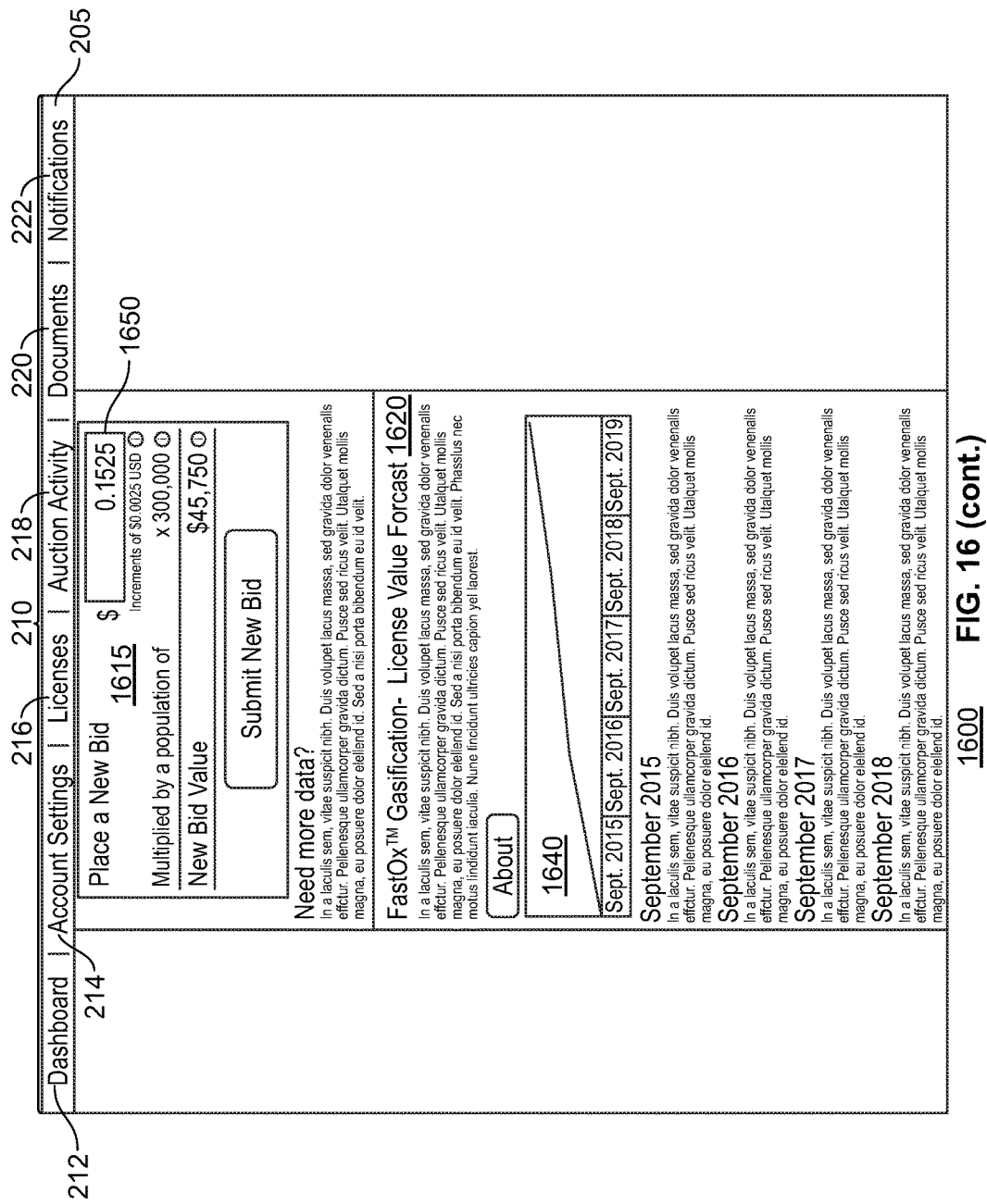
FIG. 16 is a wireframe on a community website of a text-based auction home page UI at the county level for the e-commerce system.

FIG. 15 is a wireframe on a community website of a text-based no-NDA auctions landing page UI 1500 for the e-commerce system. The UI 1500 again comprises the auctions landing page map 1410, the auction licensing box 1420, and the featured auctions box 1430. The featured auctions box 1430 again comprises the active auctions box 1440 and the upcoming auctions box 1450. The UI 1500 further comprises a no-NDA warning box 1510. For example, the no-NDA warning box 1510 comprises a notice to the user reading, "You must complete an NDA form to view auction activity." For example, the no-NDA warning box 1510 further comprises a link to an NDA. For example, the link to the NDA comprises the text, "View the NDA." For example, the no-NDA warning box 1510 comprises one or more of a color and another feature to draw the user's attention to the no-NDA warning box 1510. For example, the no-NDA warning box 1510 comprises a colored background. For example, the no-NDA warning box 1510 comprises a red background.

FIG. 14 is a wireframe on a community website of a text-based auction home page UI 1400 at the county level for the e-commerce system. The UI 1400 again comprises the county Wiki licensing text 1207, the county map 1210, and the county data text box 1212. The UI 1400 further comprises a county data box 1405, an auction activity box 1410, a bid placement box 1415, a license value forecast box 1420, and a thumbnail license value forecast box 1430. For example, the auction activity box 1410 comprises one or more of auction activity text, a current bid price, a county capita, and a current bid value. For example, the bid placement box 1415 comprises one or more of a bid box 1450, a population multiplier text, a new bid value text, and a bid submission button suitable for the user to use to submit a bid.

For example, the license value forecast box 1420 comprises one or more of license value forecast text, an IP holder information button, a license value forecast graph 1440, and license value forecast graph text. For example, the license value forecast box 1430 comprises a thumbnail version of the license value forecast graph 1440.

Figure 17:
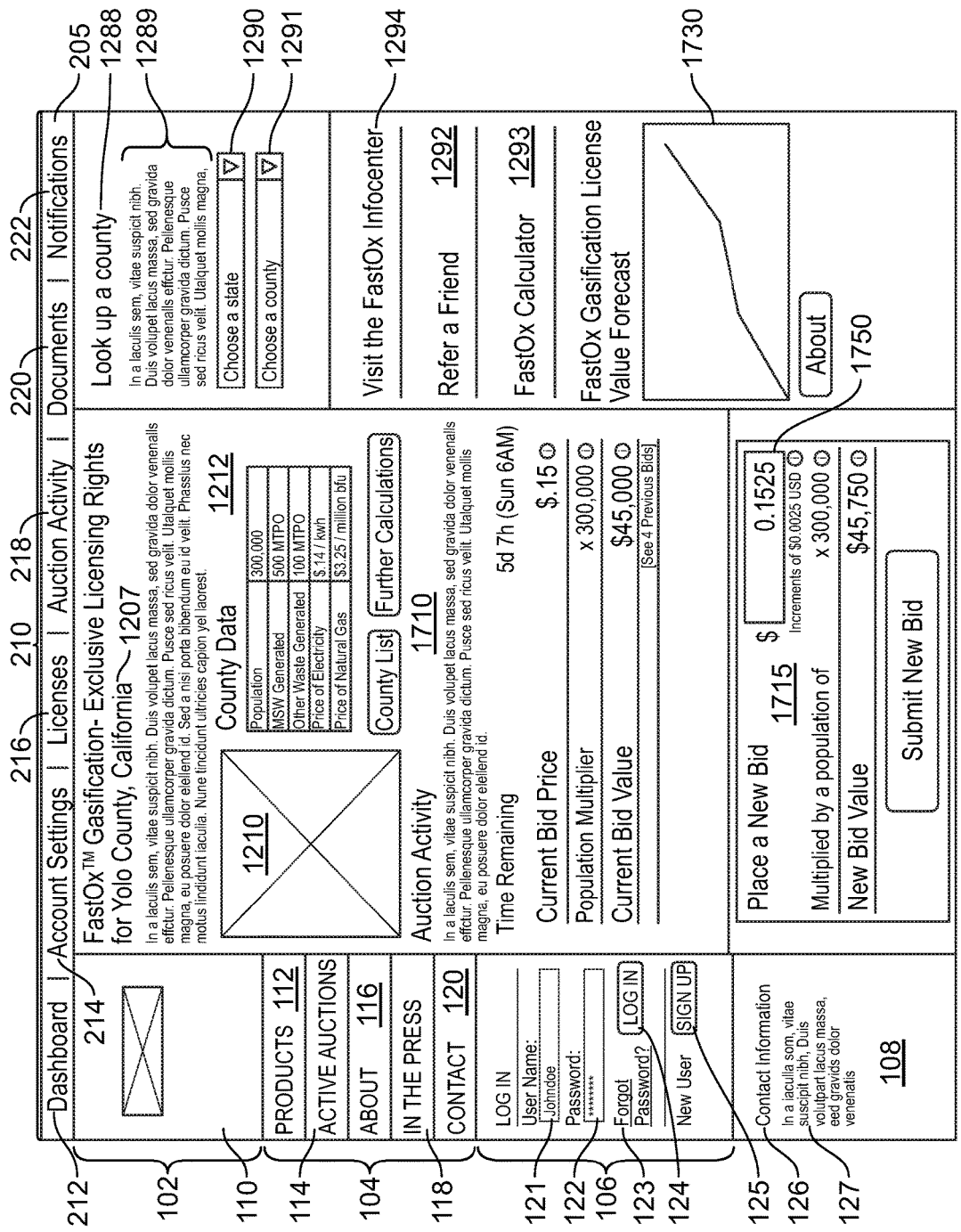
FIG. 17 is a wireframe on a community website of a text-based auction home page UI at the county level for the e-commerce system.
Figure 17:
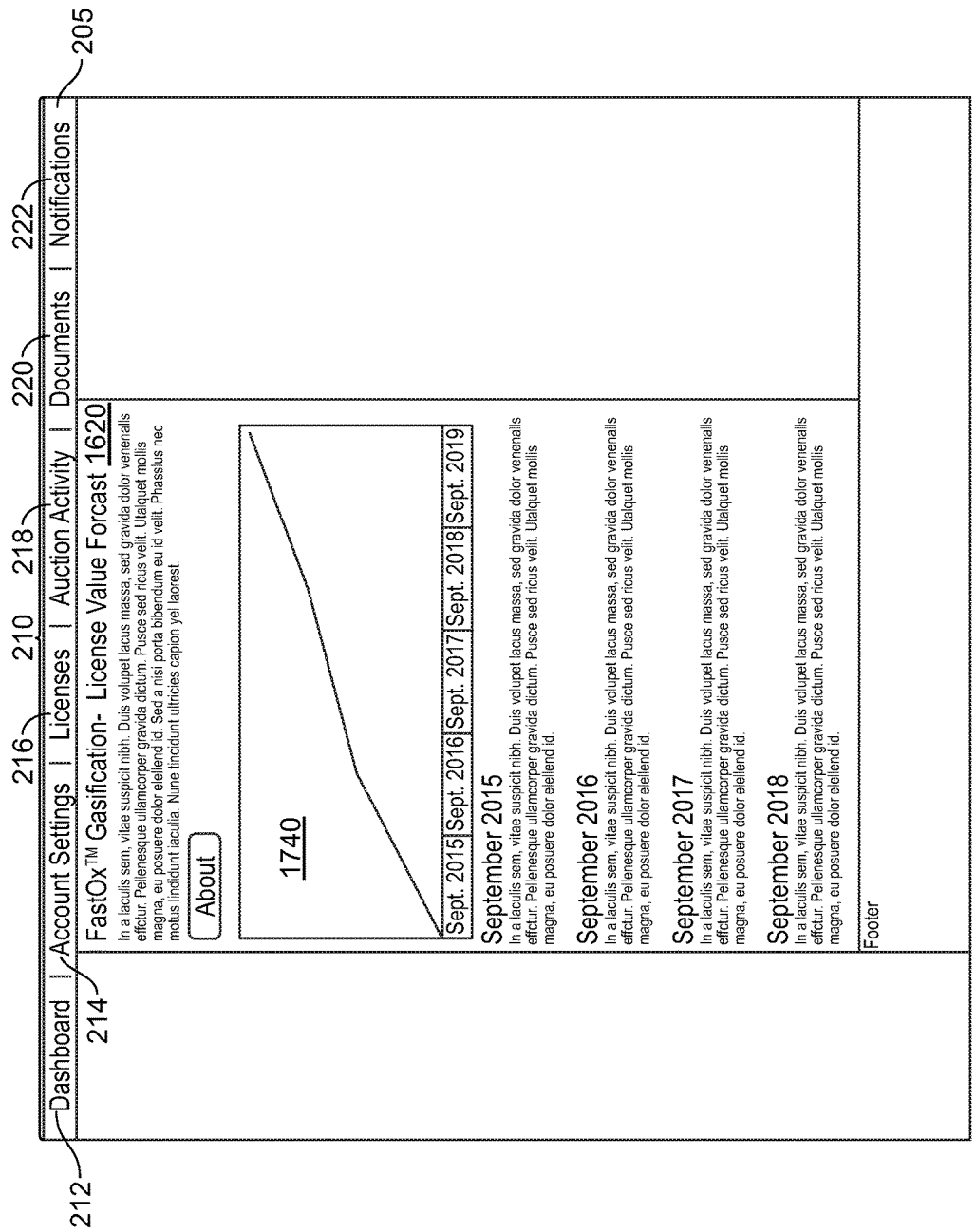

FIG. 17 is a wireframe on a community website of a text-based auction home page UI 1700 at the county level for the e-commerce system. The UI 1700 again further comprises the auction activity box 1610, the bid placement box 1615, the license value forecast box 1620, and the thumbnail license value forecast box 1630. For example, the auction activity box 1610 again comprises one or more of auction activity text, a current bid price, a county capita, and a current bid value. For example, the bid placement box 1615 again comprises one or more of a bid box 1650, a population multiplier text, a new bid value text, and a bid submission button suitable for the user to use to submit the bid.

For example, the license value forecast box 1620 again comprises one or more of license value forecast text, an IP holder information button, a license value forecast graph 1640, and license value forecast graph text. For example, the license value forecast box 1630 again comprises a thumbnail version of the license value forecast graph 1640.

Figure 18:
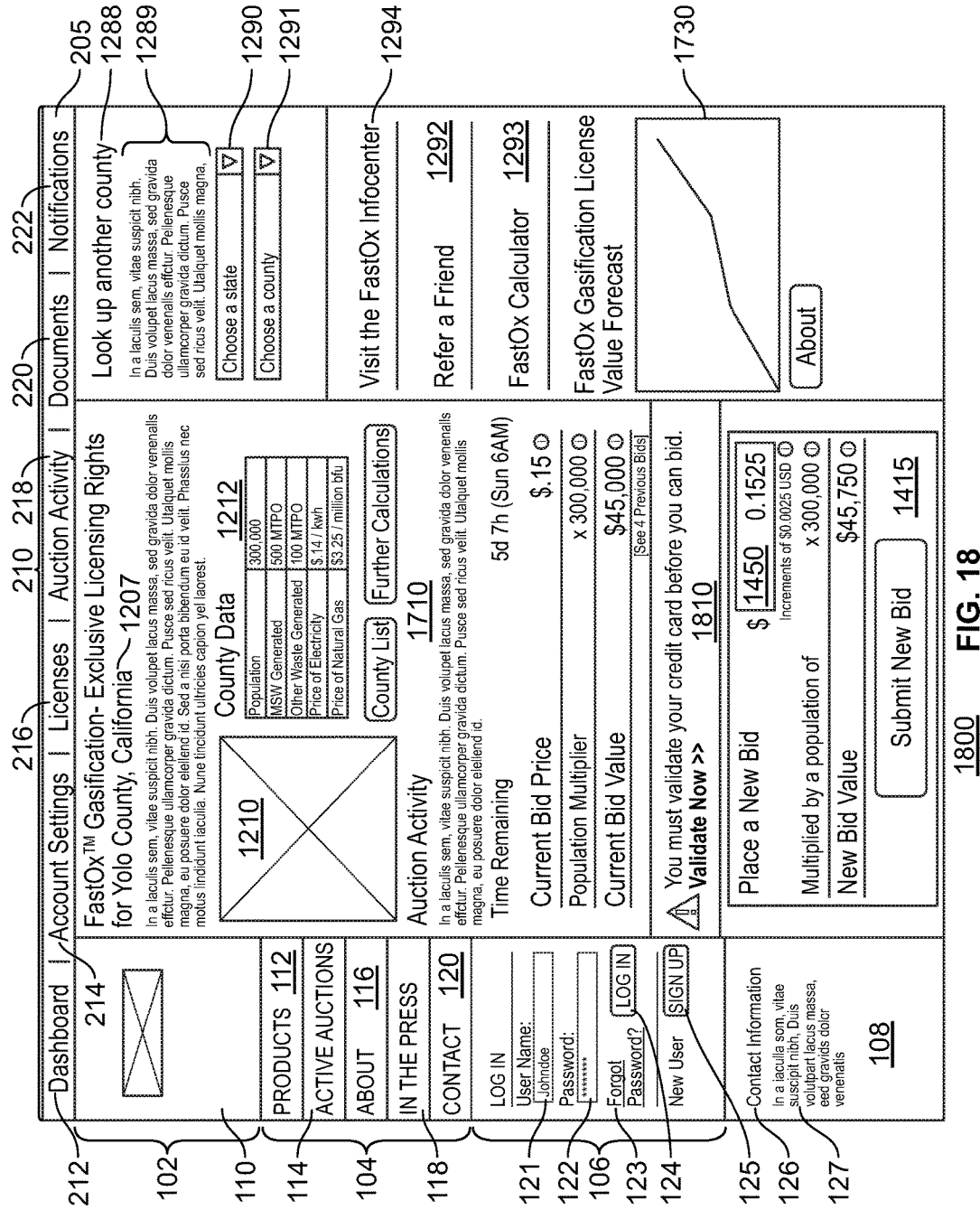
FIG. 18 is a wireframe on a community website of a text-based auction credit card alert page UI at the county level for the e-commerce system.
Figure 18:
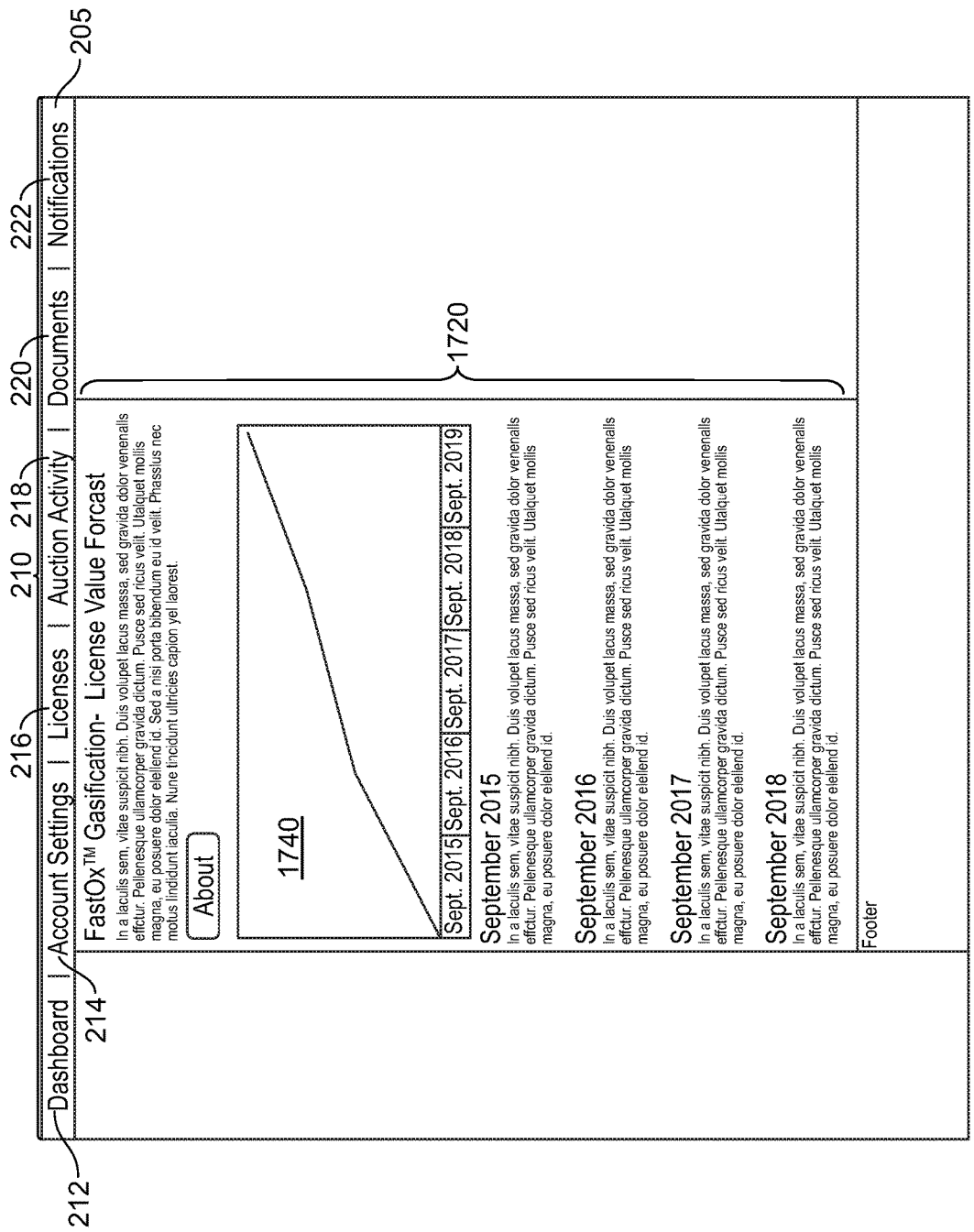

FIG. 18 is a wireframe on a community website of a text-based auction credit card alert page UI 1800 at the county level for the e-commerce system. The UI 1800 again comprises the auction activity box 1610, the license value forecast box 1620, and the thumbnail license value forecast box 1630. For example, the auction activity box 1610 again comprises one or more of auction activity text, a current bid price, a county capita, a current bid value, a bid placement box, a population multiplier text, a new bid value text, and a bid submission button suitable for the user to use to submit the bid.

For example, the license value forecast box 1620 again comprises one or more of license value forecast text, an IP holder information button, a license value forecast graph 1640, and license value forecast graph text. For example, the license value forecast box 1630 again comprises a thumbnail version of the license value forecast graph 1640.

The UI 1800 further comprises a credit card warning box 1810. For example, the credit card warning box 1810 comprises a notice to the user reading, "You must validate your credit card before you can bid." For example, the credit card warning box 1810 further comprises a link to a credit card validation page. For example, the link to the credit card validation page comprises the text, "Validate Now." For example, the credit card warning box 1810 comprises one or more of a color and another feature to draw the user's attention to the credit card warning box 1810. For example, the credit card warning box 1810 comprises a colored background. For example, the credit card warning box 1810 comprises an orange background.

Figure 19:
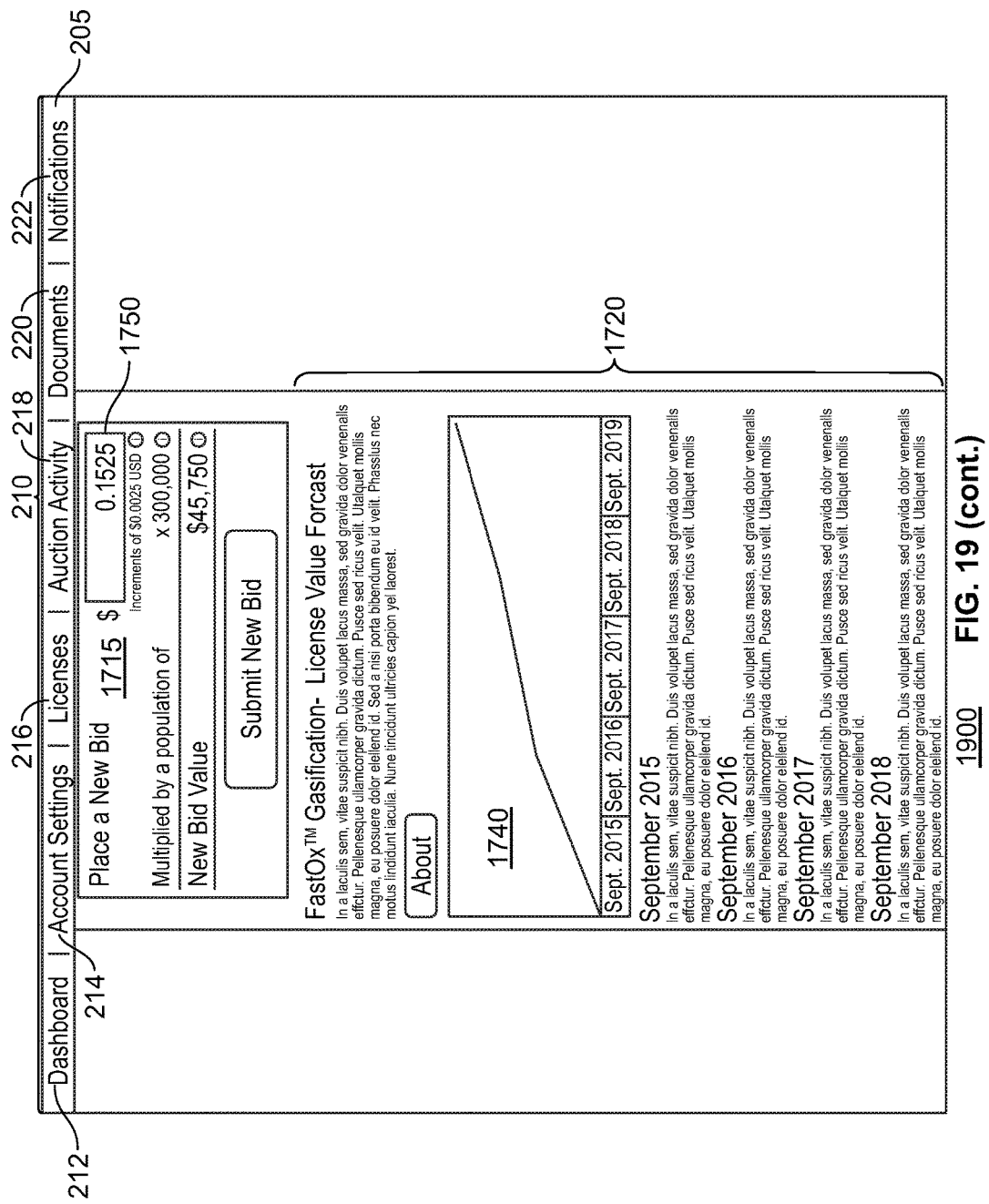
FIG. 19 is a wireframe on a community website of a text-based auction two contextual alerts page UI at the county level for the e-commerce system.

FIG. 19 is a wireframe on a community website of a text-based auction two contextual alerts page UI 1900 at the county level for the e-commerce system. The UI 1900 again comprises the no-NDA warning box 1510. The UI 1900 again comprises the credit card warning box 1810.

Figure 20:
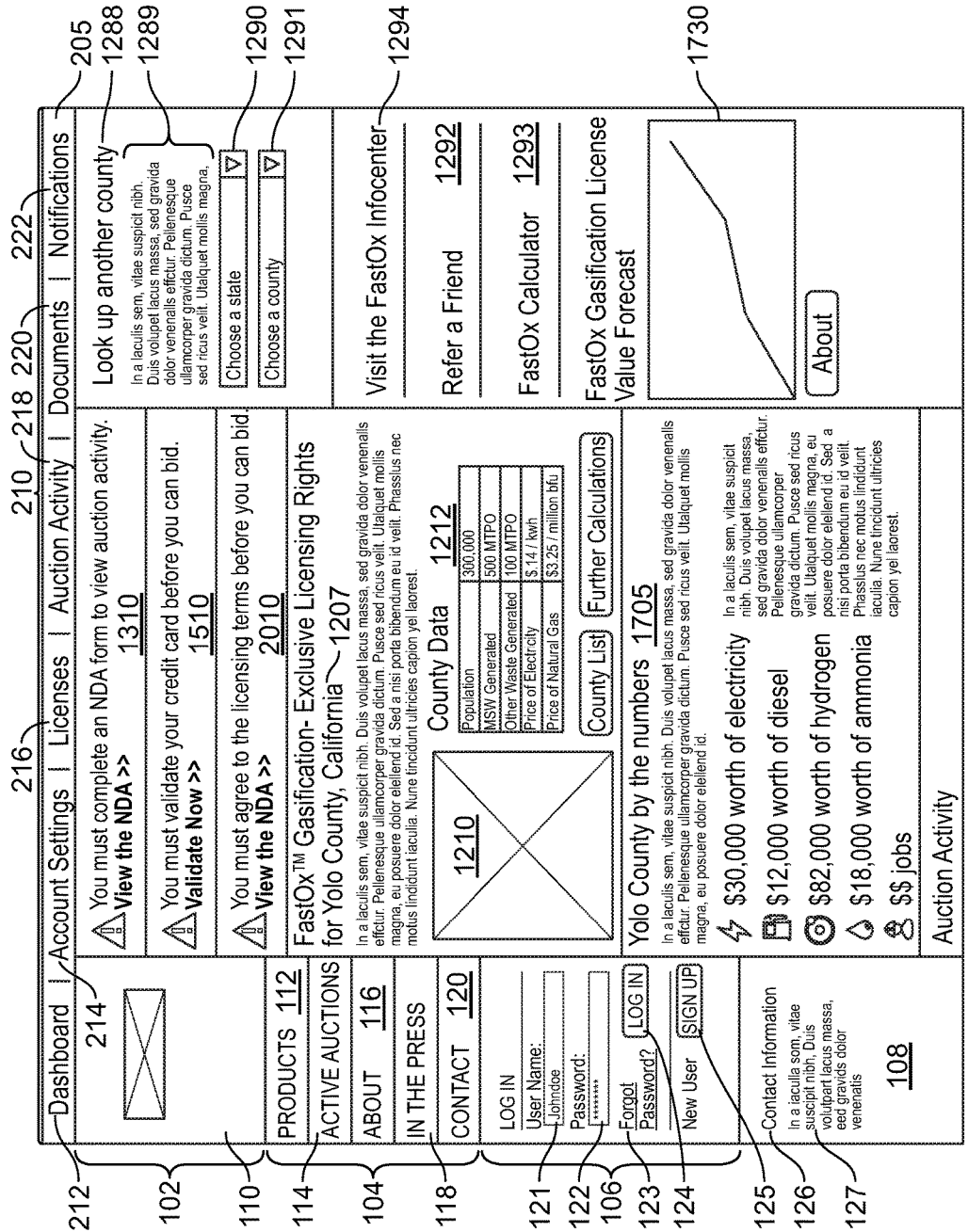
FIG. 20 is a wireframe on a community website of a text-based auction three contextual alerts page UI at the county level for the e-commerce system.
Figure 20:
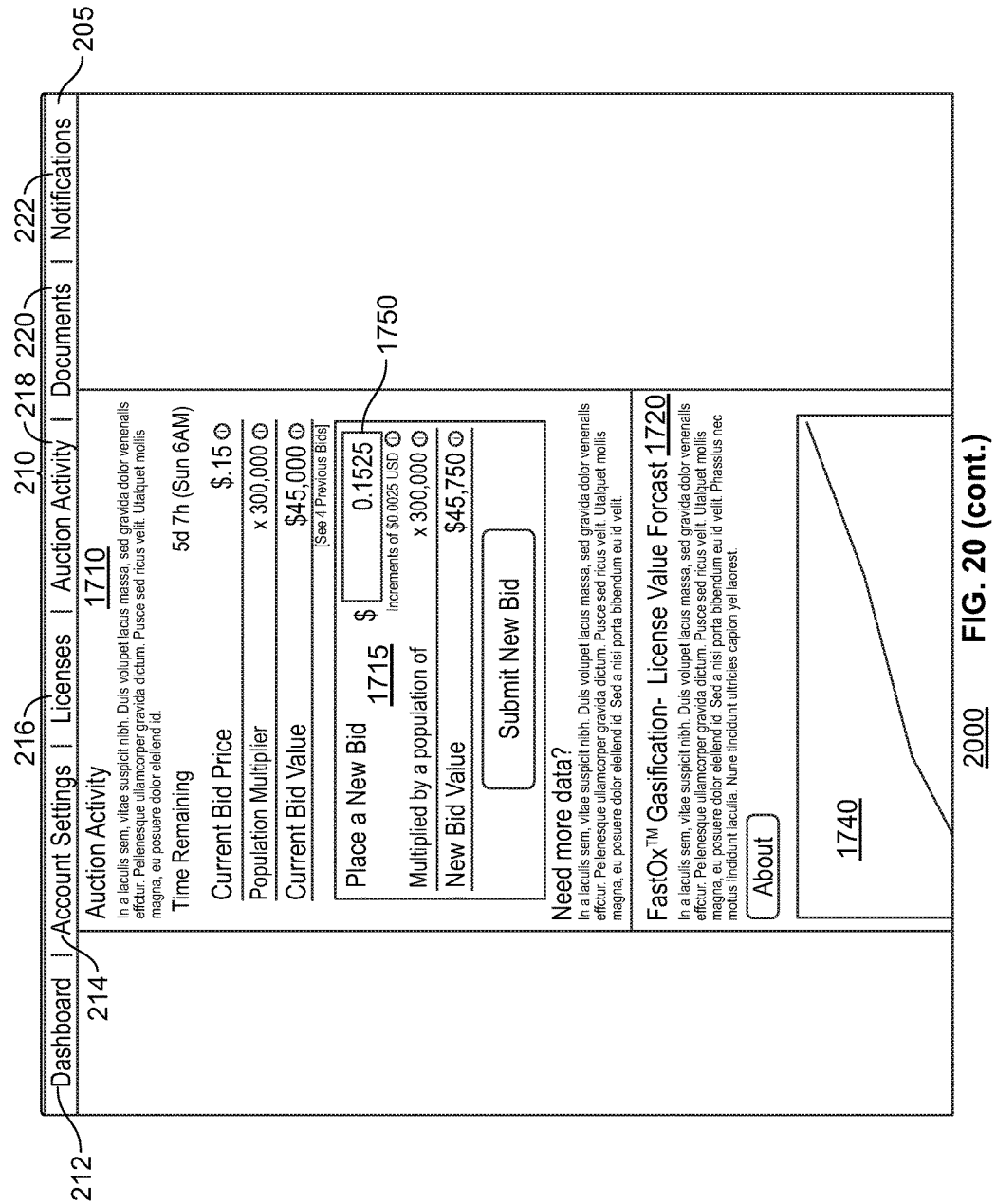
Figure 20:
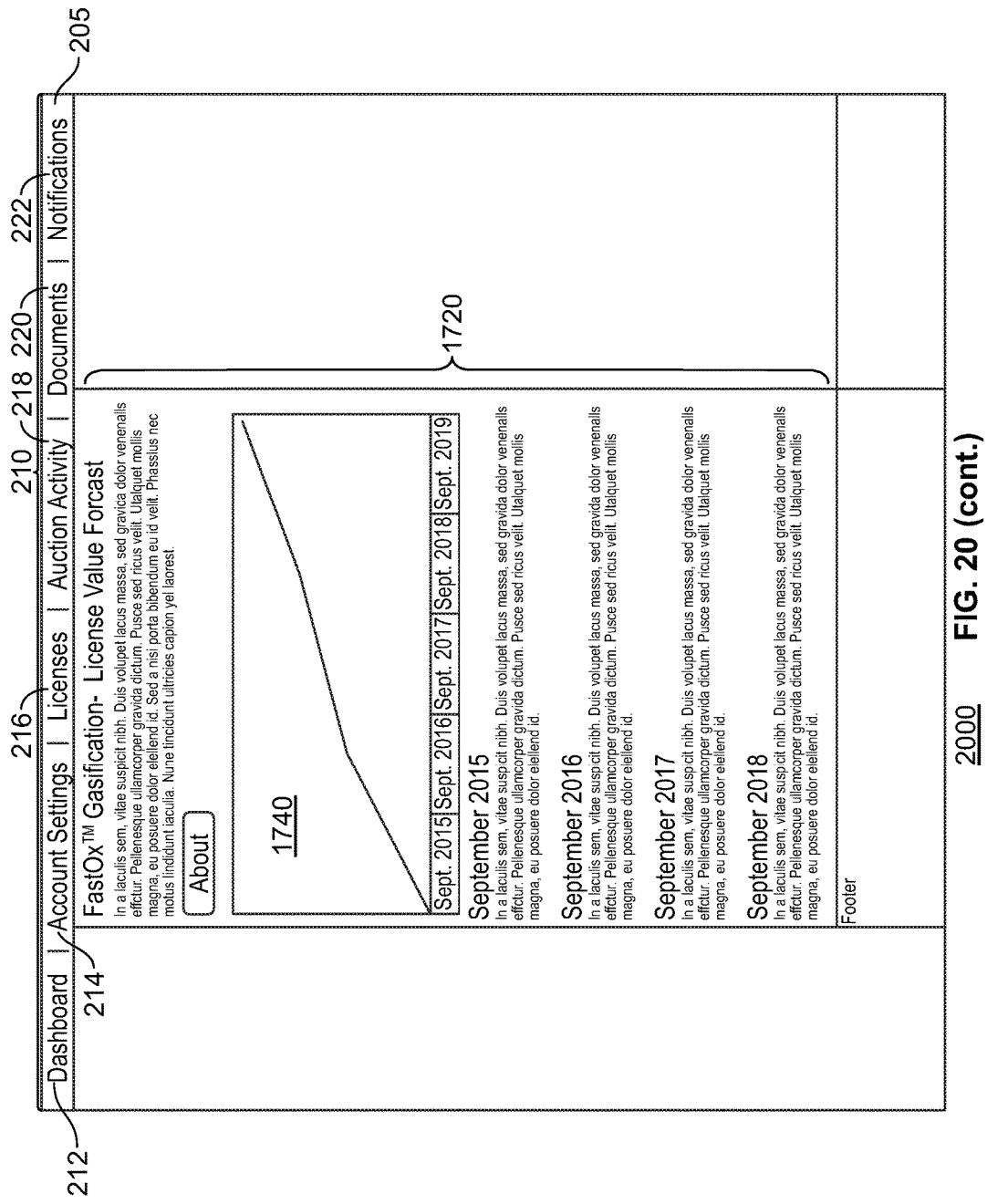

FIG. 20 is a wireframe on a community website of a text-based auction three contextual alerts page UI 2000 at the county level for the e-commerce system. The UI 2000 comprises the no-NDA warning box 1510, the credit card warning box 1810, and a licensing terms warning box 2010.

Figure 21:
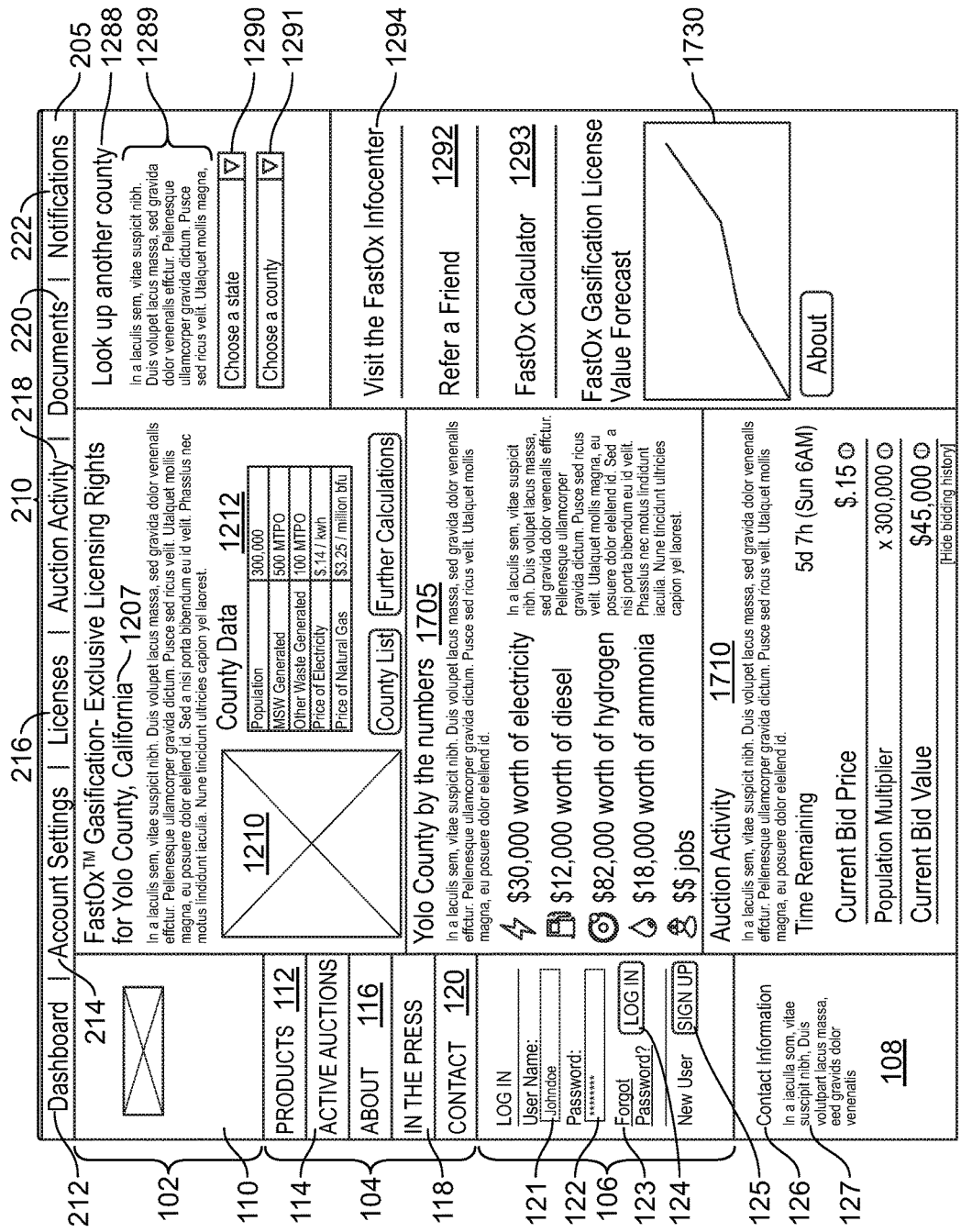
FIG. 21 is a wireframe on a community website of a text-based auction expanded bidding history page UI at the county level for the e-commerce system.
Figure 21:
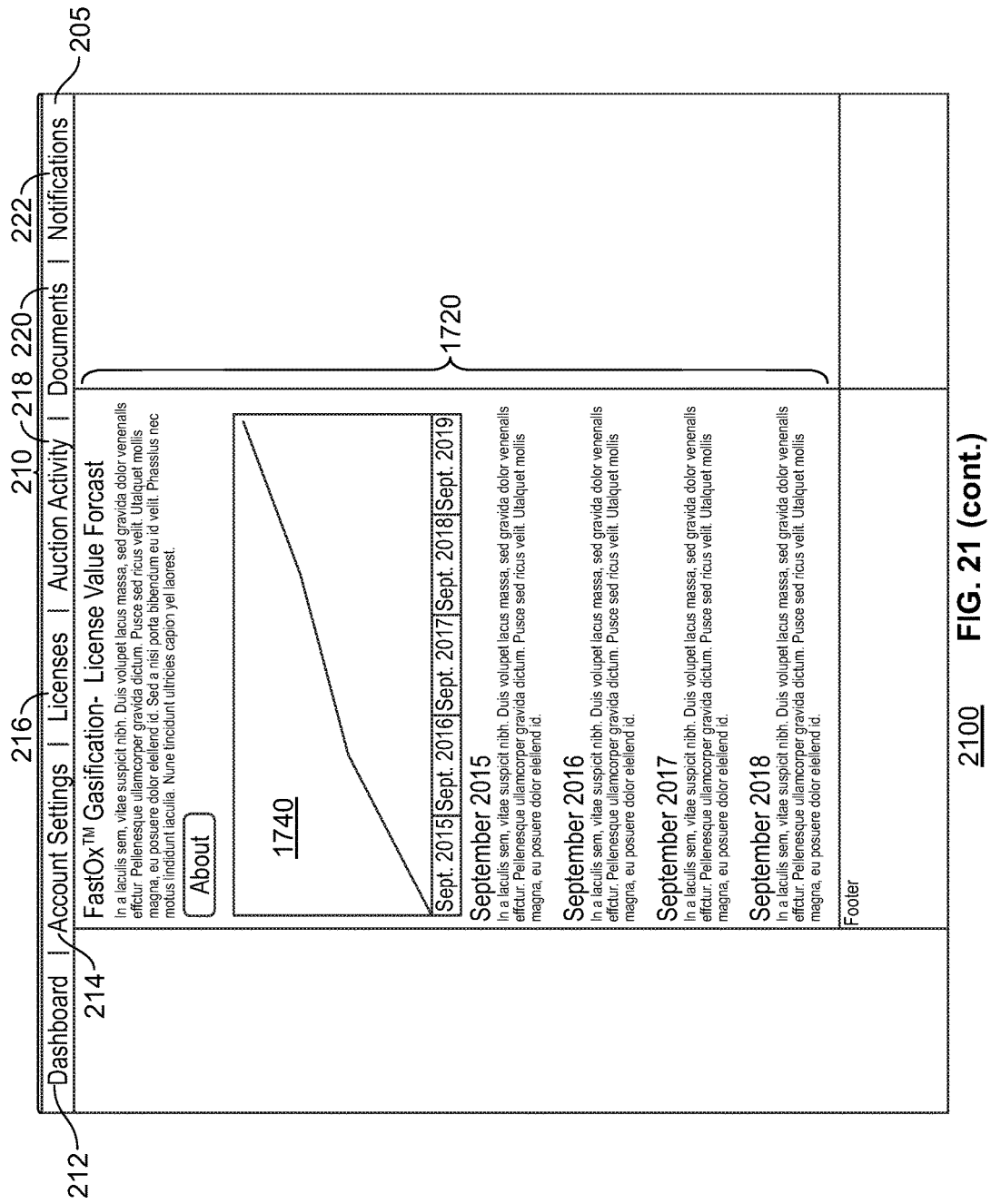

FIG. 21 is a wireframe on a community website of a text-based auction expanded bidding history page UI 2100 at the county level for the e-commerce system. The UI 2100 again comprises the auction activity box 1610. For example, the auction activity box 1610 again comprises one or more of auction activity text, a current bid price, a county capita, a current bid value, a bid placement box, a population multiplier text, a new bid value text, and a bid submission button suitable for the user to use to submit the bid. For example, the auction activity box 1610 further comprises a previous bid activity box 2110. For example, the previous bid activity box 2110 includes one or more previous bid activity listings providing information regarding previous bid amounts, previous bid times, previous bid dates, previous bid bidders, and other relevant previous bid activity listings.

Figure 22:
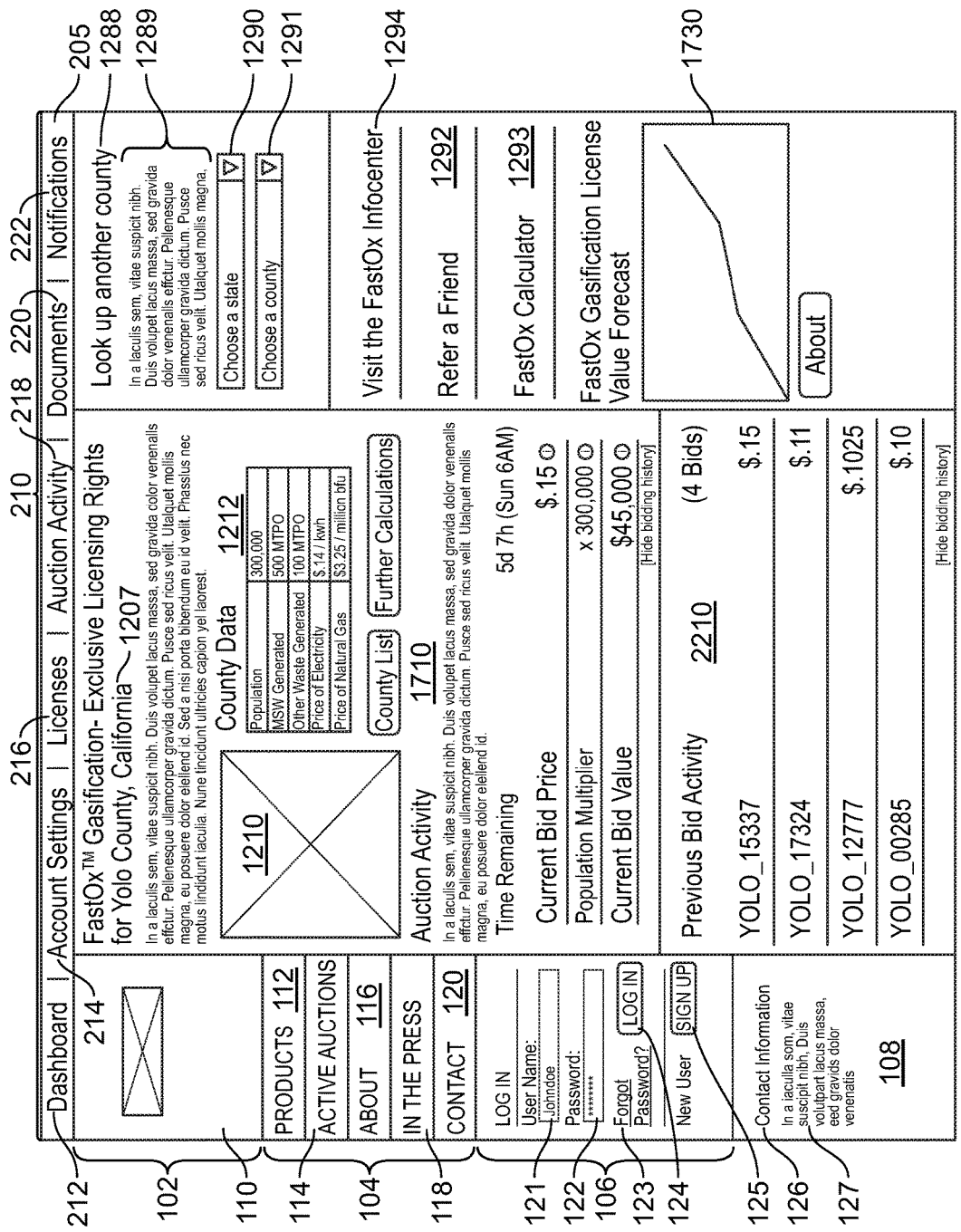
FIG. 22 is a wireframe on a community website of a text-based auction expanded bidding history page UI at the county level for the e-commerce system.
Figure 22:
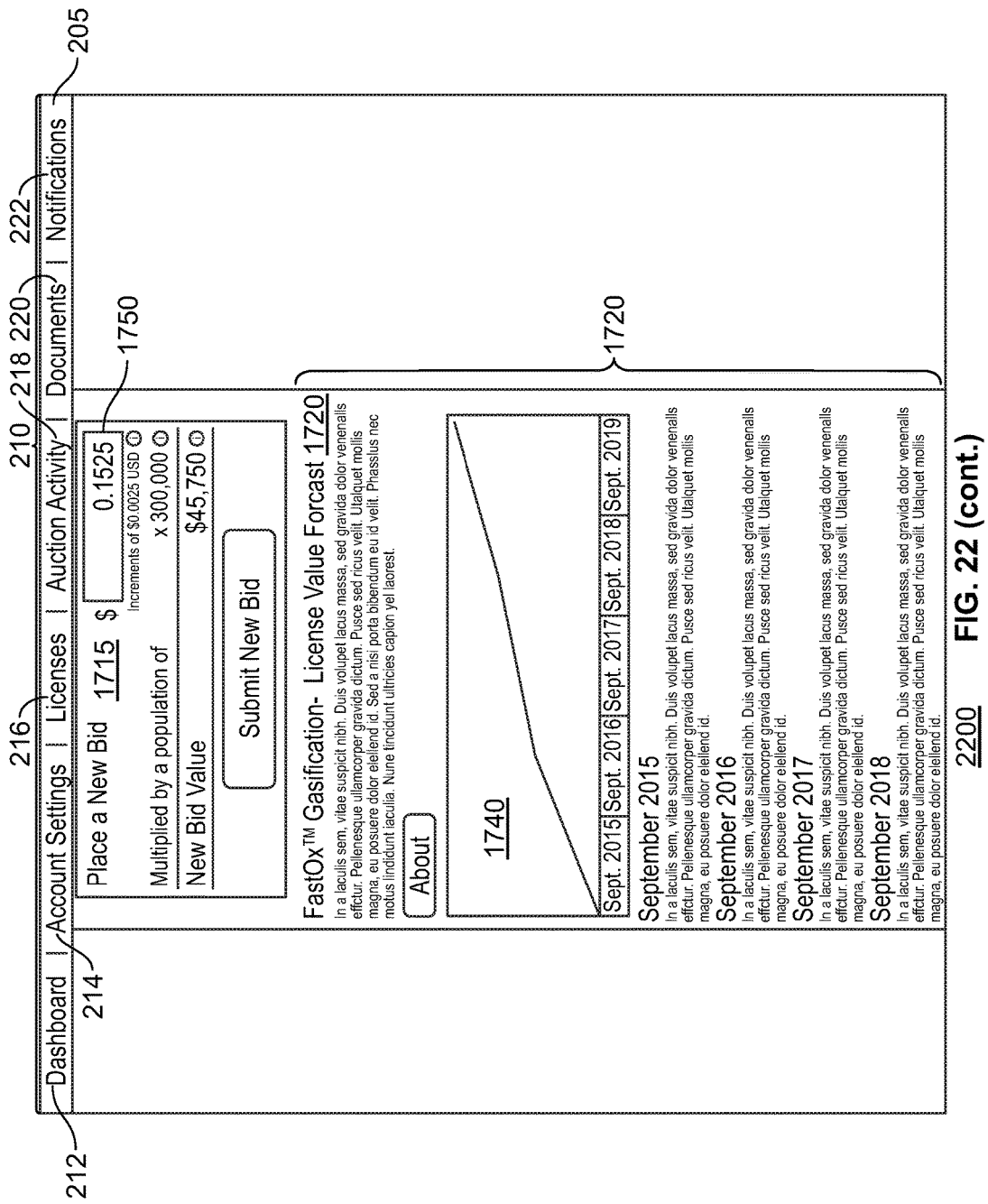

FIG. 22 is a wireframe on a community website of a text-based auction expanded bidding history page UI 2200 at the county level for the e-commerce system. The UI 2200 again comprises the auction activity box 1610. For example, the auction activity box 1610 again further comprises a previous bid activity box 2110 comprising one or more previous bid activity listings. For example, the previous bid activity box 2110 again includes one or more previous bid activity listings providing information regarding previous bid amounts, previous bid times, previous bid dates, previous bid bidders, and other relevant previous bid activity listings.

Figure 23:
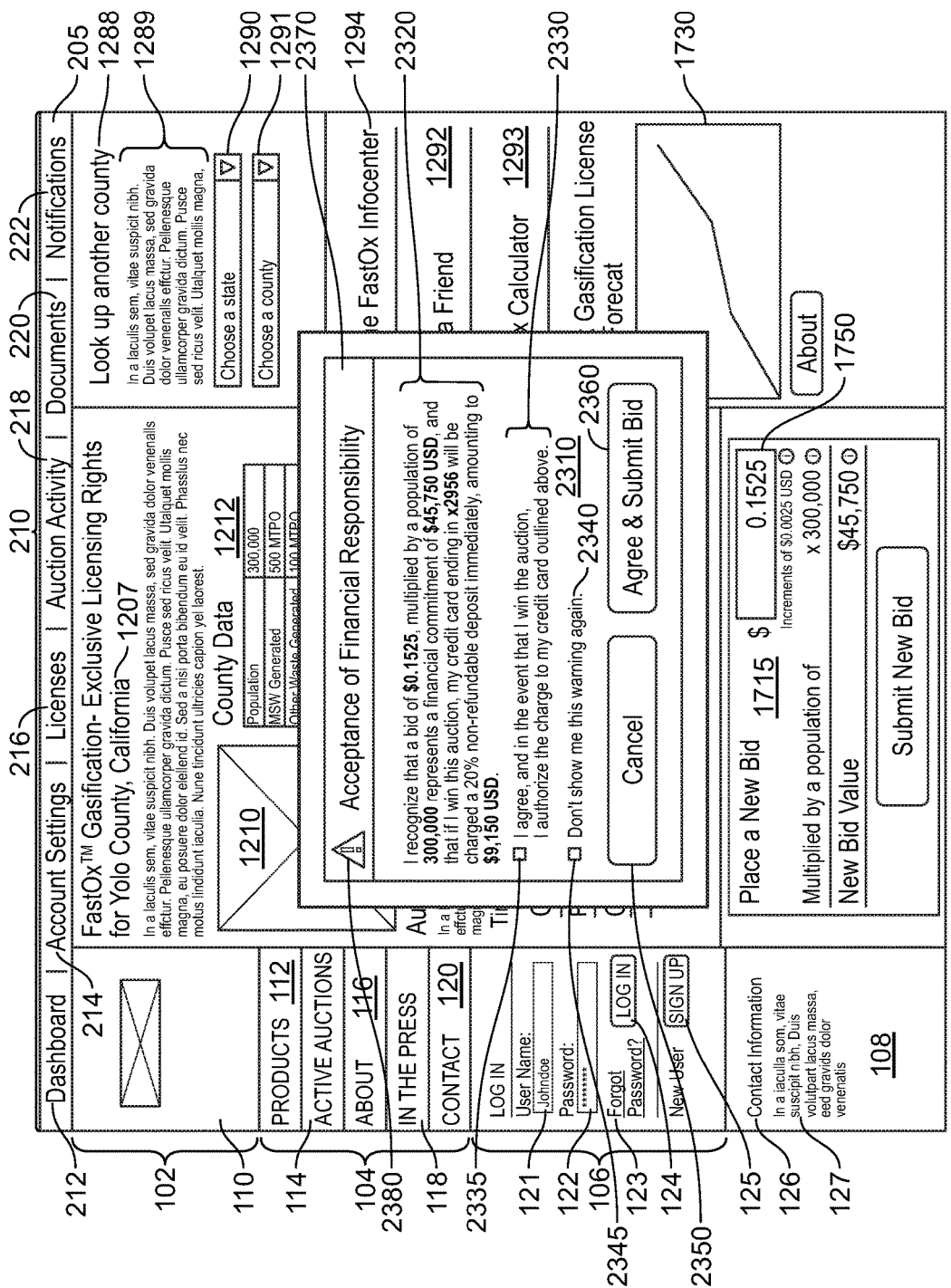
FIG. 23 is a wireframe on a community website of a text-based auction bid confirmation page UI at the county level for the e-commerce system.

FIG. 23 is a wireframe on a community website of a text-based auction bid confirmation page UI 2300 at the county level for the e-commerce system. The UI 2300 further comprises a financial responsibility warning box 2310. The financial responsibility warning box 2310 requires the user to accept financial responsibility in order to confirm a bid the user wishes to place. For example, the financial responsibility warning box 2310 comprises financial responsibility text 2320, financial responsibility acceptance text 2330, a financial responsibility acceptance box 2335, financial responsibility negation text 2340, a financial responsibility negation box 2345, a cancel button 2350, and a bid submission button 2360. For example, the financial responsibility acceptance text 2330 comprises a notice to the user reading, "I agree, and in the event that I win the auction, I authorize the charge to my credit card outlined above." For example, the financial responsibility negation text 2340 comprises a notice to the user reading, "Don't show me this warning again."

For example, the financial responsibility warning box 2310 further comprises one or more of a color and another feature to draw the user's attention to the financial responsibility warning box 2310. For example, the credit card warning box 2310 comprises a colored top banner 2370. For example, the colored top banner 2370 comprises a red background. For example, the colored top banner 2370 further comprises a warning icon 2380.

Figure 24:
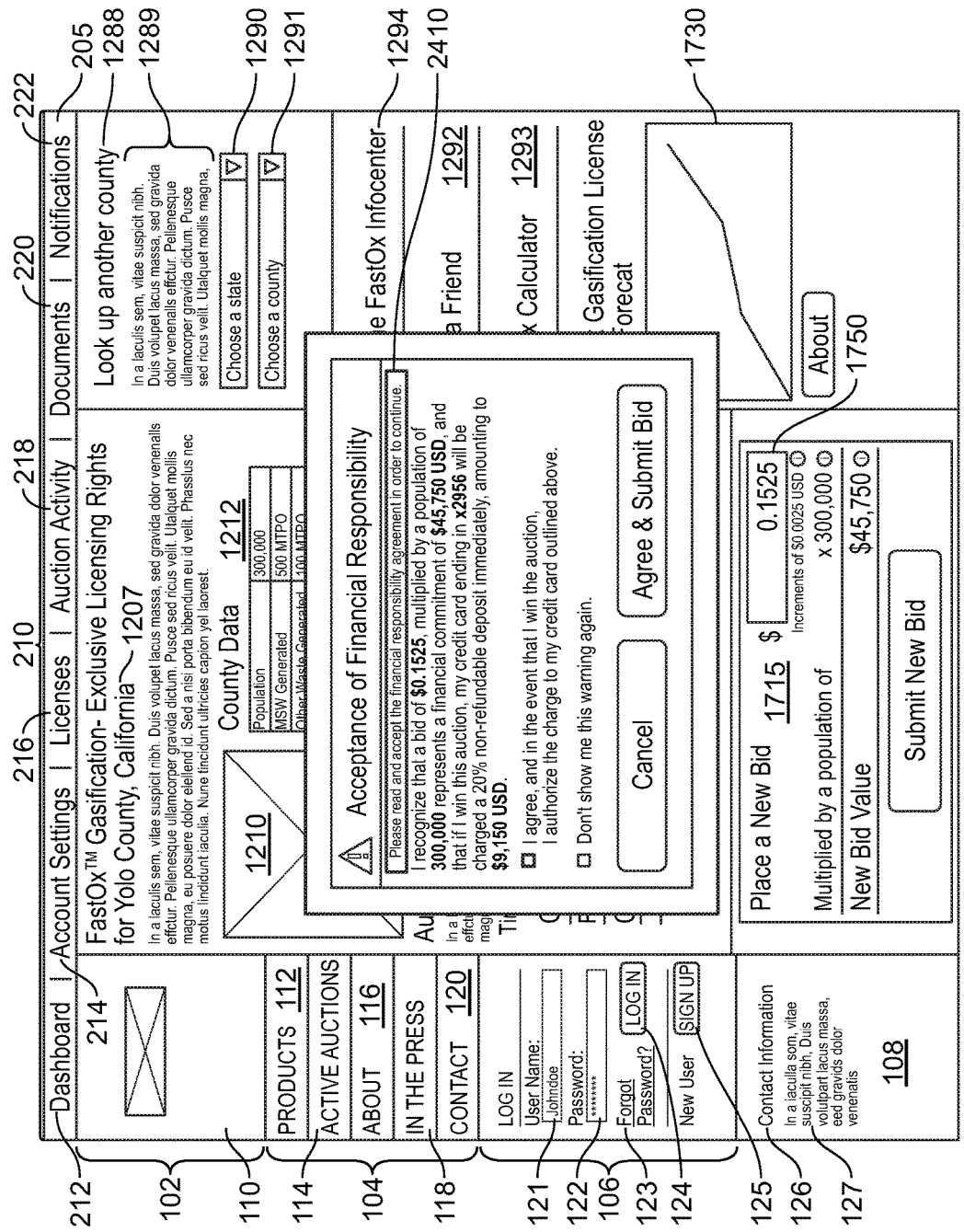
FIG. 24 is a wireframe on a community website of a text-based auction bid confirmation agreement required page UI at the county level for the e-commerce system.

FIG. 24 is a wireframe on a community website of a text-based auction bid confirmation agreement required page UI 2400 at the county level for the e-commerce system. The UI 2400 again comprises the financial responsibility warning box 2310. The financial responsibility warning box 2310 again requires the user to accept financial responsibility in order to confirm a bid the user wishes to place. The financial responsibility warning box 2310 again comprises the financial responsibility text 2320, the financial responsibility acceptance text 2330, the financial responsibility acceptance box 2335, the financial responsibility negation text 2340, the financial responsibility negation box 2345, the cancel button 2350, and the bid submission button 2360. The financial responsibility warning box 2310 further comprises agreement required text 2410. The agreement required text 2410 requires the user to agree to one or more required agreements in order to submit a bid the user wishes to place.

For example, the agreement required text 2410 comprises one or more of a color and another feature to draw the user's attention to the agreement required text 2410. For example, the agreement required text 2410 comprises one or more of a colored background and colored text. For example, the agreement required text 2410 comprises a red background. For example, the agreement required text 2410 further comprises red text. For example, the agreement required text 2410 comprises a notice to the user reading, "Please read and accept the financial responsibility agreement in order to continue."

Figure 25A:
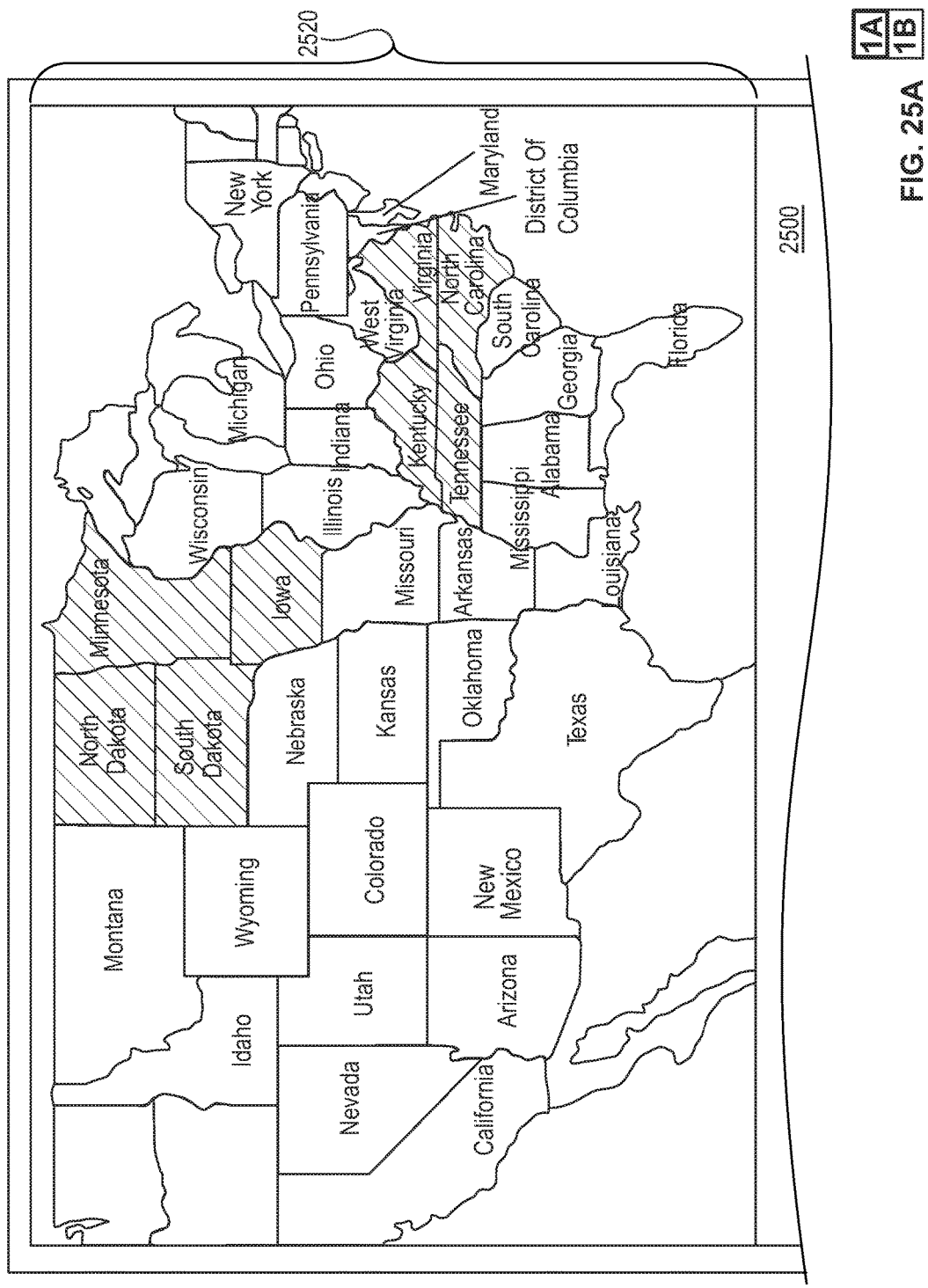
FIG. 25 is a screenshot on a community website of a map-based UI at a national level for the electronic commerce (e-commerce) system.

FIG. 25 is a screen shot on a community website of a map-based UI 2500 at a national level for the e-commerce system. In the figure, the states comprising one or more counties currently available for auction of one or more licenses are shaded. The states comprising no counties currently available for auction are clear. On the community website, the states comprising one or more available counties are indicated by a first color and the states with no available counties are indicated by a second color. Optionally, a range of colors may be provided for the states, to indicate by color a state "temperature" defined as the percentage of counties in the state currently available for auction. Alternatively, or additionally, the UI 2500 may indicate in another manner the percentage of counties in a given state that have already been auctioned.

Starting with a full map 252 0 of the United States, individual states are shaded and color-coded based on the availability of one or more of county licensing opportunities and current auction activity. In this simplified example, the states of California, Nevada, North Dakota, South Dakota, Minnesota, Iowa, Virginia, Tennessee and North Carolina are shaded, indicating the current availability for auction of license rights to at least one county comprised in each of these states.

A user can scroll up and down a text box 2540 at the bottom of the UI 2500 to determine whether a given state comprises one or more counties that are currently available for auction of one or more licenses. Alternatively, or additionally, a user can hover a mouse pointer over the state of interest, thereby invoking a popup box (not shown) comprising state statistical information, such as the number of counties within the state that are available for licensing and dates of upcoming auctions. Alternatively, or additionally, a user can hover the mouse pointer over the name of the state in the text box 2540, thereby invoking a popup box (not shown) comprising state statistical information, such as the number of counties within the state that are available for licensing and dates of upcoming auctions.

Figure 26:
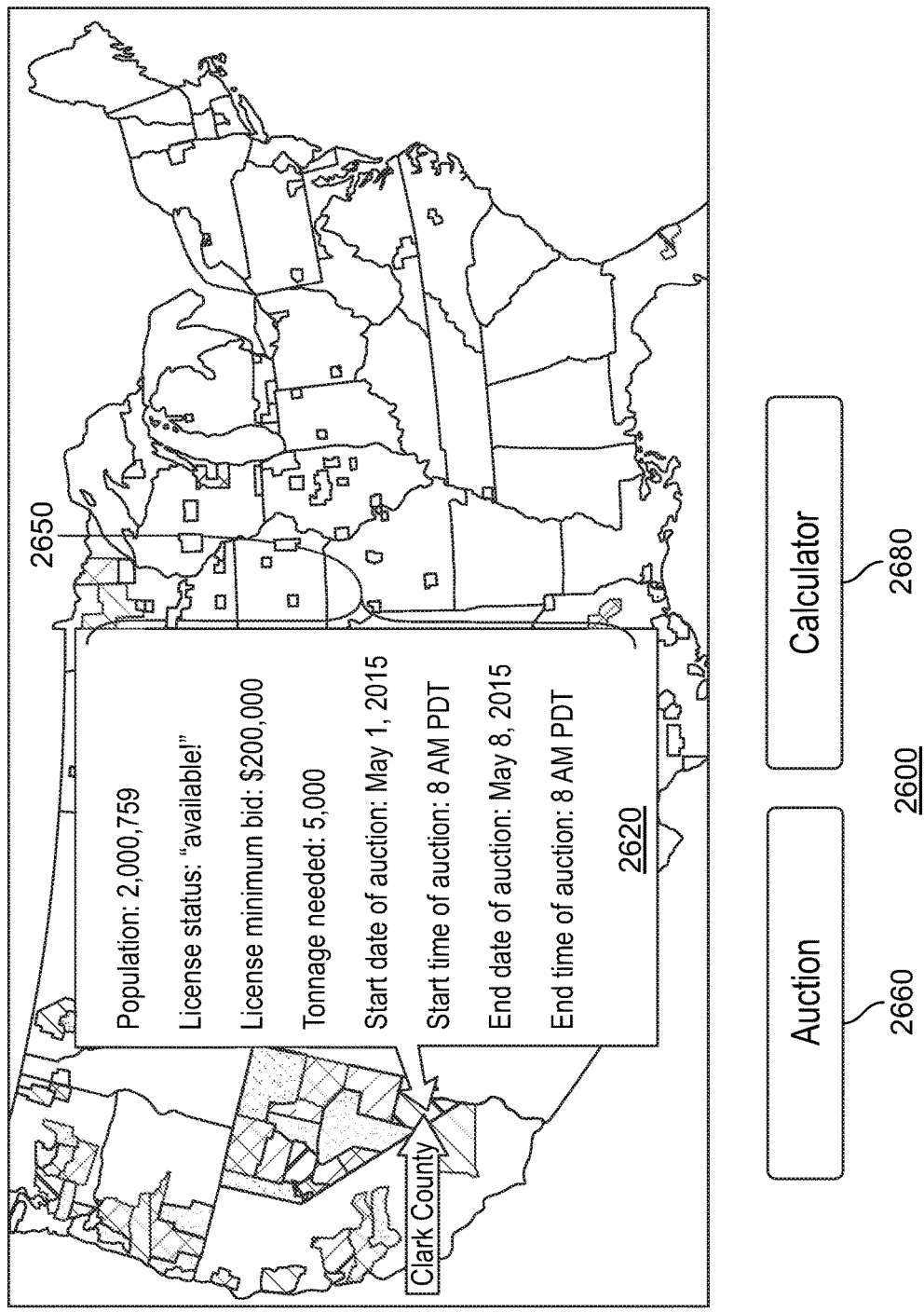
FIG. 26 is a screenshot on a community website of a map-based UI at the national level for the e-commerce system.

FIG. 26 is a screenshot on a community website of a map-based UI 2600 at the national level for the e-commerce system, showing a map 2610 of the United States, and showing a popup box 2620 comprising introductory county auction information for a county 2640. As one example of how the UI 2600 operates, a user who hovers the mouse pointer over the county 2640, and holds that position after the state statistical information (as discussed in reference to FIG. 25) has appeared, will thereby invoke the popup box 2620 comprising county statistical information 2650.

For example, the county statistical information comprises one or more of a county population, a statement regarding license availability, a minimum bid, a current bid, an estimated size of a waste converter for the county, an auction start date, an auction start time, an auction end date, an auction end time, and other county statistical information.

Optionally, and as depicted in this example, the UI 2600 further comprises an auction button 2660. Optionally, and as depicted in this example, the UI 2600 further comprises a calculator button 2680.

The calculator button 2680 provides access to a calculator configured to estimate the potential value of the IP rights based on information specified by the user. The information specified by the user may include one or more of: the estimated capacity of the waste processor, the county proposed for licensing, current waste processing market conditions, total feedstock input to the waste processing technology covered by the IP per day, breakdown of feedstock types input to the waste processing technology, cost of input, quantities of end products to be produced by the waste processing technology, types of end products to be produced by the waste processing technology, values in the relevant county of the end products to be produced, and other criteria relevant to the potential value of the IP rights.

Figure 27:
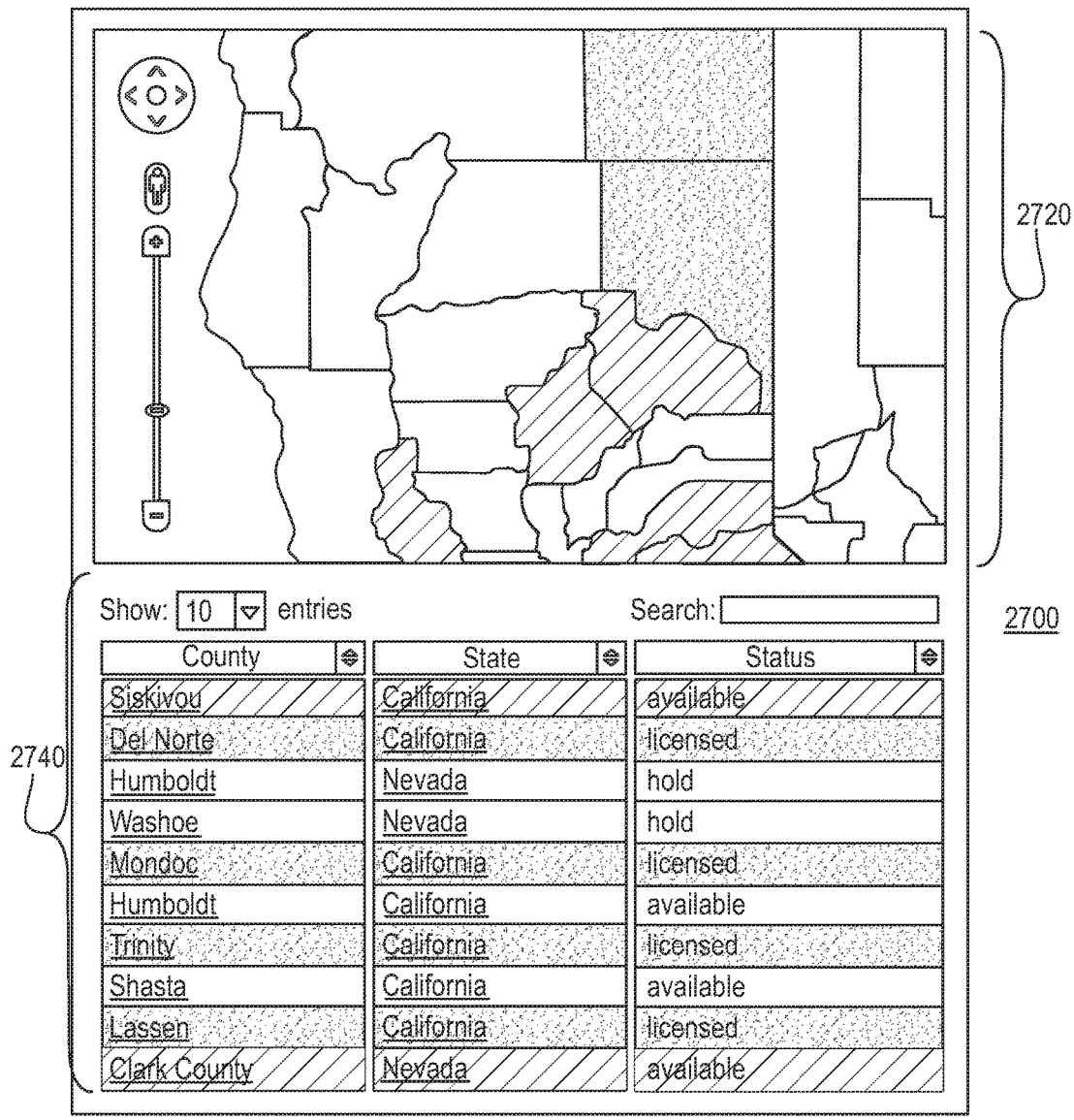
FIG. 27 is a screenshot on a community website of a map-based UI at a regional level for the e-commerce system.

FIG. 27 is a screenshot on a community website of a map-based UI 2700 at a regional level for the e-commerce system. In the figure, the counties currently available for auction of one or more licenses are shaded. The counties being held for future auction are clear. The counties that have already been licensed are stippled with dots. On the community website, the counties currently available for auction are indicated by a first color, the counties being held for future auction are indicated by a second color, and the counties that have already been licensed are indicated by a third county. Optionally, on the community website, a range of colors may be provided for the states, to indicate by color a state "temperature" defined as the percentage of counties in the state currently available for auction of one or more licenses. Alternatively, or additionally, the UI 2700 may indicate in another manner the status of the visible counties.

Starting with a regional map 2720 typically showing several different counties, individual counties are shaded and color-coded based on the availability of one or more of county licensing opportunities and current auction activity.

The user can scroll up and down a text box 2740 at the bottom of the UI 2700 to determine the auction status of a given county, which may be available for auction, already licensed, being held for future auction, or may have another status. Alternatively, or additionally, the user can hover a mouse pointer over the county of interest, thereby invoking a popup box 2620 as shown in FIG. 26 comprising the county statistical information 2650 as shown in FIG. 26. Alternatively, or additionally, the user can hover the mouse pointer over the name of the county in the text box 2740, thereby invoking the popup box 2620 as shown in FIG. 26 comprising the county statistical information 250 as shown in FIG. 26. Clicking on an individual state will zoom into the full state where individual counties are outlined and color-coded. Using this simple design, the user needs only two clicks to move from a full US map to the county information page they are seeking.

Figure 28:
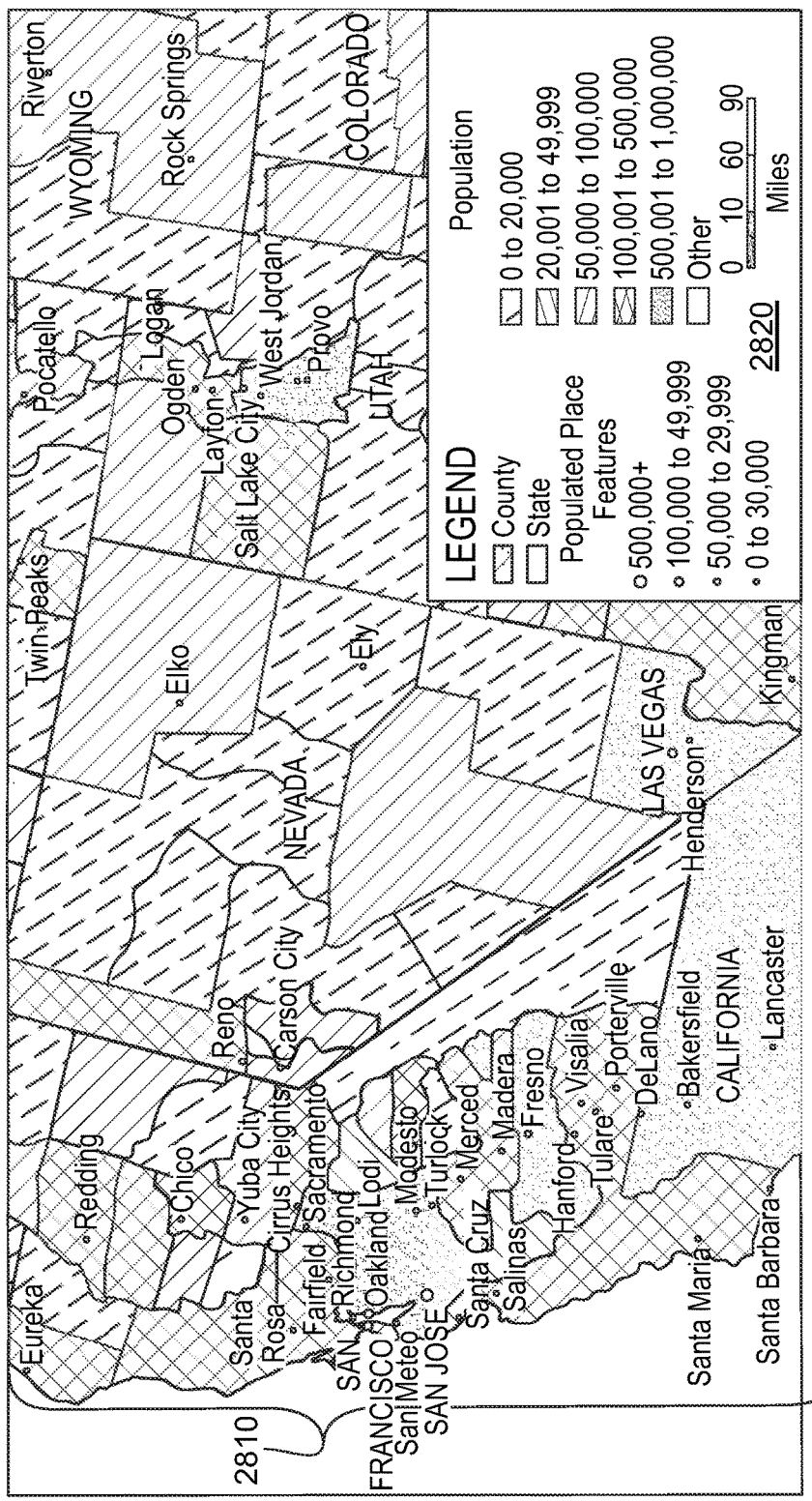
FIG. 28 is a screenshot on a community website of a map-based UI at the regional level for the e-commerce system.

FIG. 28 is a screenshot on a community website of a map-based UI 2800 at the regional level for the e-commerce system, showing a map 2810 of a region the United States comprising Nevada, Utah, and most of California. The UI 2800 further comprises a legend 2820 explaining, for example, how the different shading and coloring of the different counties corresponds to different county populations, and how the different sizes of the indicated populated place features corresponds to different corresponding populations. Optionally, and as depicted in this example, the UI 2800 further comprises an auction button 2860. Optionally, and as depicted in this example, the UI 2800 further comprises a calculator button 2880.

Figure 29:
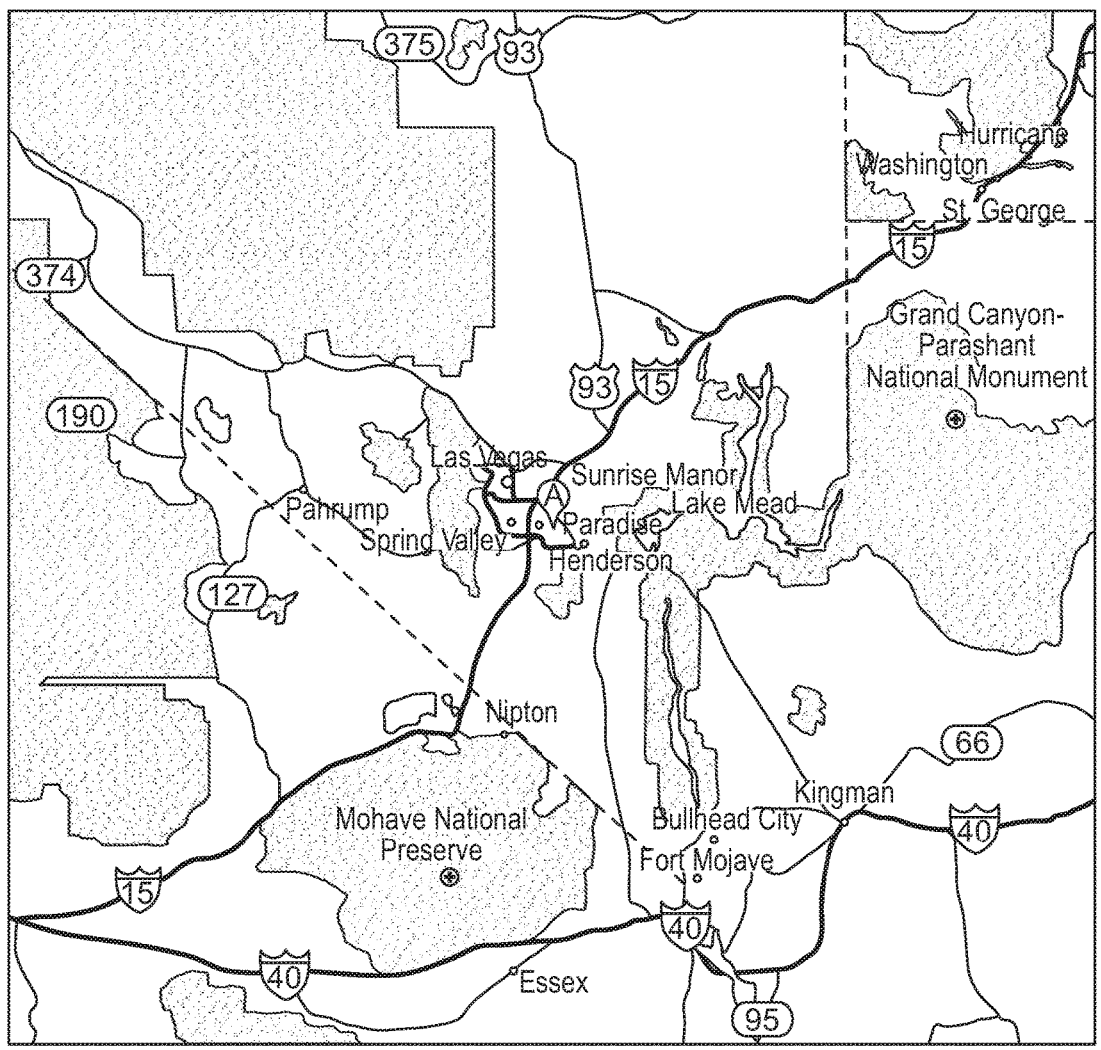
FIG. 29 is a screenshot on a community website of a map-based UI at a county level for the e-commerce system.

FIG. 29 is a screenshot on a community website of a map-based UI 2900 at the county level for the e-commerce system. Depicted is Clark County, Nev.

Figure 30:
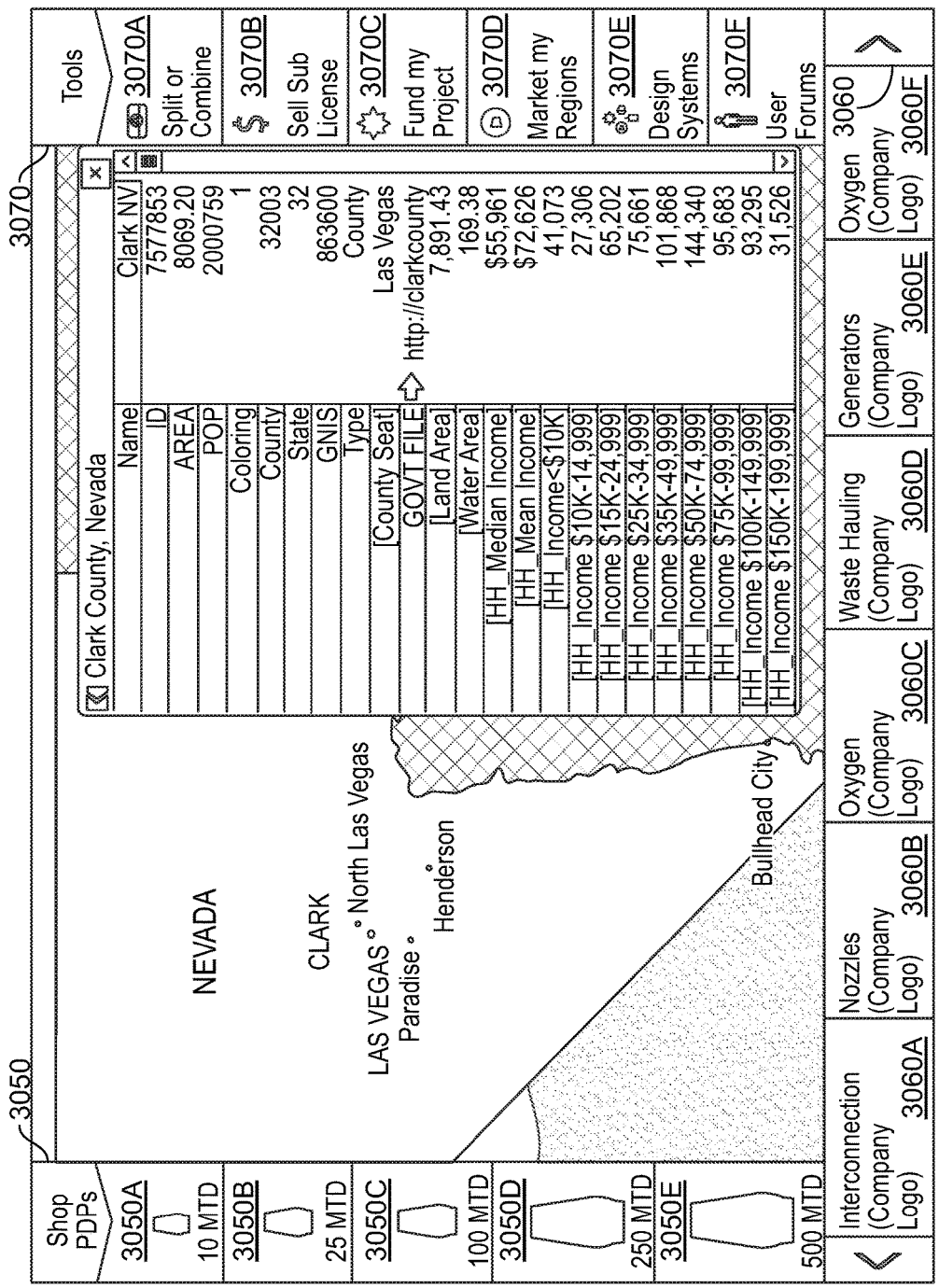
FIG. 30 is a screenshot on a community website of Developer Resources at the county level for the e-commerce system.

FIG. 30 is a screenshot on a community website of a Developer Resources 3000 at the county level for the e-commerce system, showing county demographic data, vendor buttons and tool buttons. In this example, the county shown is Clark County, Nev. Depicted are a county map 3020, a county demographic data box 3040, process design package (PDP) vendor buttons 3050, vendor buttons 3060, and Developer's Tool buttons 3070.

The county demographic data 3040 may comprise one or more of a county identification number, a county area, a county population, a county coloring, the state the county is located in, a county seat, a county uniform resource locator (URL), a county land area, a county water area, data on median income, data in income in various income brackets, and other country demographic data.

In this example, the PDP vendor buttons 3050 include a 10 metric tons per day (MTD) PDP vendor button 3050A, a 25 MTD PDP vendor button 3050B, a 100 MTD PDP vendor button 3050C, a 250 MTD PDP vendor button 3050D, and a 500 MTD PDP vendor button 3050E. In this example, the vendor buttons 3060 include an interconnection or energy vendor button 3060A, a nozzle vendor button 3060B, a first oxygen vendor button 3060C, a waste hauling vendor button 3060D, a generator vendor button 3060E, and a second oxygen vendor button 3060F. In this example, the Developer's Tool buttons 3070 include a split or combine tool button 3070A, a sell sub-license tool button 3070B, a "fund my project" tool button 3070C, a "market my regions" tool button 3070D, a design systems tool button 3070E, and a user forums tool button 3070F.

Other possible Developer's Tool buttons 3070 include (not shown) a loan tool button, a grant tool button, a vendor tool button, a system purchase tool button, a system sale button, a partnership tool button, a resale tool button, a price change forecast tool button, an NDA generation tool button, a business plan building tool button, a financial modeling tool button, and another license management tool button. The resale tool button may, for example, comprise an "advertise my license" tool button. The system sale button may, for example, comprise a sub-system sale button. The system sale button may, for example, be employed to sell a used system. The sub-system sale button may, for example, be employed to sell a used sub-system.

Figure 31:
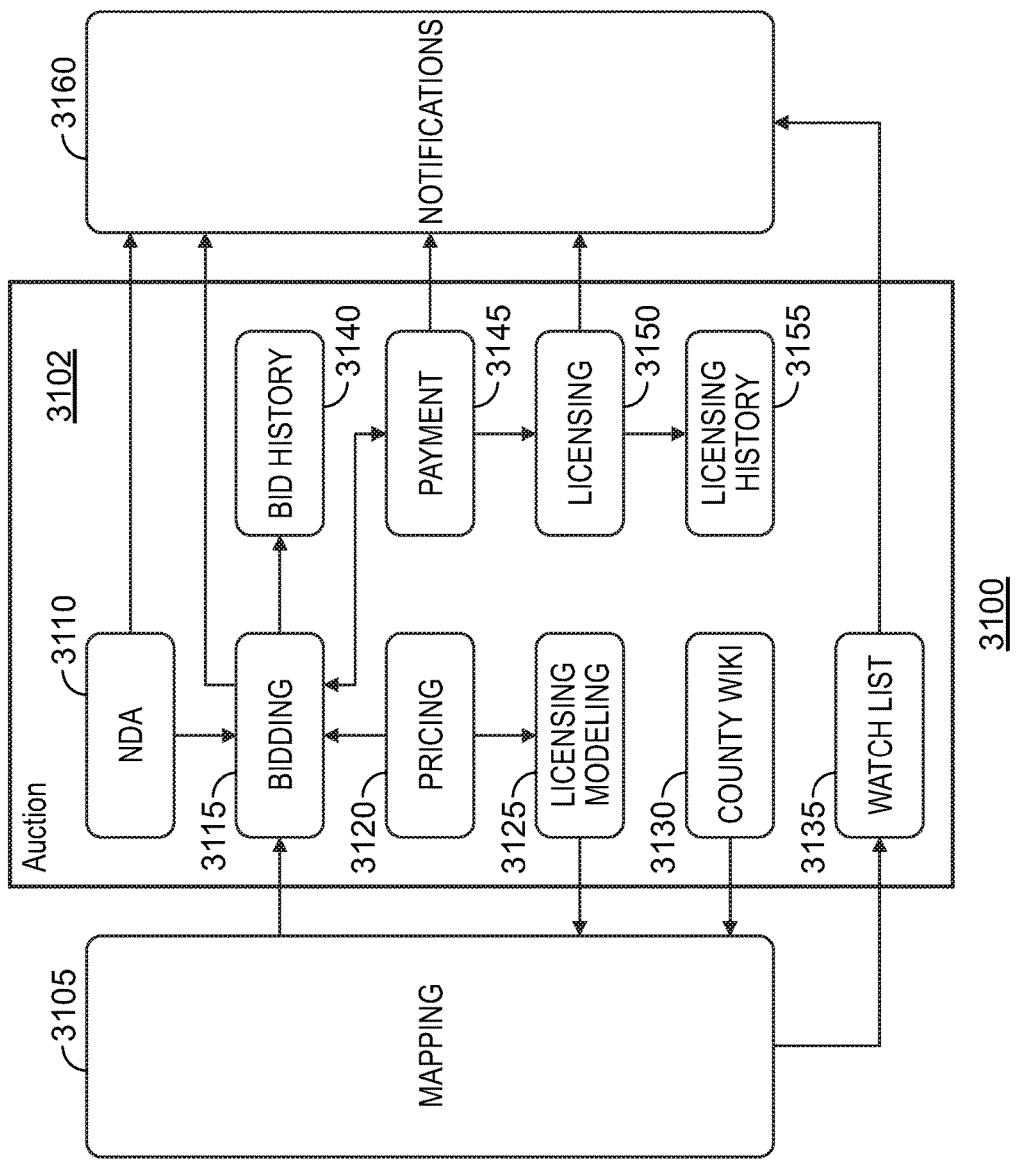
FIG. 31 is a flowchart providing a high level overview of an auction conducted according to a method for operating an e-commerce system.

FIG. 31 is a flowchart providing a high level overview of a system 3100 for conducting an auction 3102 conducted according to a method for operating an e-commerce system. The system 3100 comprises mapping 3105. In this example, the auction 3102 comprises NDA completion 3110, bidding 3115, pricing 3120, licensing modeling 3125, county wiki 3130, watch list 3135, bid history 3140, payment 3145, licensing 3150, and licensing history 3155. The system 3100 also comprises notifications 3160. Also depicted are the logical flows between these elements.

Figure 32:
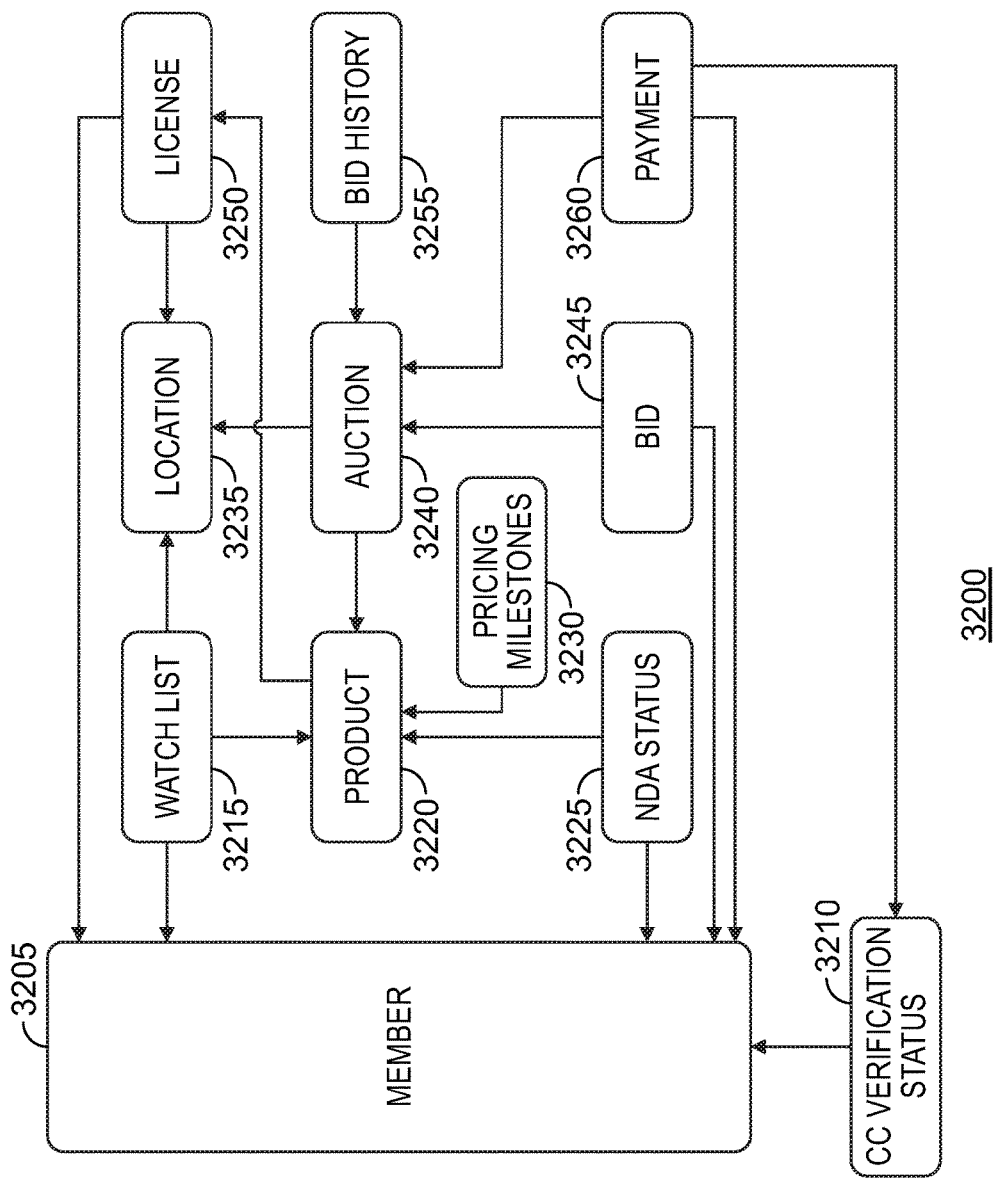
FIG. 32 is a flowchart providing a logical overview of an auction conducted according to a method for operating an e-commerce system.

FIG. 32 is a flowchart 3200 providing a logical overview of an auction conducted according to a method for operating an e-commerce system. Depicted are member 3205, credit card verification status 3210, watch list 3215, product 3220, NDA status 3225, pricing milestones 3230, location to which the auctioned property pertains 3235, auction 3240, bid 3245, license 3250, bid history 3255, and payment 3260, as well as logical flows between these elements.

Figure 33A:
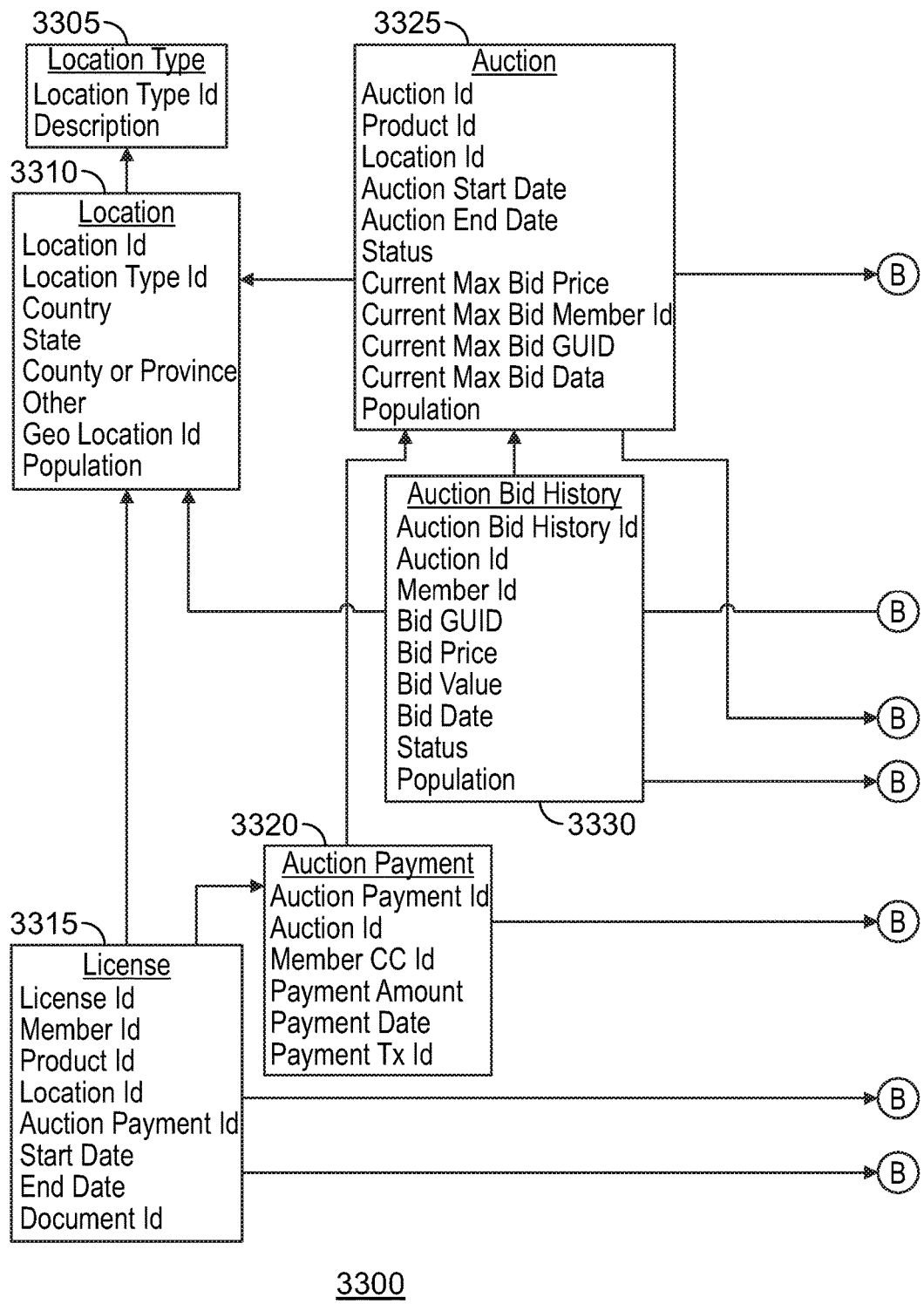
FIG. 33 is a flowchart providing a database model of an auction conducted according to a method for operating an e-commerce system.
Figure 33B:
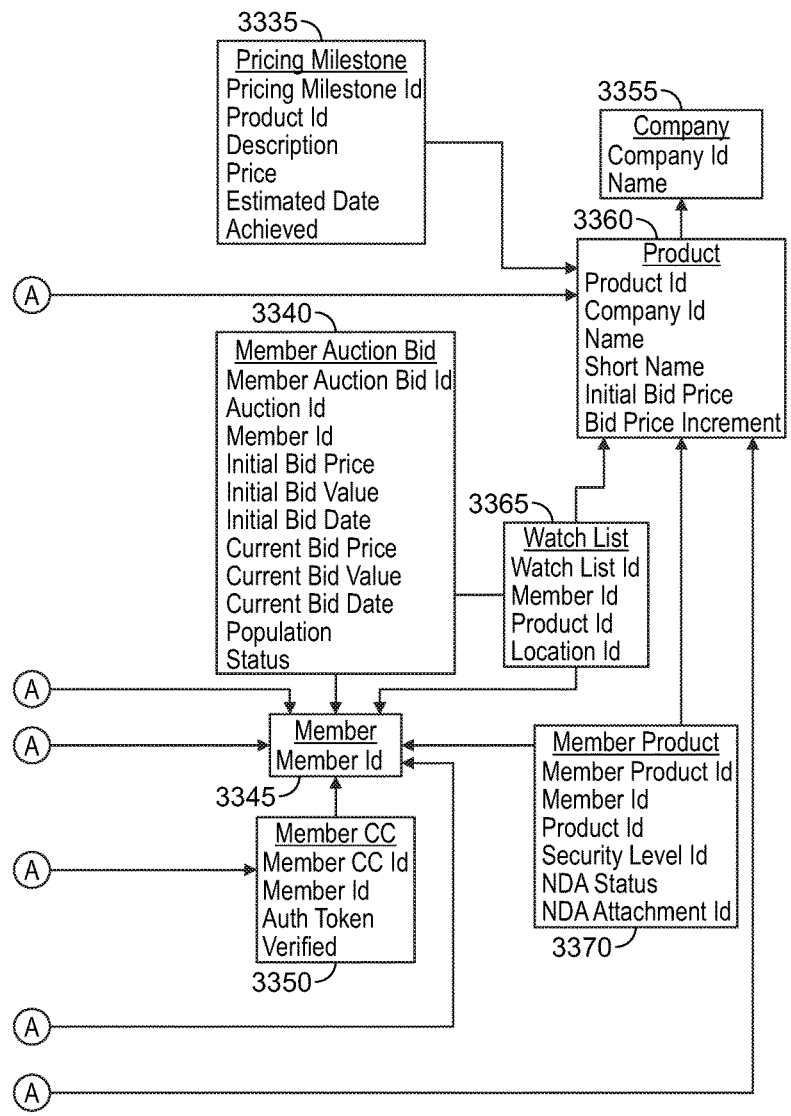

FIG. 33 is a flowchart 3300 providing a database model of an auction conducted according to a method for operating an e-commerce system. Depicted are location type 3305, location to which the auctioned property pertains 3310, license 3315, auction payment 3320, auction 3325, auction bid history 3330, pricing milestone 3335, member auction bid 3340, member 3345, member credit card 3350, company 3355, product 3360, watch list 3365, and member product 3370, as well as logical flows between these elements.

Location type 3305 comprises one or more of location type ID and description. Location 3310 comprises one or more of location ID, location type ID, country, state, county or province, other, geographic location ID, and population. License 3315 comprises one or more of license ID, member ID, product ID, location ID, auction payment ID, start date, end date, and document ID. Auction payment 3320 comprises one or more of auction payment ID, auction ID, member credit card ID, payment amount, payment date, and payment transaction ID. Auction 3325 comprises one or more of auction ID, product ID, location ID, auction start date, auction end date, status, current maximum bid price, current maximum bid value, current maximum bidder member ID, current maximum bidder globally unique identifier (GUID), current maximum bid date, and population.

Auction bid history 3330 comprises one or more of auction bid history ID, auction ID, member ID, bidder GUID, bid price, bid value, bid date, status, and population. Pricing milestone 3335 comprises one or more of pricing milestone ID, product ID, description, price, estimated date, and achieved. Member auction bid 3340 comprises one or more of member auction bid ID, auction ID, member ID, initial bid price, initial bid value, initial bid date, current bid price, current bid value, current bid date, population, and status. Member 3345 comprises member ID. Member credit card 3350 comprises one or more of member credit card ID, member ID, authentication token, and verified.

Company 3355 comprises one or more of company ID and name. Product 3360 comprises one or more of product ID, company ID, name, short name, initial bid price, and bid price increment. Watch list 3365 comprises one or more of watch list ID, member ID, product ID, and location ID. Member product 3370 comprises one or more of member product ID, member ID, product ID, security level ID, NDA status, and NDA attachment ID.

Figure 34:
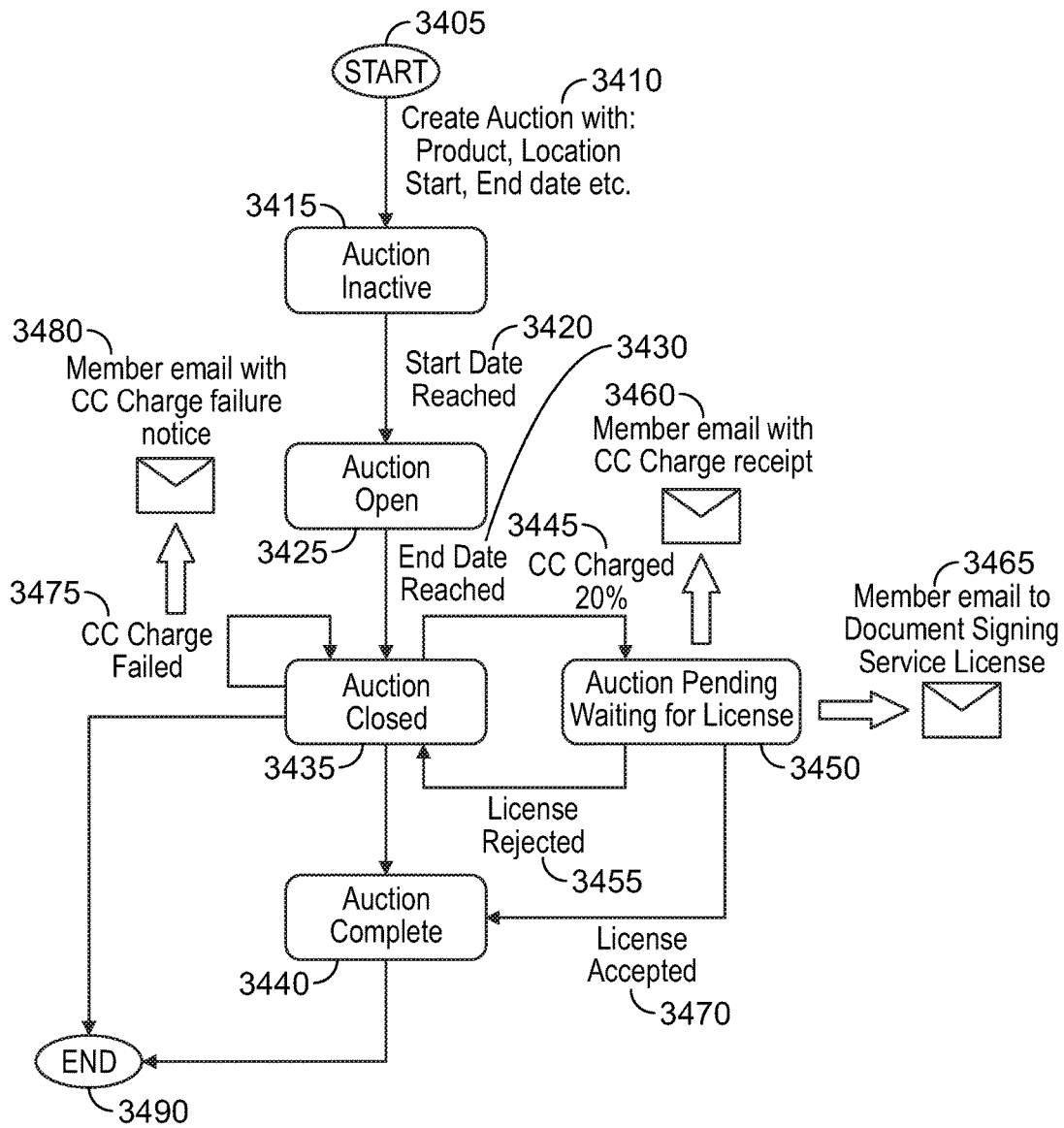
FIG. 34 is a schematic flowchart providing an overview of steps in an auction conducted according to a method for operating an e-commerce system.

FIG. 34 is a schematic flowchart 3400 providing an overview of steps in an auction conducted according to a method for operating an e-commerce system. Depicted are start 3405, create auction 3410, auction inactive 3415, start date reached 3420, auction open 3425, end date reached 3430, auction closed 3435, auction complete 3440, credit card charged 20% 3445, auction pending waiting for license 3450, member email with credit card charge receipt 3460, member email to document signing license service 3465, license accepted 3470, credit card charge failed 3475, member email with credit charge failure notice 3480, and end 3490, as well as logical flows between these elements.

Figure 35:
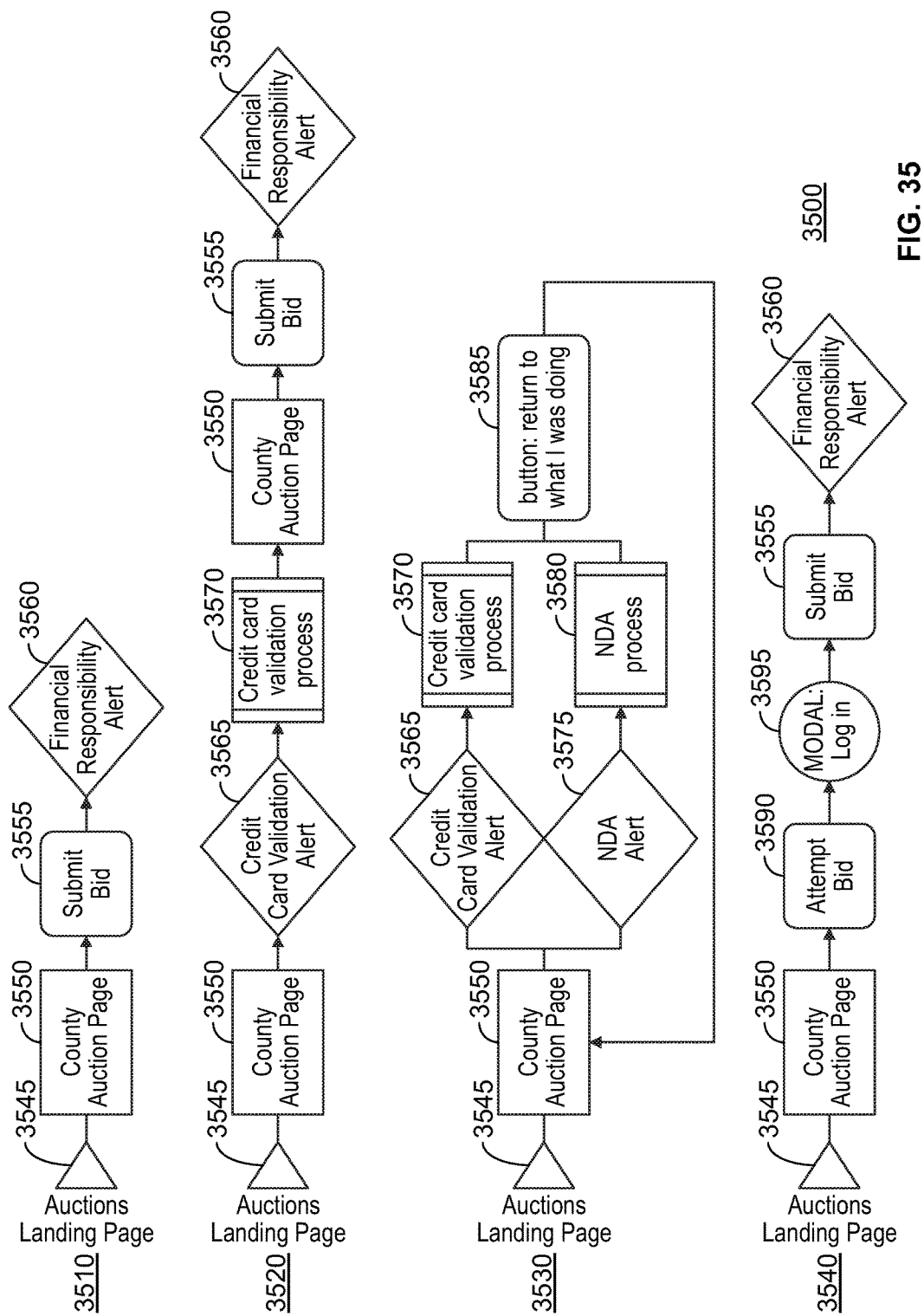
FIG. 35 is a set of schematic flowcharts providing overviews of steps for four different scenarios of an auction conducted according to a method for operating an e-commerce system.

FIG. 35 is a set 3500 of schematic flowcharts 3510, 3520, 3530, and 3540 providing overviews of steps for four different scenarios of an auction conducted according to a method for operating an e-commerce system. The scenario depicted by flowchart 3510 is a best case scenario in which the user is logged into the e-commerce system. The scenario depicted by flowchart 3520 is a scenario in which the user is logged into the e-commerce system, an NDA is on file, and there is no validated credit card for the user. The scenario depicted by flowchart 3530 is a scenario in which the user is logged into the e-commerce system, no NDA is on file, and there is no validated credit card for the user. The scenario depicted by flowchart 3540 is a scenario in which the user is a registered bidder who is not logged into the e-commerce system.

According to the best case scenario 3510 in which the user is logged into the e-commerce system, the auction process begins at an auctions landing page 3545. Next is a county auction page 3550, followed by a bid submission 3555, and then a financial responsibility alert 3560.

According to the scenario 3520 in which the user is logged into the e-commerce system, an NDA is on file, and there is no validated credit card for the user, the auction process again begins at the auctions landing page 3545, and again moves next to the county auction page 3550. The next step is a credit card validation alert 3565, followed by a credit card validation process 3570. Next the process in this scenario 3520 returns to the county auction page 3550, followed by the bid submission 3555, and finally the financial responsibility alert 3560.

According to the scenario 3530 in which the user is logged into the e-commerce system, no NDA is on file, and there is no validated credit card for the user, the auction process again begins at the auctions landing page 3545, and again moves next to the county auction page 3550. The next step branches to the credit card validation alert 3565 and also to an NDA alert 3575. Following the credit card validation alert 3565, the credit card validation process occurs. Following the NDA alert 3575, an NDA process 3580 occurs. The branches re-combine in the next step, a resume button 3585 in which the user returns to what he or she was doing. Next the process loops back to the county auction page 3550.

According to the scenario 3540 in which the user is a registered bidder who is not logged into the e-commerce system, the auction process again begins at the auctions landing page 3545, and again moves next to the county auction page 3550. The next step is a bit attempt 3590, followed by a log in 3595. Next is the bid submission 3555, and next is the financial responsibility alert 3560.

Figure 36:
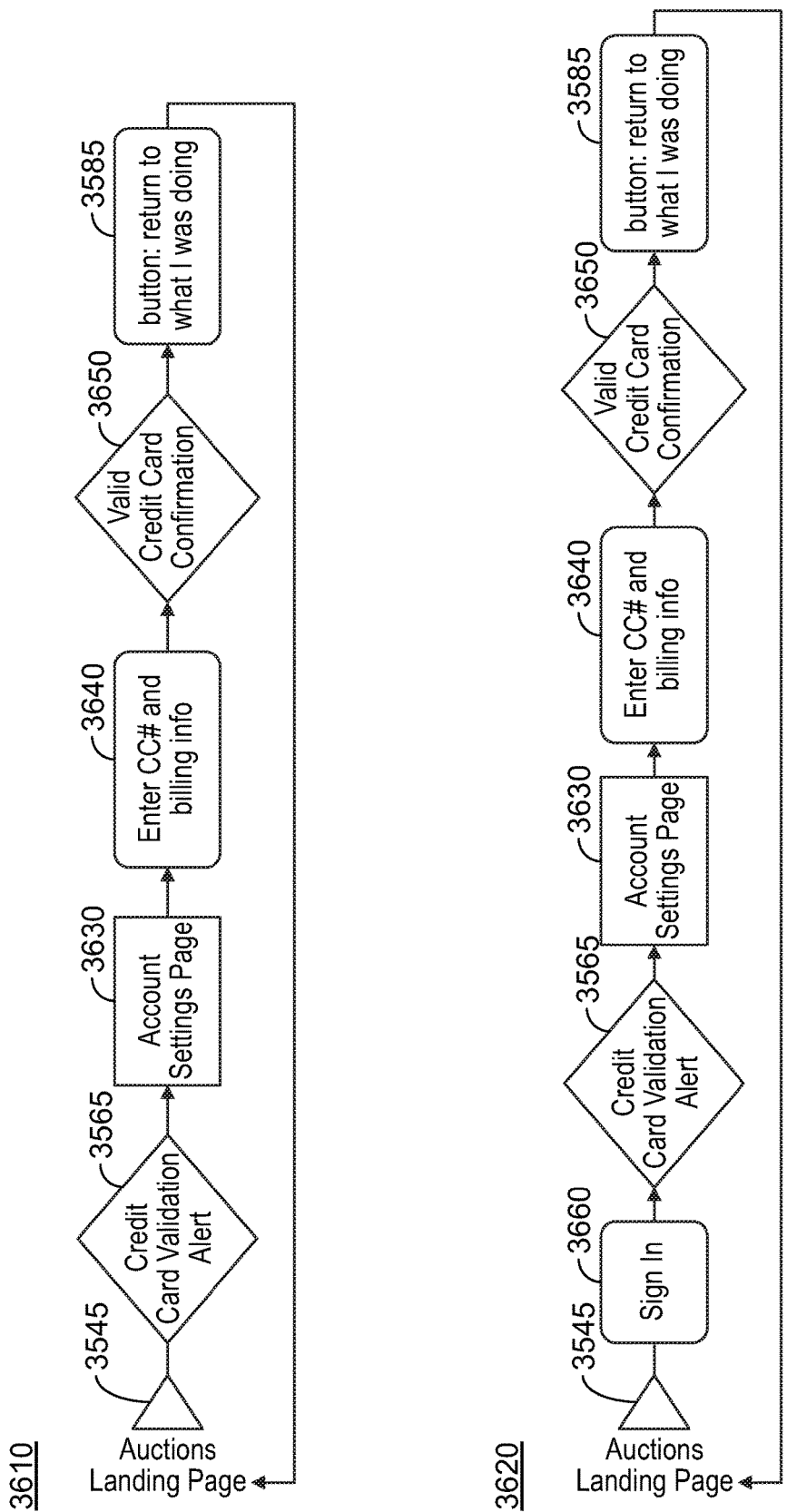
FIG. 36 is a schematic flowchart providing an overview of steps for two different scenarios in credit card validation pursuant to an auction conducted according to a method for operating an e-commerce system.

FIG. 36 is a set 3600 of schematic flowcharts 3610 and 3620 providing an overview of steps for two different scenarios in credit card validation pursuant to an auction conducted according to a method for operating an e-commerce system. The scenarios are a scenario depicted by flowchart 3610 in which the user is logged in and a scenario depicted by flowchart 3620 in which the user is not logged in.

According to a logged-in scenario 3610 in which the user is logged into the e-commerce system, the credit card validation process begins at the auctions landing page 3545. Next is the credit card validation alert 3565, after which an account settings page 3630 is accessed. Next the user is prompted to enter credit card number and billing information 3640. Next is a valid credit card confirmation 3650. Next is the resume button 3585 in which the user returns to what he or she was doing. Then the process reverts to the auctions landing page 3545.

According to a not logged-in scenario 3620 in which the user is not logged into the e-commerce system, the credit card validation process begins at the auctions landing page 3545. Next is a sign in page 3660, after which the process proceeds to the credit card validation alert 3565, after which the account settings page 3630 is accessed. Next the user is prompted to enter credit card number and billing information 3640. Next is the valid credit card confirmation 36 3650. Next is the resume button 3585 in which the user returns to what he or she was doing. Then the process reverts to the auctions landing page 3545.

Figure 37:
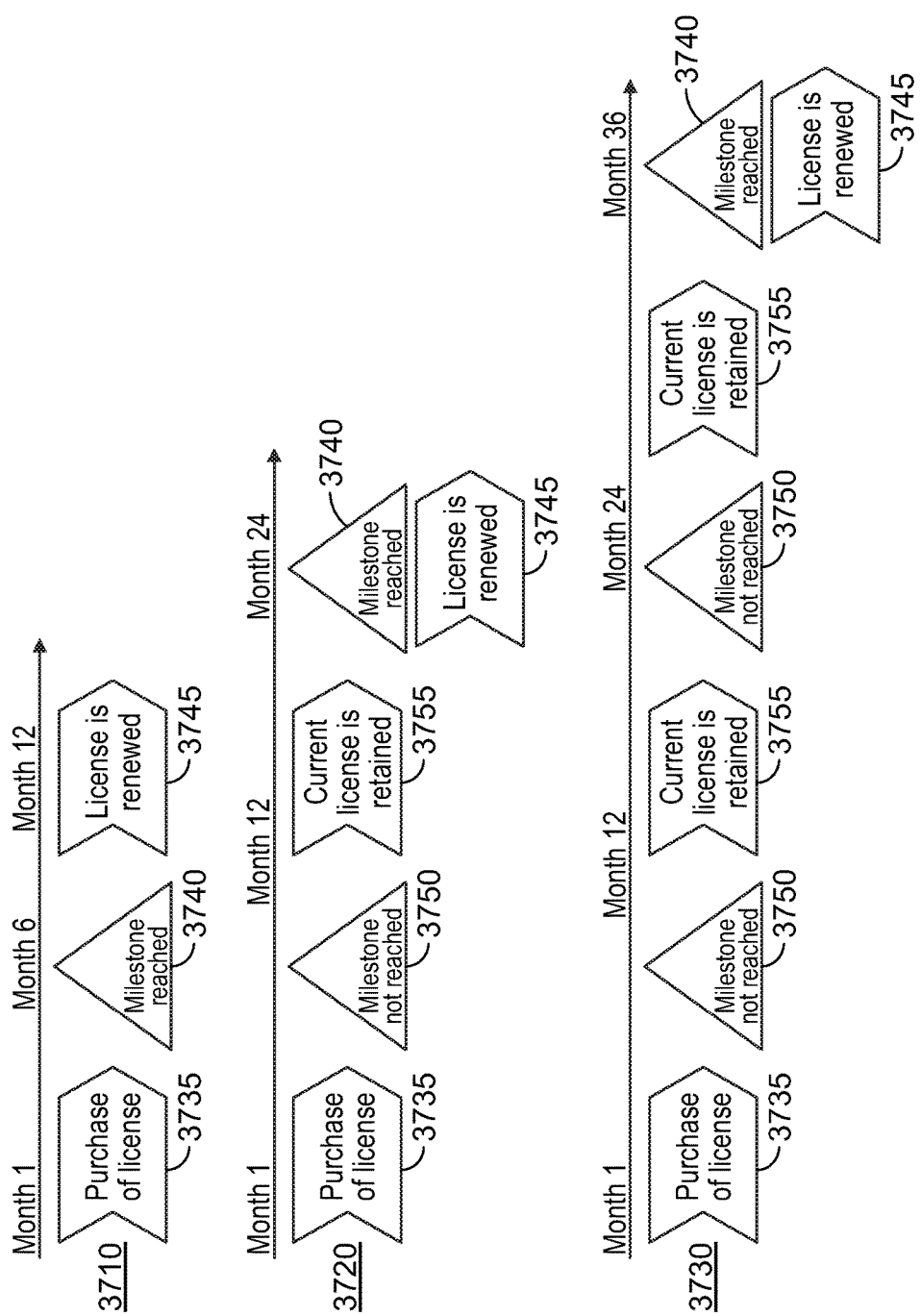
FIG. 37 is a set of schematic flowcharts providing summaries of steps in license renewal for three different scenarios of an auction conducted according to a method for operating an e-commerce system.

FIG. 37 is a set 3700 of schematic flowcharts 3710, 3720, and 3730 providing summaries of steps in license renewal for three different scenarios of an auction conducted according to a method for operating an e-commerce system.

According to the first scenario 3710, a license renewal process begins with purchase of the license 3735, continues on to milestone reached 3740, and continues to license is renewed 3745.

According to the second scenario 3720, the license renewal process again begins with the purchase of the license 3735, and continues on to milestone not reached 3750. The next step is current license is retained 3755, and in the next step a milestone is reached 3740 and the license is renewed 3745.

According to the third scenario 3730, the license renewal process again begins with the purchase of the license 3735, again continuing on to milestone not reached 3750, and again continuing to the current license is retained 3755. Next again the milestone is not reached 3750, and again the current license is retained 3755. In the next step a milestone is reached 3740 and the license is renewed 3745.

Figure 38:
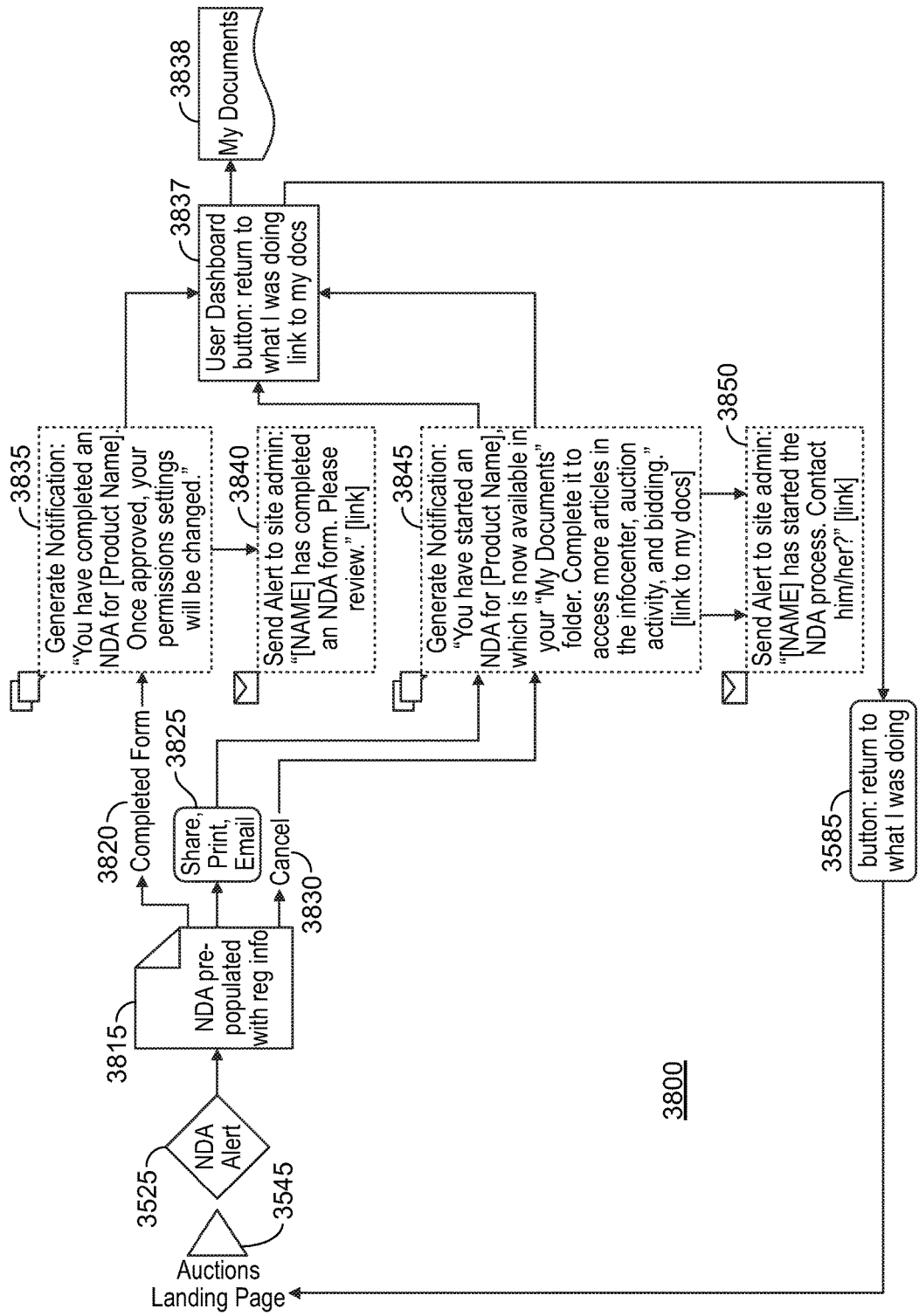
FIG. 38 is a flowchart providing an overview of steps in completion of a nondisclosure agreement (NDA) pursuant to an auction conducted according to a method for operating an e-commerce system.

FIG. 38 is a flowchart 3800 providing an overview of steps in completion of an NDA pursuant to an auction conducted according to a method for operating an e-commerce system. The NDA completion process begins with the auctions landing page 3545 and continues to the NDA alert 3575. Next in step 3815, the NDA is pre-populated with information obtained from the user's registration. Next the process branches in three different directions, proceeding next to completed form step 3820 in case the NDA is completed, to share, print, and email NDA form step 3825 in the case of a partially completed NDA, and to cancel step 3830 in case the user wishes to cancel the process.

From completed form step 3820, the process proceeds to a completed NDA notification step 3835. A sample completed NDA notification 3835 might read, "You have completed an NDA for [product name]. Once approved, your permissions settings will be changed." The process next sends a site administrator alert 3840 to the site administrator. A sample site administrator alert 3840 might read, "[Name] has completed an NDA form. Please review. [link]." From the completed NDA notification step 3835, the process also proceeds to a user dashboard button 3837. For example, the user dashboard button comprises a button in which the user is offered the opportunity to return to what he or she was doing. For example, the user dashboard button comprises a button offering the user the opportunity to link to his or her documents. If the user elects to be linked to My Documents, next the user is taken to a My Documents folder 3838. If the user elects to resume, the user is taken to the resume button 3585 in which the user returns to what he or she was doing. Then the user proceeds back to the auctions landing page 3545.

The email NDA step 3825 and the cancel step 3830 both offer the user an opportunity to do one or more of share the NDA, print the NDA, email the NDA, transmit the NDA by another method, and perform another action on the NDA. Next the process proceeds to a non-completed NDA notification step 3845. A sample non-completed NDA notification 3845 might read, You have started an NDA for [product name], which is now available in your "My Documents" folder. Complete it to access more articles in the information center, auction activity, and bidding. [link to]." Next the process proceeds to the user dashboard button 3837, and then—as previously—on to 3838 and also on to the resume button 3585 in which the user returns to what he or she was doing.

Once approved, your permissions settings will be changed." The process next sends a site administrator alert 3840 to the site administrator. A sample site administrator alert 3840 might read, "[Name] has completed an NDA form. Please review. [link]." From the sample notification step 3835, the process also proceeds to a user dashboard button 3837. For example, the user dashboard button again comprises a button in which the user is offered the opportunity to return to what he or she was doing. For example, the user dashboard button again comprises a button offering the user the opportunity to link to his or her documents. If the user elects to be linked to My Documents, next the user is taken to a My Documents folder 3838. If the user elects to resume, the user is taken to the resume button 3585 in which the user returns to what he or she was doing. Then the user again proceeds back to the auctions landing page 3545.

Figure 39:
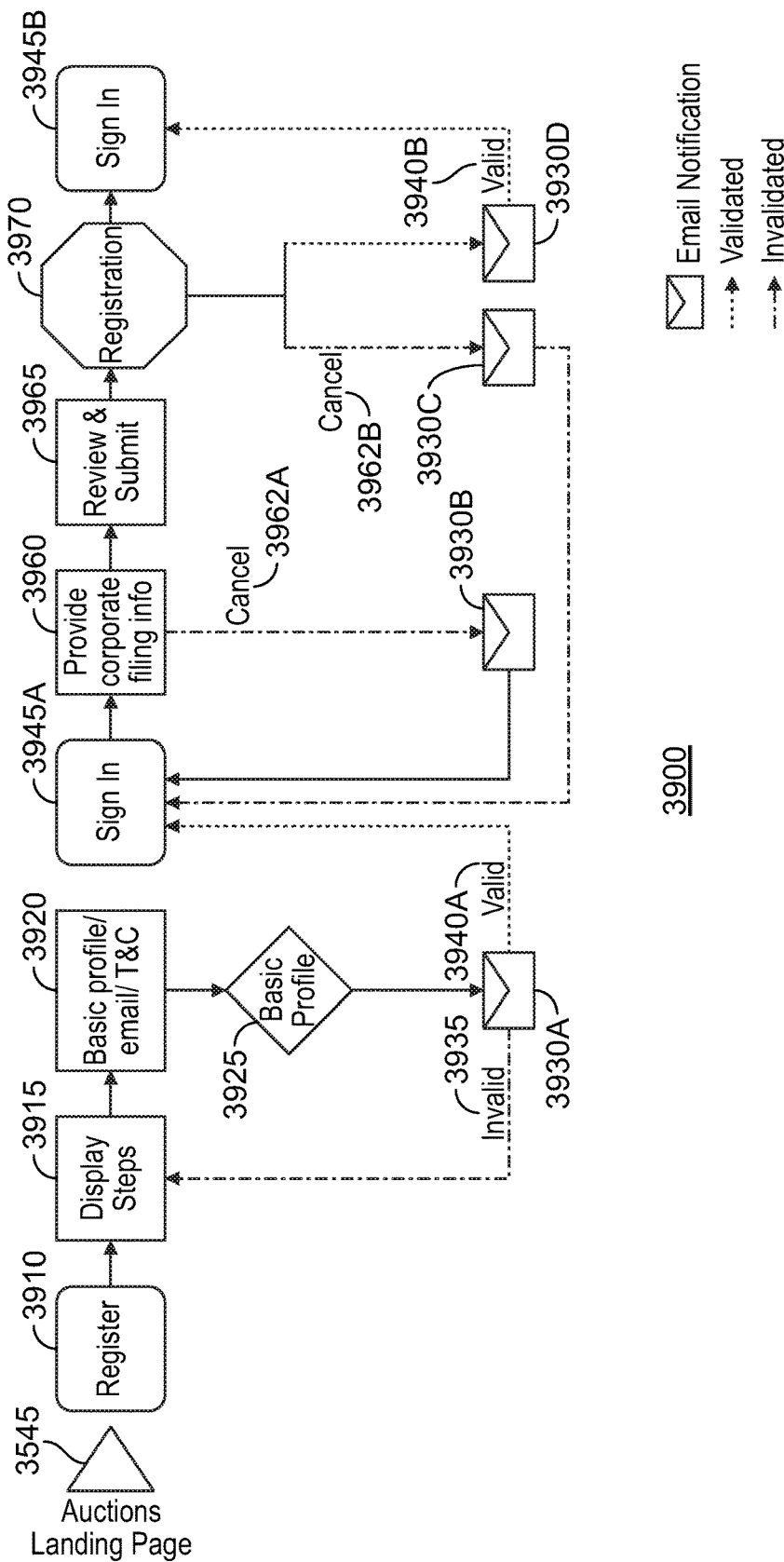
FIG. 39 is a flowchart providing an overview of steps in user registration pursuant to an auction conducted according to a method for operating an e-commerce system.

FIG. 39 is a flowchart 3900 providing an overview of steps in user registration pursuant to an auction conducted according to a method for operating an e-commerce system. The user registration process begins at the auctions landing page 3545. Next is a user registration step 3910. Next is a display steps step 3915. Next is a basic profile/email/terms and conditions step 3920. In step 3920, the user inputs basic profile information including an email address and agrees to registration terms and conditions. Following that is a basic profile validation request step 3925. Next the user validates his email address in a first email validation step 3930A. In case an invalid result 3935 occurs, the process branches back to the display steps step 3915. In case a first valid result 3940A occurs, the process proceeds to a first sign in step 3945A.

After the first sign in step 3945A, the user proceeds to a step 3960 of providing corporate filing information. If a first cancellation 3962A is required or is ordered by the user, the process proceeds to a second email validation step 3930B, and then back to the first sign in step 3945A. After the corporate filing information step 3960, in the absence of a first cancellation 3962A, the process proceeds to a review and submit step 3965, and then to a registration validation step 3970, and branches to a second sign in step 3945B. If a second cancellation 3962B is required or is ordered by the user, the process branches to a third email validation step 3930C, and then back to the first sign in step 3945A. After the registration validation step 3970, in the absence of a second cancellation 3962B, a fourth email validation step 3930D occurs. In case a second valid result 3940B occurs, the process again proceeds to the second sign in step 3945B.

Figure 40:
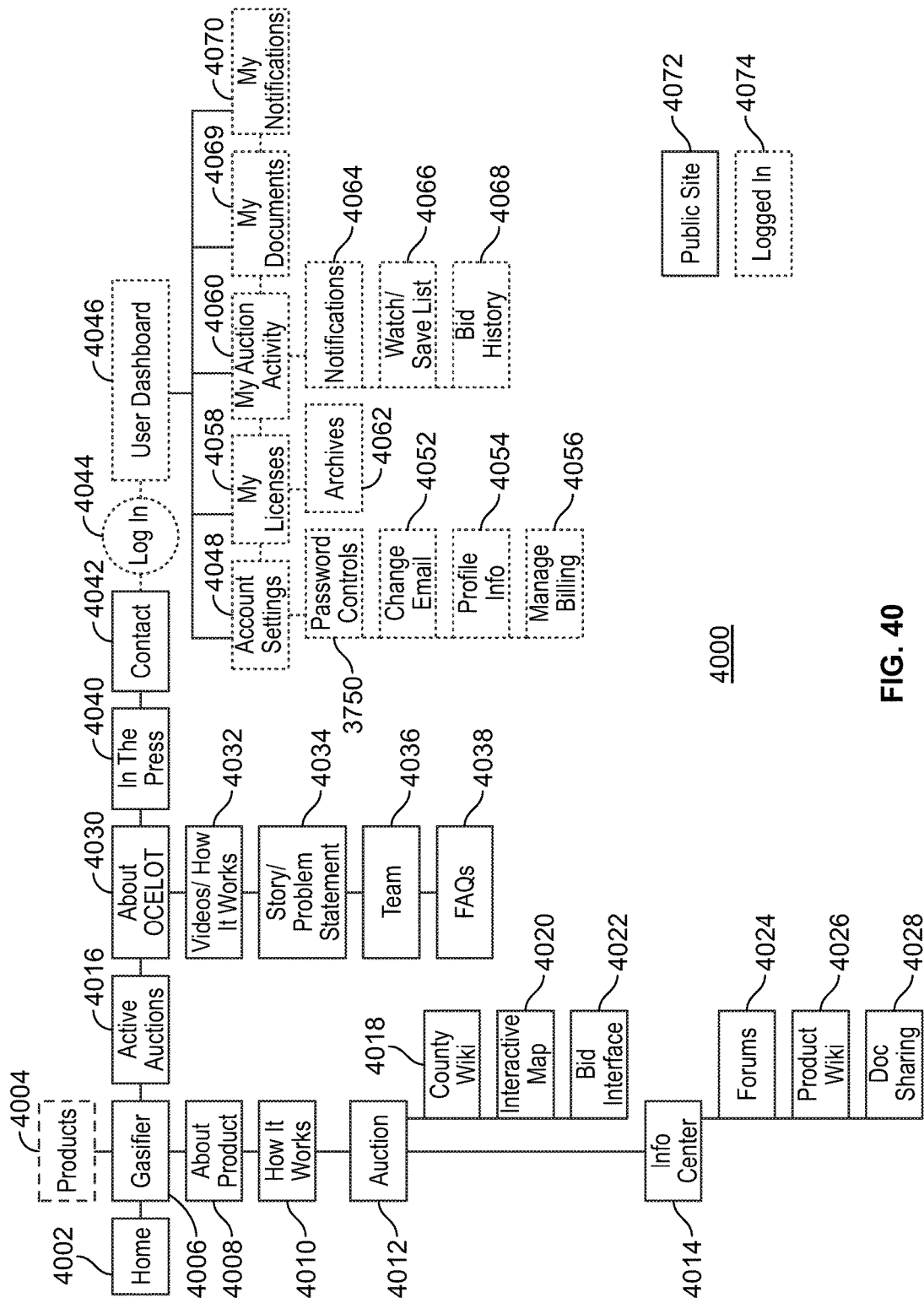
FIG. 40 is a site map of principal components of a community website for the e-commerce system.

FIG. 40 is a site map 4000 of principal components of a community website for the e-commerce system. The site map 4000 includes a home page 4002, a product page 4004, a gasifier page 4006, a product information page 4008, a product operation ("how it works") page 4010, an auction page 4012, and information center 4014, and an active auctions page 4016. The auction page 4012 includes a county wiki 4018, an interactive map 4020, and a bidding interface 4022. The information center 4014 includes a forums page 4024, a product wiki 4026, and a document sharing page 4028.

The site map 4000 also includes an e-commerce system information page 4030 ("about OCELOT"). For example, the e-commerce system information page 4030 includes a media page 4032, a story page 4037, a team page 4036, and a frequently asked questions (FAQs) page 4038. For example, the media page 4032 comprises one or more of video media and audio media. For example, the media page 4032 provides product operation ("how it works") information.

The site map 4000 also includes press information 4040, contact information 4042, a login button 4044, and a user dashboard 4046. The user dashboard 4046 includes an account settings page 4048. For example, the account settings page 4048 include password controls 4050, an email change button 4052, profile information 4054, and a billing management page 4056. The user dashboard 4046 also includes a My Licenses page 4058 and an auction activity page 4060. The My Licenses page 4058 includes an archives page 4062. The auction activity page 4060 includes a notifications page 4064, a watch or save list 4066, and a bid history page 4068. The user dashboard 4046 includes a My Documents page 4069 and a notifications page 3770. The site map 4000 also includes a public site button 3772, and a logged in button 3774.

Figure 41A:
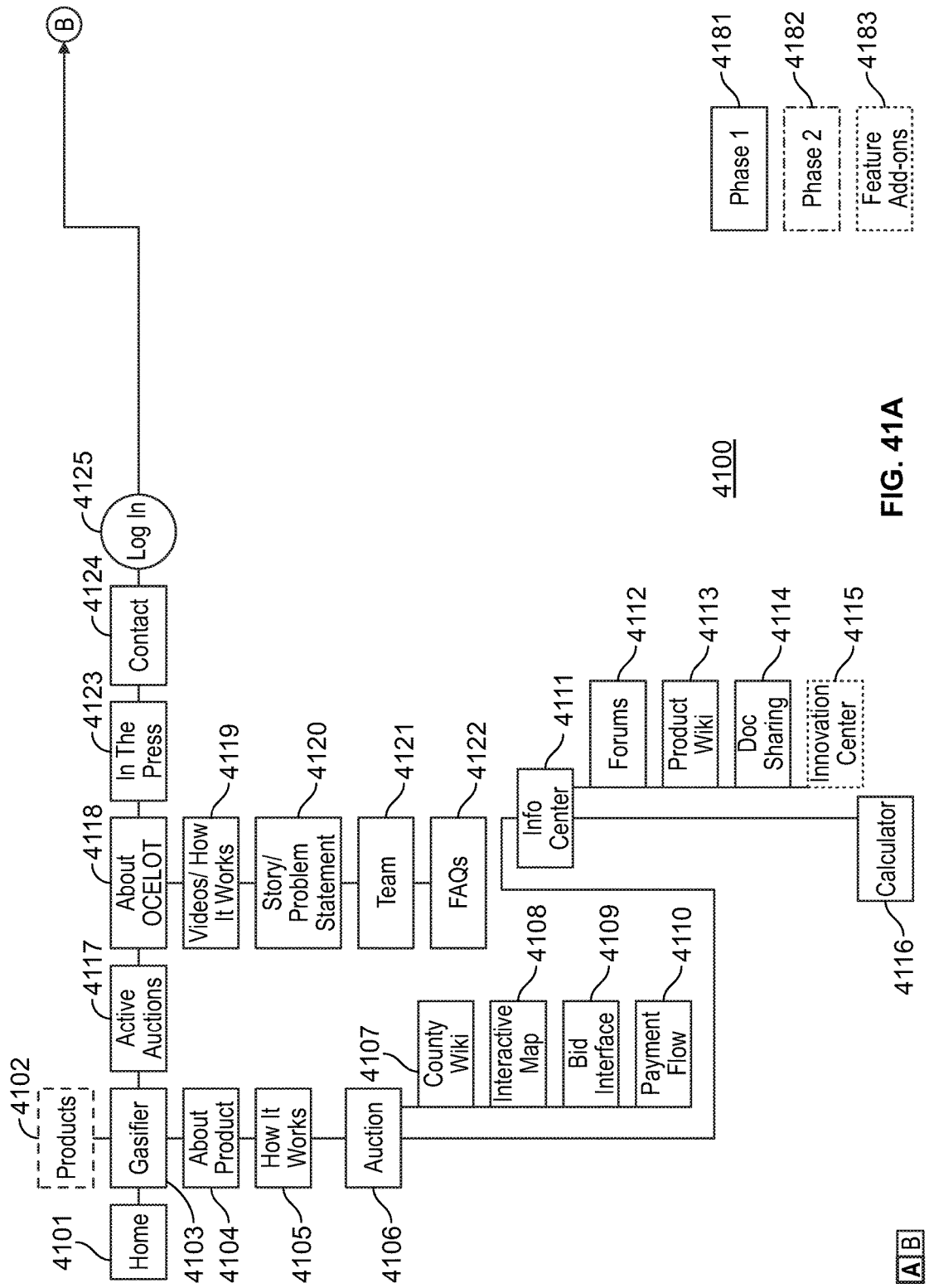
FIG. 41 is a comprehensive site map of a community website for the e-commerce system.
Figure 41B:
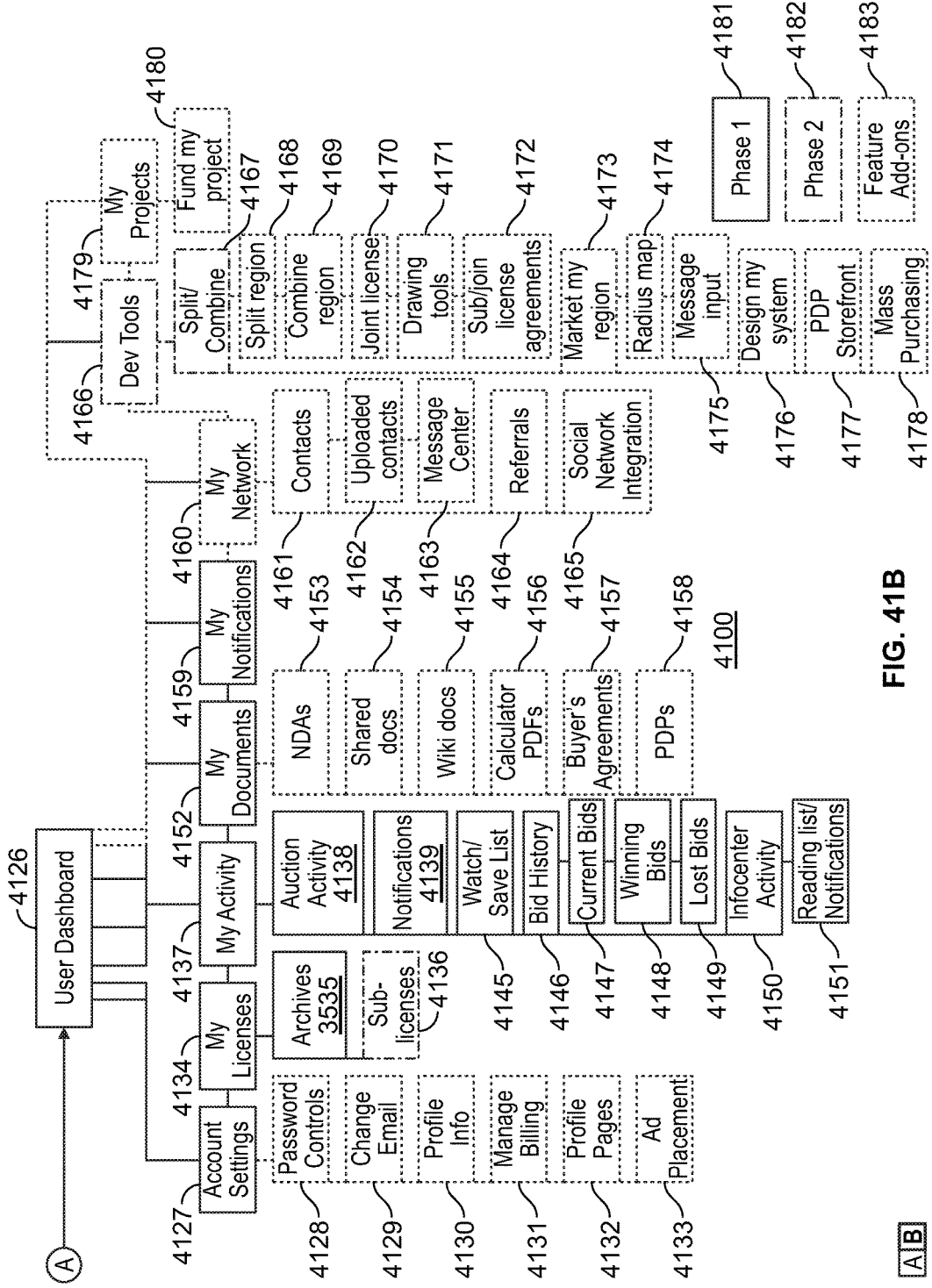

FIG. 41 is a comprehensive site map of a community website for the e-commerce system. The site map 4100 includes a home page 4101, a product page 4102, a gasifier page 4103, a product information page 4104, a product operation ("how it works") page 4105, and an auction page 4106. The auction page 4106 includes a county wiki 4107, an interactive map 4108, a bidding interface 4109, and a payment flow page 4110. The site map 4100 includes an information center 4111. The information center 4111 includes a forums page 4112, a product wiki 4113, a document sharing page 4114, and an innovation center 4115. The site map 4100 also includes a calculator 4116, an active auctions page 4117, and an e-commerce system information page 4118 ("about OCELOT"). For example, the e-commerce system information page 4118 includes a media page 4119, a story page 4120, a team page 4121, and a frequently asked questions (FAQs) page 4122. For example, the media page 4119 comprises one or more of video media and audio media. For example, the media page 4119 provides product operation ("how it works") information.

The site map 4100 also includes press information 4123, contact information 4124, a login button 4125, and a user dashboard 4126. The user dashboard 4126 includes an account settings page 4127. For example, the account settings page 4127 includes password controls 4128, an email change button 4129, profile information 4130, a billing management page 4131, profile pages 4132, and an advertisement placement page 4133.

The user dashboard 4126 also includes a My Licenses page 4134. The My Licenses page 4134 includes an archives page 4135 and a sub-licenses page 4136. The user dashboard 4126 also includes a My Activity page 4137. The My Activity page 4137 includes an auction activity page 4138, a notifications page 4139, a watch or save list 4145, and a bid history page 4146. The bid history page 4146 includes a current bids page 4147, a winning bids page 4148, and a lost bids page 4149. The My Activity page 4137 also includes an information center activity page 4150 and a reading list and notifications page 4151.

The user dashboard 4126 also includes a My Documents page 4152. The My Documents page 4152 includes an NDAs page 4153, a shared documents page 4154, a wild documents page 4155, a calculator Portable Document Formats (PDFs) page 4156, a buyer's agreements page 4157, and a Program Design Packages (PDPs) page 4158.

The user dashboard 4126 also includes a My Notifications page 4159 and a My Network page 4160. The My Network page 4160 includes a contacts page 4161. The contacts page 3861 includes an upload contacts button 4162 and a Message Center page 4163. The My Network page 4160 also includes a referrals page 4164 and a social networks integration button 4165. For example, the social networks integration button 4165 facilitated integration with one or more of Linked In, Facebook, Myspace, Twitter, another employment-related social network, and another social network.

The user dashboard 4126 also includes a development tools page 4166. The development tools page 4166 includes a split and combine tool 4167. The split and combine tool 4167 includes a split region tool 4168, a combine region tool 4169, a joint license tool 4170, a drawing tools page 4171, and a sub-license/join license agreements tool 4172. The sub-license/join license agreements tool 4172 may be used to do one or more of separating currently combined license agreements, and joining currently separated license agreements.

The development tools page 4166 also includes a market my region tool 4173. The market my region tool includes a radius map 4174 and a message input 4175. The development tools page 4166 also includes a design my system tool 4176, a PDP storefront 417, and a mass purchasing tool 4178.

The user dashboard 4126 also includes a My Projects page 4179. The My Projects page 4179 includes a project funding tool ("Fund My Project") 4180.

The site map 4100 also includes a phase 1 button 4181, a phase 2 button 4182, and a feature add-ons page 4183.

Figure 42:
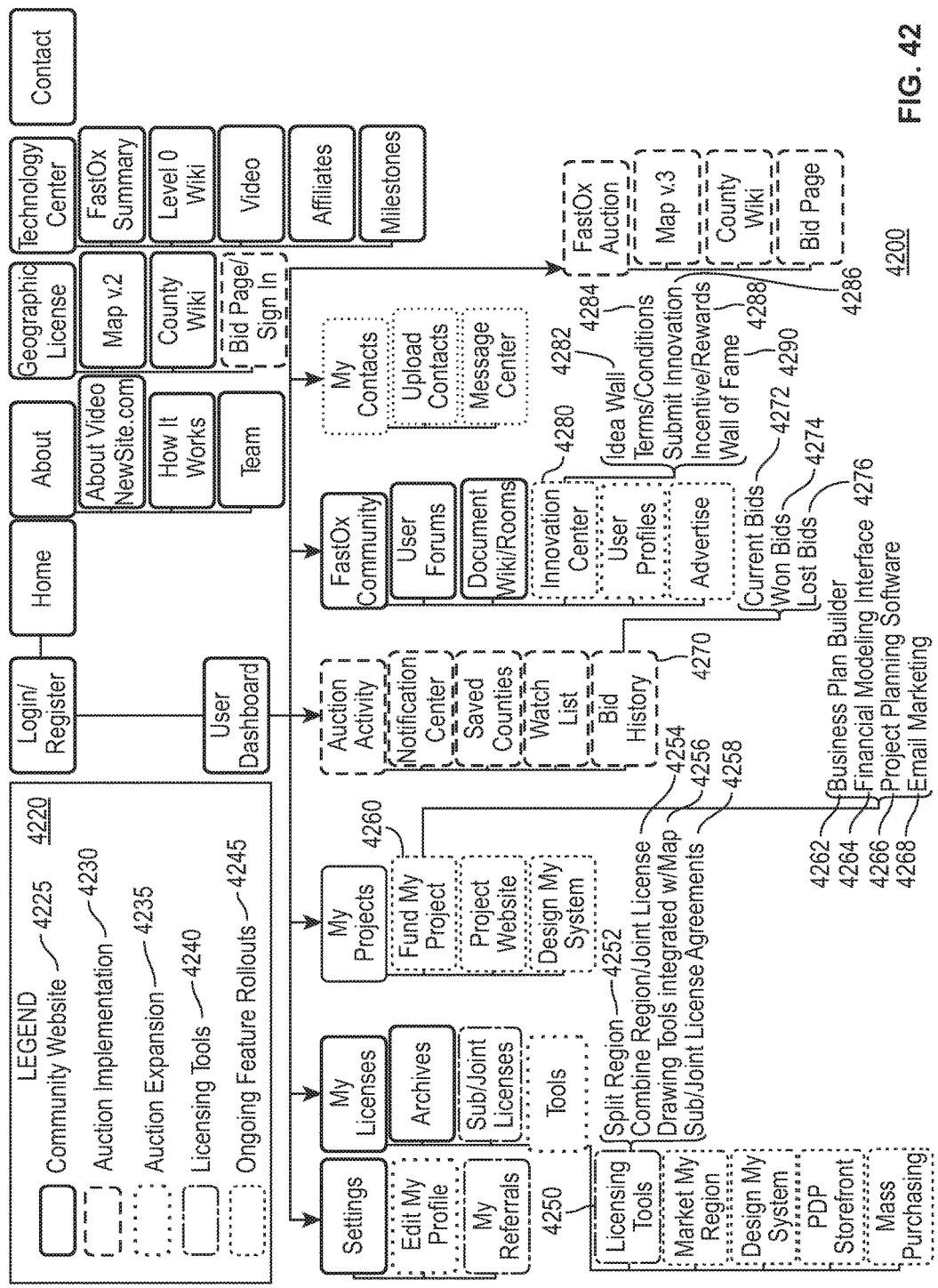
FIG. 42 is a site map of a community website for the e-commerce system.

FIG. 42 is a site map 4200 of a community website for the e-commerce system. The site map 4200 includes a legend 4220 detailing the five categories of site map elements—community website 4225, auction implementation 4230, auction expansion 4235, licensing tools 4240, and ongoing feature rollouts 4245.

Also included in the site map 4200 is one element of licensing tools 4240 which is a split or combine tool 4250. The split or combine tool 4250 may comprise one or more of a tool 4252 to divide one license into several sub-licenses ("Split Region"), a tool 4254 to combine several sub-licenses into one integrated joint license ("Combine Region/Joint License"), drawing tools 4256 integrated with a map, and one or more of sub-license and joint license agreements 4258.

Also included in the site map 4200 is one element of ongoing feature rollouts 4245, which is a funding tool 4260 ("Fund My Project"). The funding tool may comprise one or more of a business plan builder 4262, a financial modeling interface 4264, project planning software 4266, and marketing resources 4268. For example, the marketing resources 4268 may comprise email marketing resources 4268.

Also included in the site map 4200 is one element of auction implementation 4230 which is Bid History 4270. Bid History 4270 in turn comprises three sub-elements, Current Bids 4272, Won Bids 4274, and Lost Bids 4276.

Also included in the site map 4200 is one element of ongoing feature rollouts 4245, which is an innovation center 4280. The innovation center may comprise one or more of an online idea wall 4282, a statement 4284 of one or more of terms and conditions for licensing IP, a mechanism 4286 for submitting a proposed innovation for use or licensing through the community, information 4288 on one or more of royalties and other incentives that may be payable in exchange for donation of member-generated IP, and one or more of a wall of fame 4290 and a rating system 4290 by which a member may receive a rating reflecting that member's contribution to the community.

Figure 43:
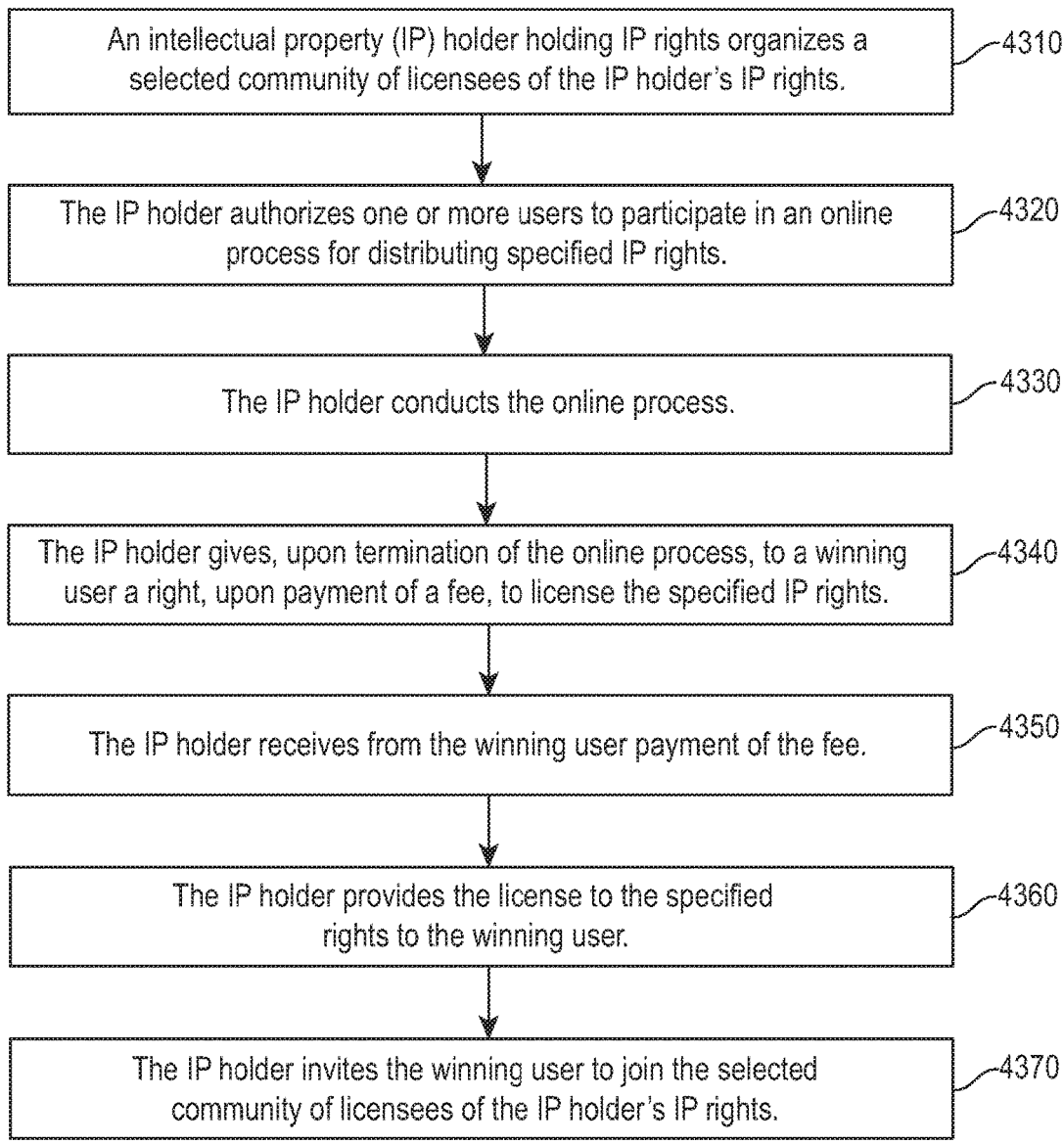
FIG. 43 is a flowchart of a method for operating an e-commerce system.

FIG. 43 is a flowchart of a method 4300 for operating an electronic commerce (e-commerce) system. The order of the steps in the method 4300 is not constrained to that shown in FIG. 43 nor is it constrained to that described in the following discussion. Several of the steps could occur in a different order without affecting the final result.

In block 4310, an intellectual property (IP) holder holding IP rights organizes a selected community of licensees of the IP holder's IP rights. Block 4310 then transfers control to block 4320.

In block 4320, the IP holder authorizes one or more users to participate in an online process for distributing specified IP rights. Block 4320 then transfers control to block 4330.

In block 4330, the IP holder conducts the online process. Block 4330 then transfers control to block 4340.

In block 4340, the IP holder, upon termination of the online process, gives to a winning user a right, upon payment of a fee, to license the specified IP rights. Block 4340 then transfers control to block 4350.

In block 4350, the IP holder receives from the winning user payment of the fee. Block 4350 then transfers control to block 4360.

In block 4360, the IP holder provides the license to the specified IP rights to the winning user. Block 4360 then transfers control to block 4370.

In block 4370, the IP holder invites the winning user to join the selected community of licensees of the IP holder's IP rights. Block 4370 then terminates the process.

Figure 44:
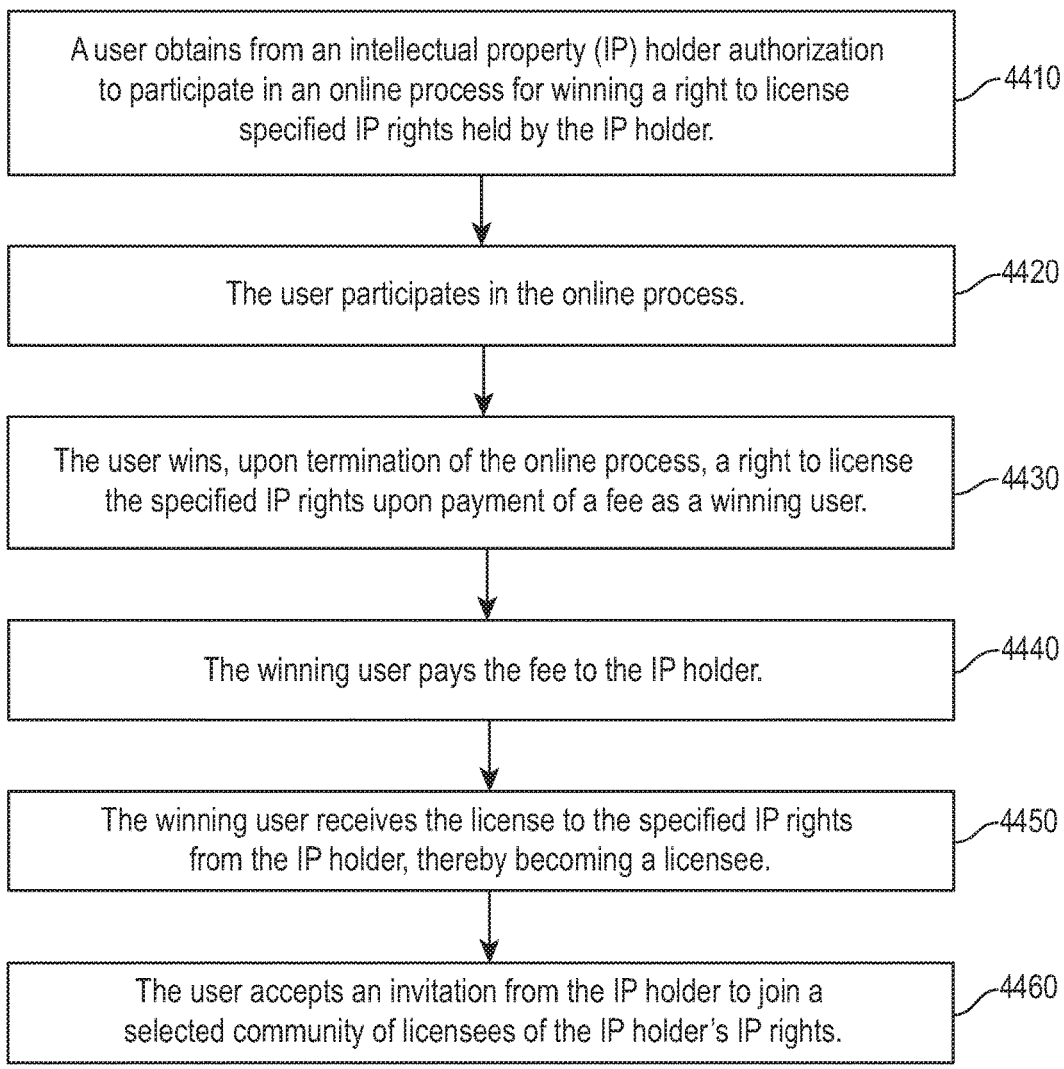
FIG. 44 is a flowchart of a method for participating in an e-commerce system.

FIG. 44 is a flowchart of a method 4400 for participating in an e-commerce system. The order of the steps in the method 4400 is not constrained to that shown in FIG. 44 nor is it constrained to that described in the following discussion. Several of the steps could occur in a different order without affecting the final result.

In block 4410, a user obtains from an intellectual property (IP) holder authorization to participate in an online process offered by the IP holder for winning a right to license specified IP rights held by the IP holder. Block 4410 then transfers control to block 4420.

In block 4420, the user participates in the online process. Block 4420 then transfers control to block 4430.

In block 4430, the user wins, upon termination of the online process, a right to license the specified IP rights upon payment of a fee as a winning user. Block 4430 then transfers control to block 4440.

In block 4440, the winning user pays the fee to the IP holder. Block 4440 then transfers control to block 4450.

In block 4450, the winning user receives the license to the specified IP rights from the IP holder, thereby becoming a licensee. Block 4450 then transfers control to block 4460.

In block 4460, the winning user accepts an invitation from the IP holder to join a selected community of licensees of the IP holder's IP rights. Block 4460 then terminates the process.

Figure 45:
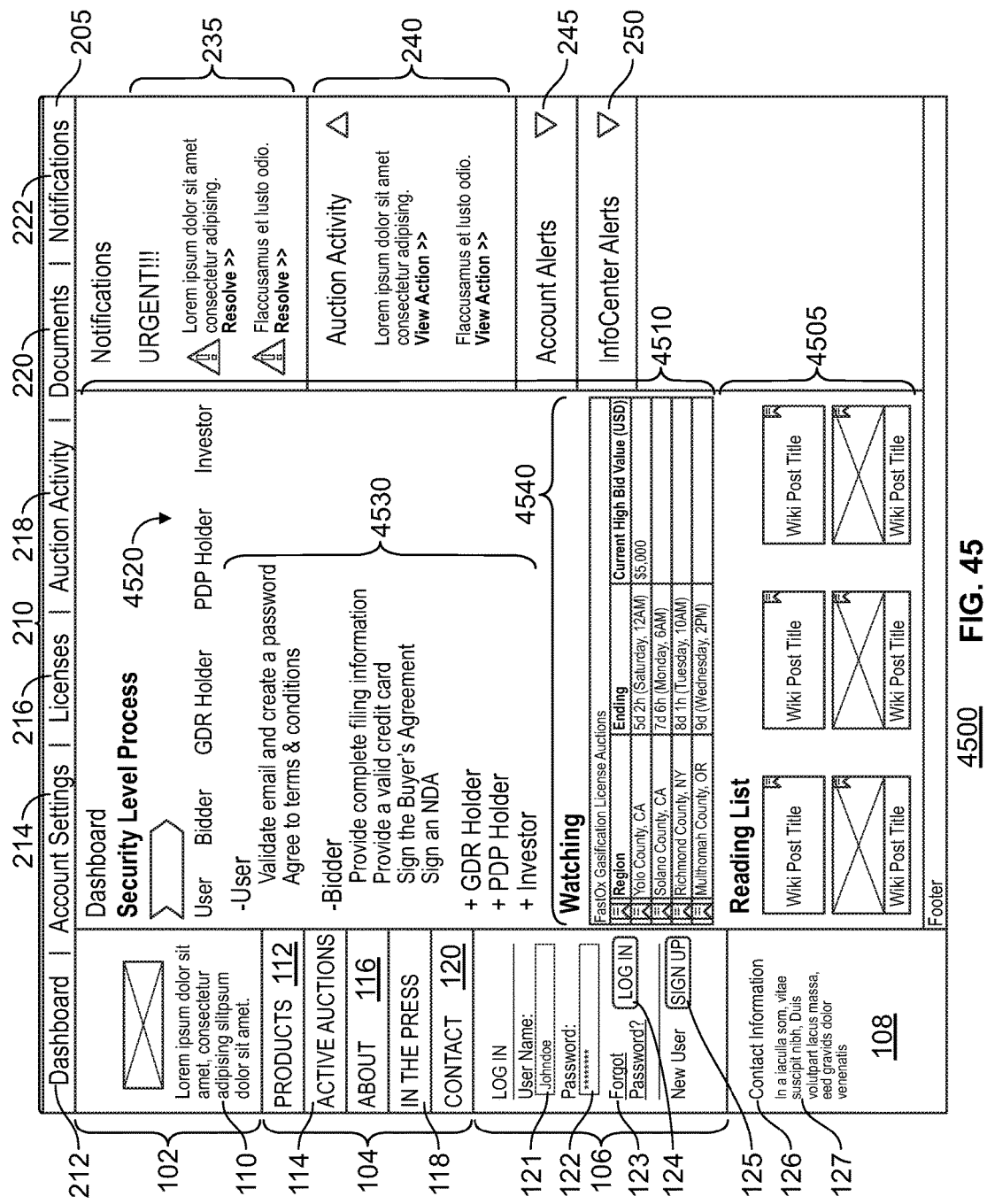
FIG. 45 is a wireframe on a community website of a user administration dashboard page UI at the county level for the e-commerce system.

FIG. 45 is a wireframe on a community website of a user administration dashboard page UI 4500 at the county level for the e-commerce system. The UI 4500 comprises Wiki posts 4505. The UI 4500 again further comprises the urgent notification box 235 comprising the one or more urgent notifications to the user, the auction activity box 240, the account alerts box 245 comprising one or more account alerts for the user, and the notifications box 250 comprising one or more notifications for the user.

The UI 4500 further comprises a dashboard 4510. The dashboard 4510 comprises a security level progress banner 4520, security level progress text 4530, and a watch list 4540. The security level progress banner 4520 may comprise one or more of a user, a bidder, a geographical distribution rights (GDR) holder, a PDP holder, and an investor. The security level progress text 4530 may comprise one or more of user text, bidder text, GDR holder text, PDP holder text, and investor text. In this example, the user text comprises detail level user text, "Validate email and create a password," and "Agree to terms & conditions," and the check marks indicate that these security level progress steps have been completed. In this example, the bidder text comprises detail level bidder text, "Provide complete filing information," "Provide a valid credit card," "Sign the Buyer's Agreement," and "Sign an NDA." In this example, the GDR holder text, the PDP holder text, and the investor text each comprises a plus sign that may be clicked on by a user in order to expand the clicked list to the detail level.

The watch list 4540 comprises one or more bids of interest to the user based on one or more of user selections and previously designated criteria. In this example, the watch list 4540 comprises four auctions, listing for each the region, the ending date and time, and the current high bid value.

Figure 46:
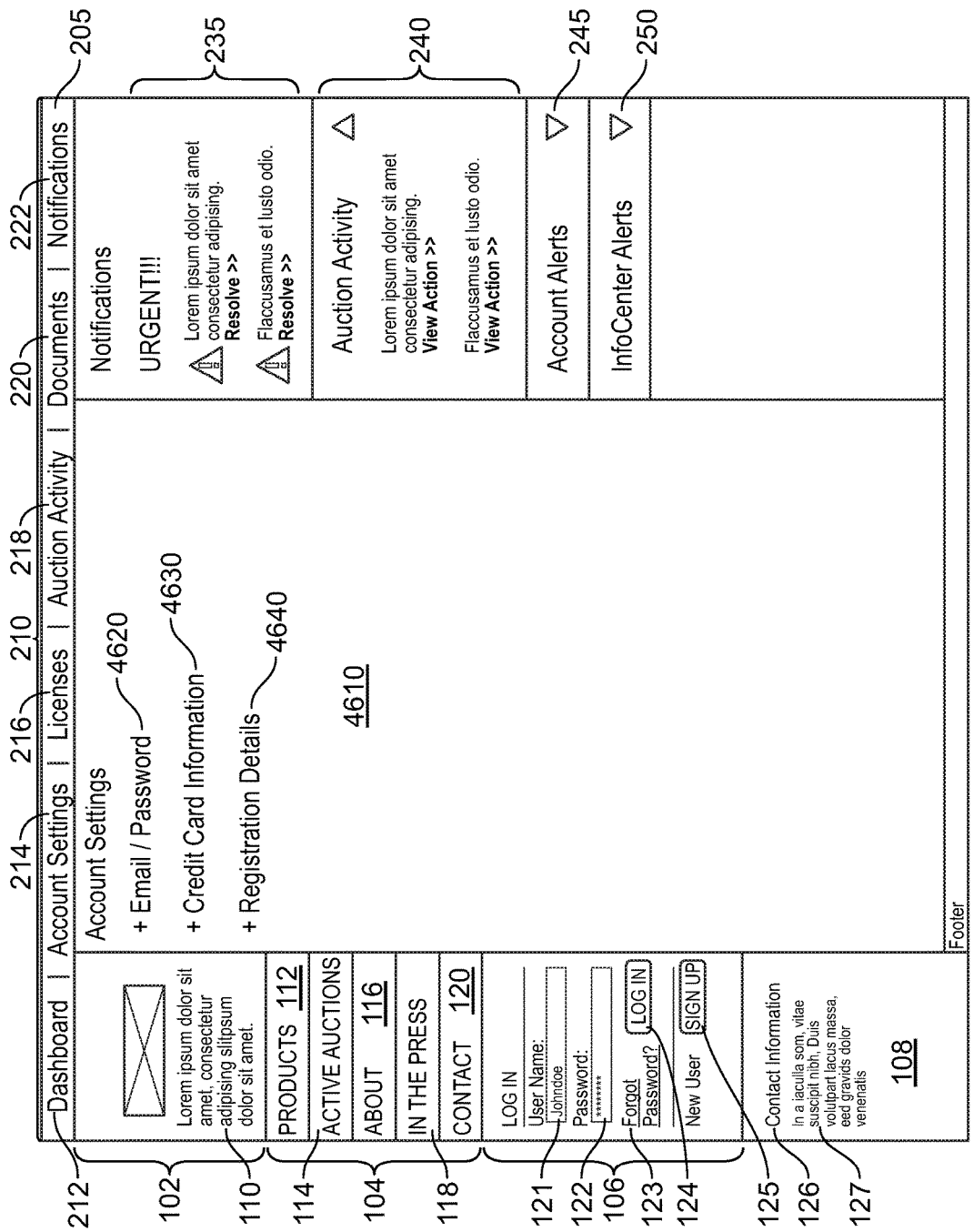
FIG. 46 is a wireframe on a community website of a user administration account settings landing page UI at the county level for the e-commerce system.

FIG. 46 is a wireframe on a community website of a user administration account settings landing page UI 4600 at the county level for the e-commerce system. The UI 4600 comprises an account settings page 4610. In this example, the account settings page 4610 comprises email/password text 4620, credit card information text 4630, and registration details text 4640. In this example, the email/password text 4620, the credit card information text 4630, and the registration details text 4640 each comprises a plus sign that may be clicked on by a user in order to expand the clicked list to the detail level.

Figure 47:
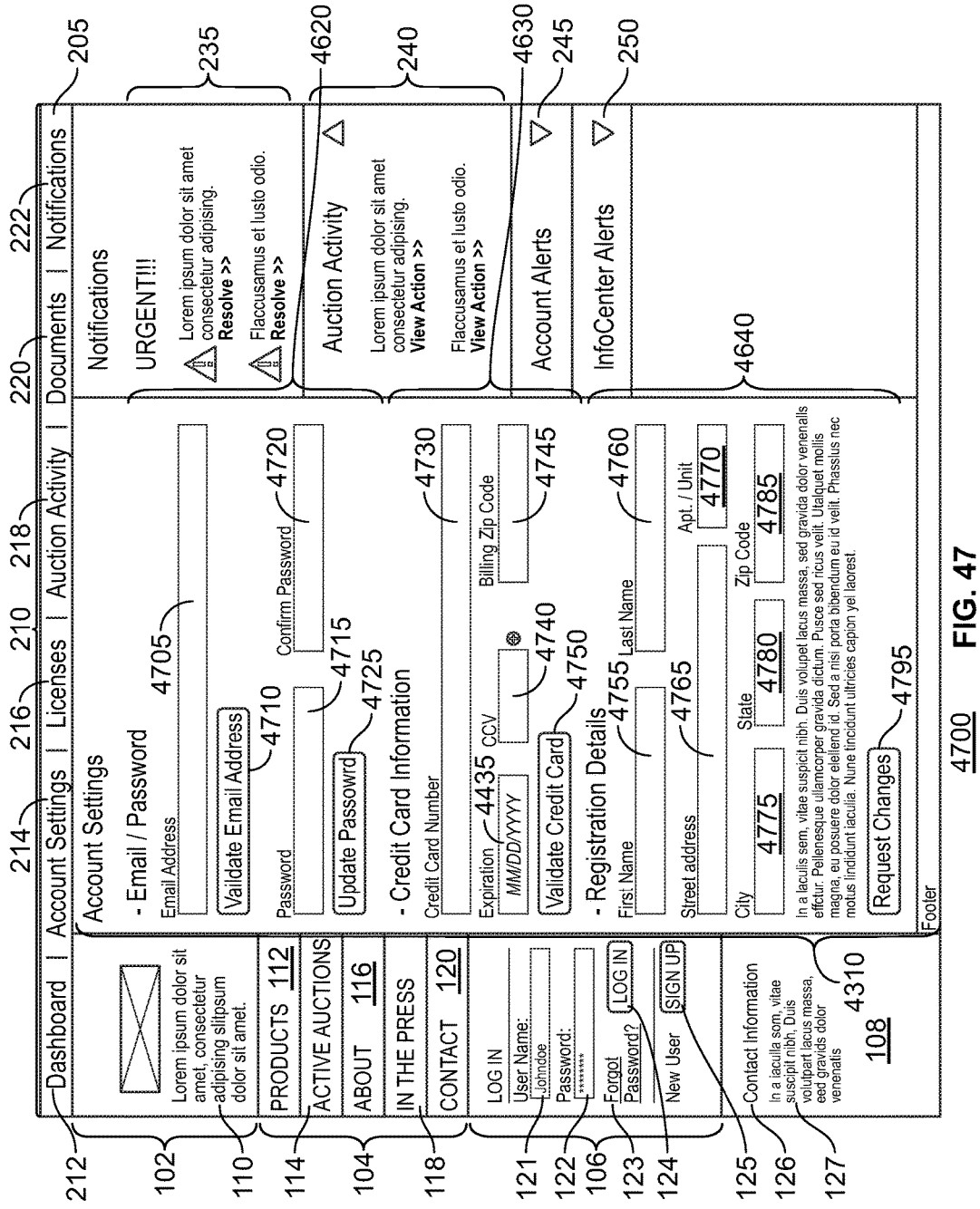
FIG. 47 is a wireframe on a community website of a user administration account settings all sections expanded page UI at the county level for the e-commerce system.

FIG. 47 is a wireframe on a community website of a user administration account settings all sections expanded page UI 4700 at the county level for the e-commerce system. The UI 4700 again comprises the account settings page 4610, which in this example again comprises the email/password text 4620, the credit card information text 4630, and the registration details text 4640. In this example, the email/password text 4620, the credit card information text 4630, and the registration details text 4640 have been expanded to the detail level.

In the detail level view, in this example, the email/password text 4620 comprises an email address box 4705, an email address validation button 4710, a password box 4715, a password confirmation box 4720, and a password update button 4725. In this example, the credit card information text 4630 comprises a credit card number box 4730, a credit card expiration box 4735, a credit card validation (CCV) box 4740, a billing zip code box 4745, and a credit card validation button 4750. In this example, the registration details text 4640 comprises a first name box 4755, a last name box 4760, a street address box 4765, an apartment unit box 4770, a city box 4775, a state box 4780, a zip code box 4785, a registration details fine print text box 4790, and a request changes box 4795.

Figure 48:
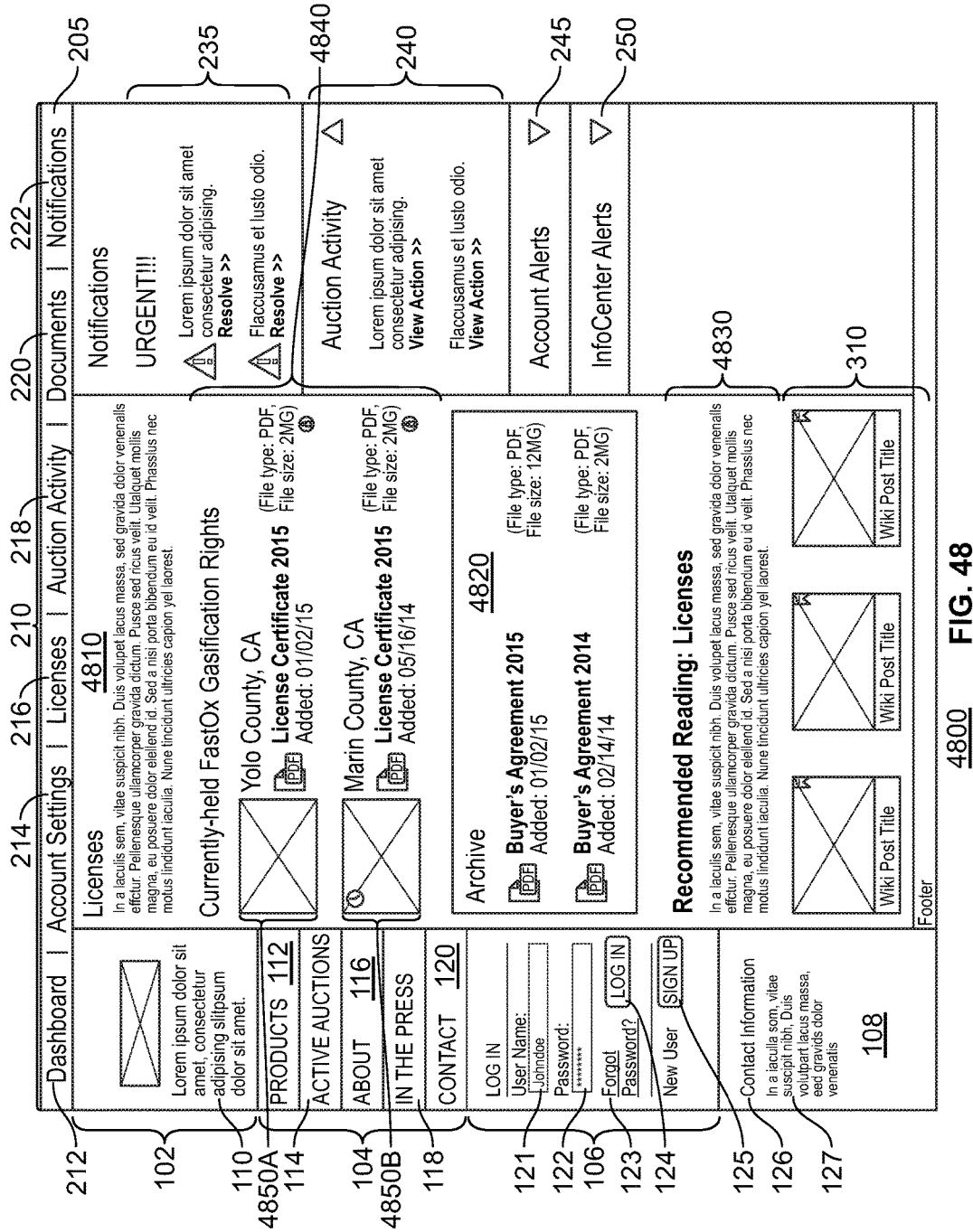
FIG. 48 is a wireframe on a community website of a user administration licenses page UI at the county level for the e-commerce system.

FIG. 48 is a wireframe on a community website of a user administration licenses page UI 4800 at the county level for the e-commerce system. In this example, the UI 4800 comprises a licenses box 4810, a buyer's agreement archive box 4820, and a licenses recommended reading box 4830. In this example, the licenses box 4810 comprises a current licenses listing 4840. In this example, the current licenses listing 4840 comprises a first current license 4840A and a second current license 4840B. In this example, the first current license 4840A comprises a county name, a license certificate, a date of the addition of the license certificate, a file type, and a file size. In this example, the second current license 4840B also comprises a county name, a license certificate, a date of the addition of the license certificate, a file type, and a file size. For example, a user is required to sign a buyer's agreement that contains one or more of the product's licensing terms and the rules of the auction. Once the user has signed the buyer's agreement and has provided any other required qualifying documents, the user then is able to participate in the auction bidding. Upon becoming the highest bidder, the user will then make their payment. After receipt of payment, a license certificate will be issued.

Figure 49:
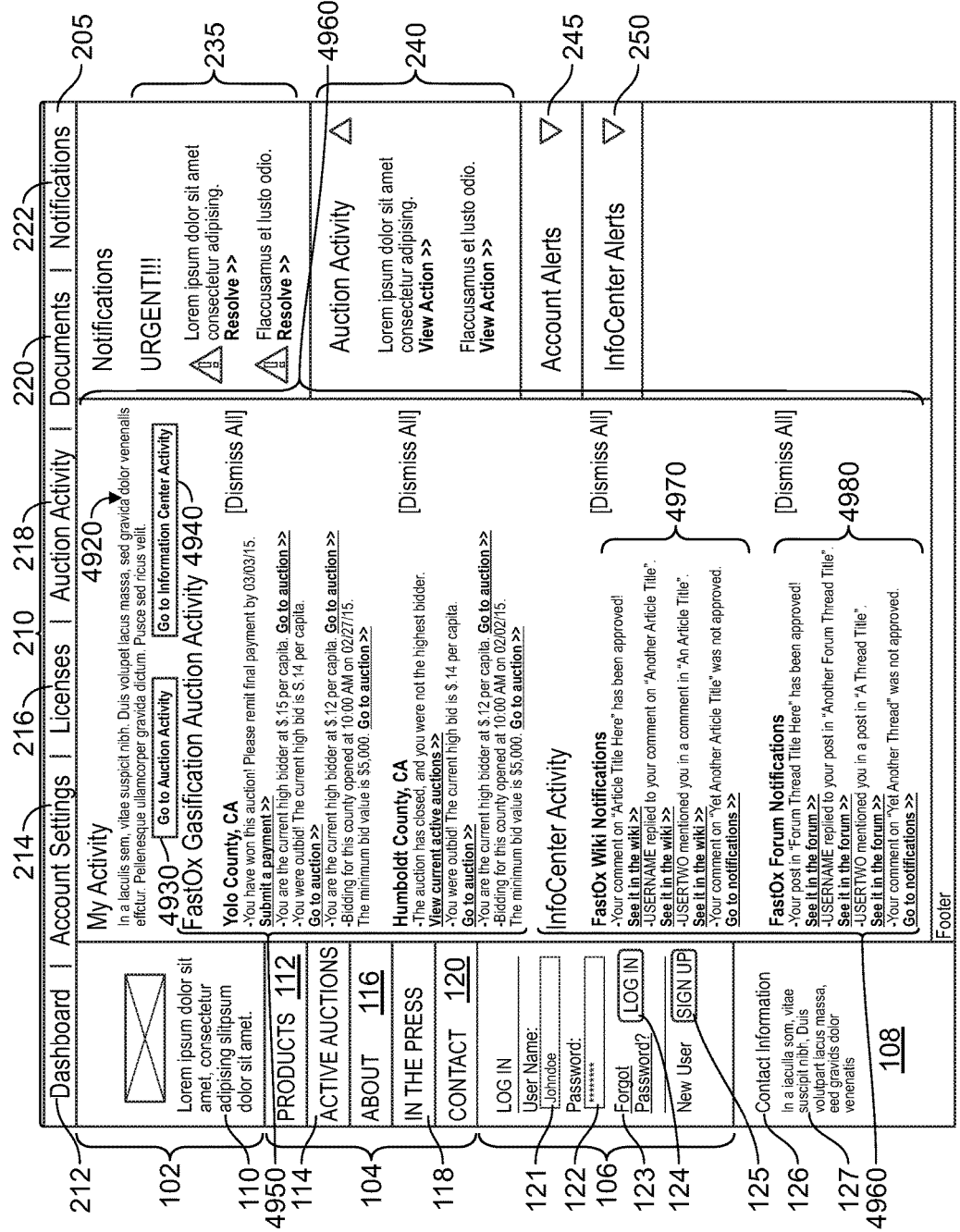
FIG. 49 is a wireframe on a community website of a user administration My Activity page UI at the county level for the e-commerce system.
Figure 49:
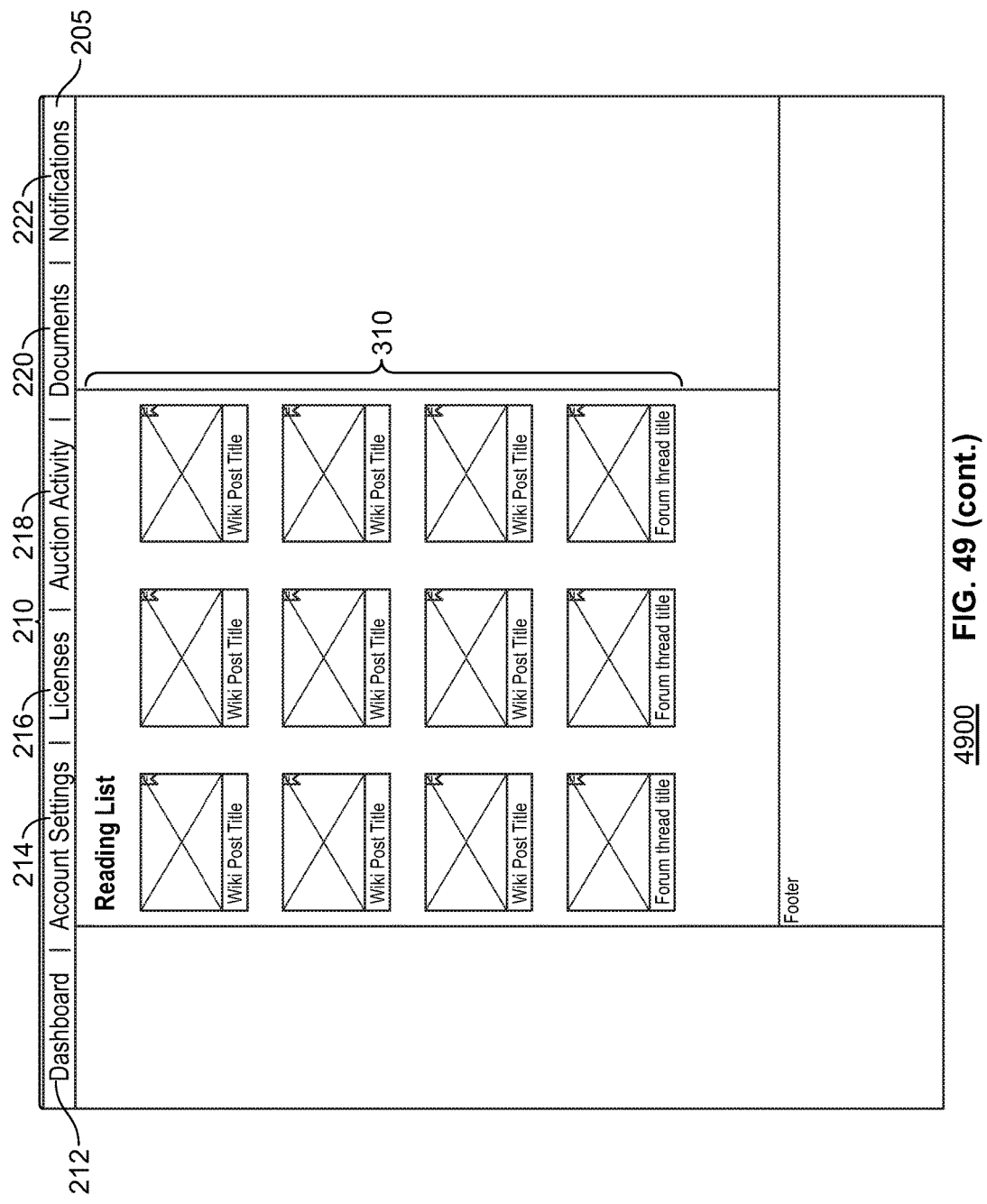

FIG. 49 is a wireframe on a community website of a user administration My Activity page UI 4900 at the county level for the e-commerce system. In this example, the UI 4900 comprises a My Activity page 4910. In this example, the My Activity page 4910 comprises My Activity text 4920, a "Go to Auction Activity" button 4930, a "Go to Information Center Activity" button 4940, auction activity listings 4950, and Information Center activity listings 4960. The "Go to Auction Activity" button 4930 is configured when clicked by the user to send the user to the auction activity listings 4950. Similarly, the "Go to Information Center Activity" button 4940 is configured when clicked by the user to send the user to the Information Center Activity listings 4960.

In this example, the auction activity listings 4950 comprise listings of auction activity in two different counties. For the first county, which in this example is Yolo County, Calif., the listing of auction activity for the first auction states, "You have won this auction! Please remit final payment by [date]," with a link included to submit payment. For a second auction and a fourth auction, the listing of auction activity states, "You are the current high bidder at [amount of money] per capita," with a link included to go to that auction. For a third auction, the listing of auction activity states, "You were outbid! The current high bid is [amount of money] per capita," with a link included to go to that auction. At the bottom of the listing of auction activity for Yolo County, a legend states, "Bidding for this county opened at [date and time]. The minimum bid value is [amount of money]," with a link included to go to that auction.

For the second county, which in this example is Humboldt County, Calif., the listing of auction activity for the first auction states, "The auction has closed, and you were not the highest bidder," with a link included to view current active auctions. For a second auction, the listing of auction activity states, "You were outbid! The current high bid is [amount of money] per capita," with a link included to go to that auction. For a third auction, the listing of auction activity states, "You are the current high bidder at [amount of money] per capita," with a link included to go to that auction. At the bottom of the listing of auction activity for Yolo County, a legend states, "Bidding for this county opened at [date and time]. The minimum bid value is [amount of money]," with a link included to go to that auction.

Figure 50:
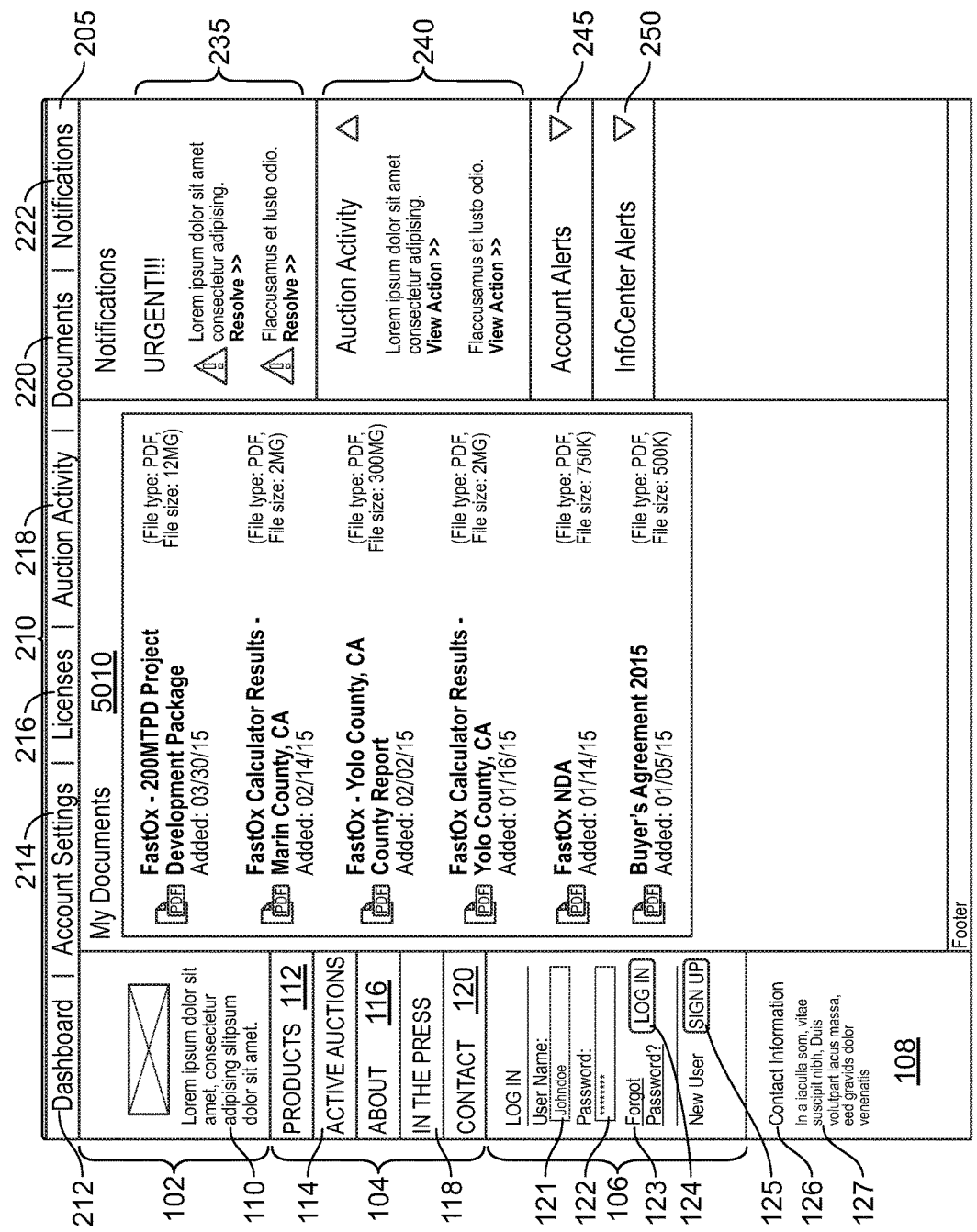
FIG. 50 is a wireframe on a community website of a user administration My Documents page UI at the county level for the e-commerce system.

FIG. 50 is a wireframe on a community website of a user administration My Documents page UI 5000 at the county level for the e-commerce system. The UI 5000 comprises a My Documents box 5010. In this example, the My Documents box 5010 comprises six documents. Each document appears with a link, with its title, and with information on its file type and on its file size.

Figure 51:
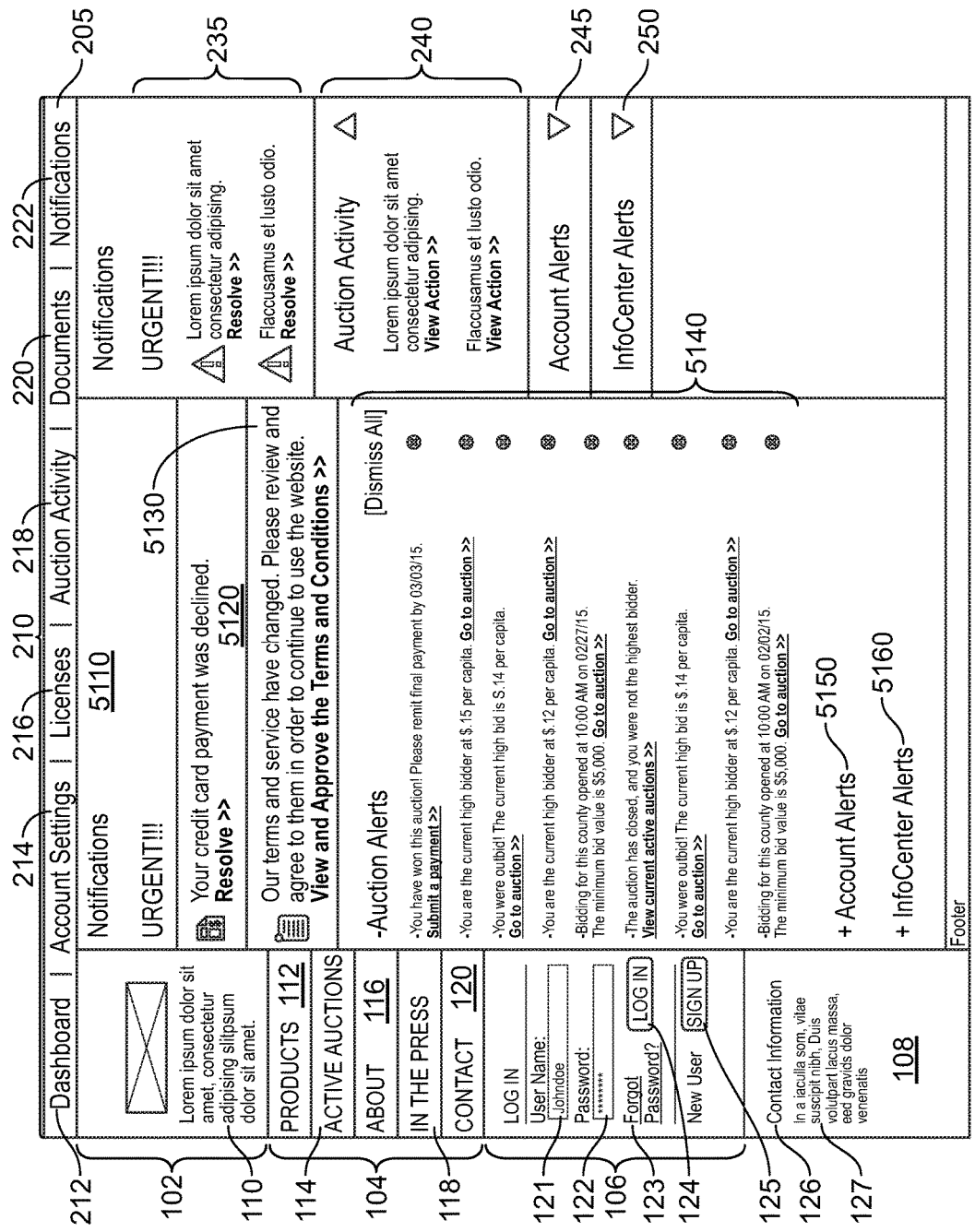
FIG. 51 is a wireframe on a community website of a user administration notifications page UI at the county level for the e-commerce system.

FIG. 51 is a wireframe on a community website of a user administration notifications page UI 5100 at the county level for the e-commerce system. The UI 5100 comprises a notifications page 5110. In this example, the notifications page 5110 comprises a first urgent notification 5120, a second urgent notification 5130, auction alerts 5140, account alerts text 5150, and information center alerts text 5160.

In this example, the first urgent notification 5120 comprises a credit card declination notification, "Your credit card payment was declined," with a link included to resolve the issue. In this example, the second urgent notification 5130 comprises a terms of service change notification, "Our terms of service have changed. Please review and agree to them in order to continue to use the web site," with a link included to agree to the changed terms of service.

In this example, the auction alerts 5140 comprise nine alerts regarding different auctions. In this example, the first auction alert states, "You have won this auction! Please remit final payment by [date]," with a link included to submit payment. In this example, the second, fourth, and eighth auction alerts state, "You are the current high bidder at [amount of money] per capita," with links to go to those auctions. In this example, the third and seventh auction alerts state, "You were outbid! The current high bid is [amount of money] per capita," with links included to go to those auctions. In this example, the fifth auction alerts and also the ninth auction alert at the bottom of the page state, "Bidding for this county opened at [date and time]. The minimum bid value is [amount of money]," with link included to go to those auctions. In this example, the sixth auction alert states, "The auction has closed, and you were not the highest bidder," with a link included to view current active auctions.

In this example, the account alerts text 5150 and the information center alerts text 5160 each comprises a plus sign that may be clicked on by a user in order to expand the clicked list to the detail level.

According to embodiments of the invention, a number of advantages may be available to one or more of licensees, the Bureau of Land Management (BLM) and BLM staff via the disclosed transparent online auction of geographically limited patent licenses. Embodiments of the present invention provide rapid, paperless, coast-to-coast exposure of BLM parcels. Also provided is a capability to rapidly update parcel information. Also provided is an ability to actively notify users regarding the status of the auction. Embodiments of the invention make possible nationwide and even worldwide user participation without travel restrictions impacting participation. Accordingly, the pool of users is thereby expanded.

Yet additional embodiments of the invention have the potential to standardize online parcel presentation across lease sales. Modern auction functionality is configured to provide users with flexible, configurable bidding options including proxy bidding. Embodiments of the invention offer the BLM flexibility regarding scheduling and regarding updates. It may now be possible to rapidly, easily perform one or more of postponing, rescheduling, and cancelling an auction that is interrupted due to one or more of technical reasons, weather reasons, and other reasons. Still further embodiments of the invention facilitate rapid user notifications regarding the one or more of postponing, rescheduling, and cancelling of the auction.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and the details of certain components can be altered without substantially impairing the functioning of the invention.

For example, it will be understood by those skilled in the art that the online process for distributing the IP rights can comprise a sale in an online auction for an auction price. As another example, it will be understood by those skilled in the art that the process for distributing the IP rights may comprise an online lottery. For example, it will be understood by those skilled in the art that the UI may be tailored to a municipality level rather than a geopolitical territory level. For example, it will be understood by those skilled in the art that the UI may be tailored to a state level rather than a geopolitical territory level. For example, it will be understood by those skilled in the art that rather than dividing up a license for a given geopolitical territory into modes, the license might be divided up based on one or more of different categories of clients and different needs of clients. For example, it will be understood by those skilled in the art that the site map may comprise additional components besides those listed, and it will further be understood by those skilled in the art that the site map may not comprise one or more components that are listed. For example, it will be understood by those skilled in the art that the deposit charged to the auction winner may be a percentage of the sales price different from twenty percent (20%). For example, it will be understood by those skilled in the art that the deposit charged to the auction winner may be computed by another method other than as a percentage of the sales price. It is intended, therefore, that the subject matter in the above description shall be interpreted as illustrative and shall not be interpreted in a limiting sense.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the appended claims.

What is claimed is:

1. An electronic commerce system comprising:
 a computer device for an intellectual property (IP) rights holder;
 an application residing on the computer device that executes instructions to cause the computer to:
  authorize one or more users to participate in an online process for distributing specified IP rights;
  conduct the online process;

give, upon termination of the online process, to a winning user a right to license the specified IP rights upon payment of a fee to the IP holder;

provide the license to the specified IP rights to the winning user;

organize a selected online community of licensees of the IP holder's IP rights; and invite the winning user to join the selected online community of licensees of the IP holder's IP rights;

assigns an access level to the winning user; and provides the winning user with a calculator having different access level requirements, wherein the access levels control and limit information displayed by the calculator.

2. The e-commerce system of claim 1, wherein an IP holder is one or more of an owner of the IP rights, an authorized agent for the owner of the IP rights, and an exclusive licensee for the IP rights.

3. The e-commerce system of claim 1, wherein the online process for distributing the IP rights is an online auction, and the winning user is a winning bidder in the online auction.

4. The e-commerce system of claim 3, wherein the auction comprises one or more of an English auction, a fixed sale price auction, a reserve price auction, a proxy English auction, a sealed bid auction, a sealed first price auction, a Dutch auction, a Japanese auction, and another type of auction.

5. The e-commerce system of claim 4, wherein the auction comprises an automated Dutch auction.

6. The e-commerce system of claim 4, wherein the auction comprises a sealed bid auction and a fixed sale price option.

7. The e-commerce system of claim 1, wherein the IP holder provides the selected online community of licensees with an opportunity for one or more of using license management tools, participating in a purchasing opportunity, joining a purchasing cooperative, receiving project information, receiving best practice information, sharing member-generated project information, sharing best practice information, receiving member-controlled IP, sharing member-controlled IP in exchange for a royalty, purchasing one or more of goods and services through the selected online community, and participating in an innovation center.

8. The e-commerce system of claim 7, wherein the license management tools comprise one or more of a tool for performing one or more of splitting and combining, a tool for granting sublicenses to other online community members, a tool for funding a project, a marketing tool, a design systems tool, a PDP tool, a user forums tool, a loan tool, a grant tool, a vendor tool, a system purchase tool, a partnership tool, a resale tool, a price change forecast tool, a nondisclosure agreement (NDA) generation tool, a business plan building tool, a financial modeling tool, and another license management tool.

9. The e-commerce system of claim 7, wherein the IP holder further provides the selected online community of licensees with an opportunity to participate in a larger online community comprising one or more non-licensees able to support the development and marketing of the technology.

10. The e-commerce system of claim 9, wherein the one or more non-licensees comprises one or more of: suppliers and vendors of equipment and materials relevant to the technology; providers of services relevant to the technology; financial entities; developers; potential developers; governmental authorities; consumers; policy advocates; lobbyists; and potential consumers.

11. The e-commerce system of claim 7, wherein an online community member that participates in the innovation center contributes to the online community member-controlled IP that the online community member develops relating to the IP rights, herein the contributing online community member receives fees for the selected online community's use of the contributed IP.

12. The e-commerce system of claim 1, wherein the license is geographically limited.

13. The e-commerce system of claim 12, wherein the license is geographically limited to one or more geopolitical entities.

14. The e-commerce system of claim 12, wherein the license is geographically limited to one or more counties located in one of more of the United States and another country.

15. The e-commerce system of claim 12, wherein the license is geographically limited to one or more identified counties within a state of the United States, identified boroughs within Alaska, and identified parishes within Louisiana.

16. The e-commerce system of claim 15, wherein the online process for distributing the IP rights is an online auction, and wherein the winning user is a winning bidder in the online auction.

17. The e-commerce system of claim 1, wherein the IP holder provides the user with one or more of two or more different access levels to system information depending on an authorization level of the user.

18. The e-commerce system of claim 17, wherein the IP holder provides the user with one or more of five different access levels to system information, wherein a zeroth access level provides public information to any user, wherein a first access level provides registered user information to any registered user, wherein a second access level provides user information to any registered users that sign a non-disclosure agreement, wherein a third access level provides licensee information to users that are licensees, and wherein a fourth access level provides online community member information to users that have joined the selected online community of licensees, thereby becoming online community members.

19. The e-commerce system of claim 18, wherein a fifth access level provides investor information to financial investors who have invested with the IP holder.

20. The e-commerce system of claim 18, wherein the system provides users with a calculator for calculating the potential value of the IP holder's IP rights, wherein:

the zeroth access level provides the users with the results of the calculator;

the first access level provides registered users with the results of the calculator and with full capital expenditure information from the calculator;

the second access level provides registered users who sign the non-disclosure agreement with the results of the calculator, with the full capital expenditure information from the calculator, and with underlying methods of the calculator;

the third access level provides licensees with the results of the calculator, with the full capital expenditure information from the calculator, with the underlying methods of the calculator, and with an option to customize the calculator; and the fourth access level provides online community members with the results of the calculator, with the full capital expenditure information from the calculator, with the underlying methods of the calculator, with the option to customize the calculator, and with an option to modify the calculator to reflect selected online community projects.

21. The e-commerce system of claim 20, wherein the fifth access level provides investors with the results of the calculator, with the full capital expenditure information from the calculator, with the underlying methods of the calculator, with the option to customize the calculator, with an option to modify the calculator to reflect selected online community project, and with an option to modify the underlying methods of the calculator.

22. The e-commerce system of claim 1, wherein the IP rights include one or more of patent rights, trademark rights, copyright rights, trade secrets, and technical know-how.

23. The e-commerce system of claim 1, wherein the IP rights relate to one or more of gasifiers, improved waste gasifiers, methods of waste gasification, preparation and use of waste feedstock for gasifiers and gasification, and use of gasifiers and gasifier output to produce one or more of goods and services.

24. The e-commerce system of claim 1, wherein the IP rights are limited to one or more modes of operation selected from the group comprising: municipal solid waste conversion, biomass or green waste conversion, industrial waste conversion, fossil fuel conversion, and another conversion technology.

25. The e-commerce system of claim 1, wherein the license extends for a time period of one year, wherein the license may be extended for one or more additional extension years before its termination by payment by the licensee of license extension fees.

26. The e-commerce system of claim 25, wherein the license extension fees increase in each successive extension year.

27. A method for operating an electronic commerce system comprising a computer device, comprising:
organizing, by the computer device, a selected online community of licensees of an intellectual property (IP) holder's IP rights;
receiving, by the IP holder through the computer device, authorization for one or more users to participate in an online process for distributing specified IP rights;
conducting, by the computer device, the online process;
giving, upon termination of the online process, by the IP holder through the computer device, to a winning user a right, upon payment of a fee, to license the specified IP rights;
receiving, by the computer device, from the winning user, payment of the fee;
providing, by the computer device, the license to the specified IP rights to the winning user;
inviting, by the IP holder, through the computer device, the winning user to join the selected online community of licensees of the IP holder's IP rights;
assigning, by the computer device, an access level to the winning user; and
providing, by the computer device, the winning user with a calculator having different access level requirements, wherein the access levels control and limit information displayed by the calculator.

28. The method of claim 27, wherein the step of conducting comprises conducting an online auction.

29. The method of claim 27, wherein the method comprises a step, performed after the step of giving and before the step of providing, of acknowledging the winning user's compliance with applicable license requirements.

30. The method of claim 27, further comprising a step of providing, by the IP holder, to the selected online community of licensees, an opportunity for one or more of using license management tools, participating in a purchasing opportunity, joining a purchasing cooperative, receiving project information, receiving best practice information, sharing member-generated project information, sharing member-generated best practice information, receiving member-controlled IP, sharing member-controlled IP in exchange for a royalty, purchasing one or more of goods and services through the selected online community, and participating in an innovation center.

31. A method for participating in an electronic commerce system comprising a first computer device, the system further comprising a second computer device, comprising:
obtaining, by a user, from an intellectual property (IP) holder and through the first computer device, authorization to participate in an online process for winning a right to license specified IP rights held by the IP holder;
participating in the online process through the second computer device, by the user;
winning, by the user, upon termination of the online process, a right to license the specified IP rights upon payment of a fee as a winning user;
paying, by the winning user, to the IP holder, the fee;
receiving the license to the specified IP rights from the IP holder through the second computer device, by the winning user, thereby becoming a licensee;
accepting, by the winning user, an invitation from the IP holder to join a selected online community of licensees of the IP holder's IP rights;
assigning, by the first computer device, an access level to the winning user; and
providing, by the first computer device, the winning user with a calculator having different access level requirements,
wherein the access levels control and limit information displayed by the calculator.

32. The method of claim 31, wherein the step of participating comprises bidding in an online auction.

33. The method of claim 31, wherein the method comprises a step of performing one or more selected online community-centered activities.

34. The method of claim 31, wherein the step of performing comprises one or more of using license management tools, participating in a purchasing opportunity, joining a purchasing cooperative, receiving project information, receiving best practice information sharing member-generated project information, sharing member-generated best practice information, receiving member-controlled IP, sharing member-controlled IP in exchange for a royalty, purchasing one or more of goods and services through the selected online community, and participating in an innovation center.

35. The method of claim 31, wherein the method comprises a step, performed after the step of winning and before the step of receiving, of complying with applicable license requirements.

* * * * *